(12) United States Patent
Tsubata et al.

(10) Patent No.: US 8,330,883 B2
(45) Date of Patent: Dec. 11, 2012

(54) ACTIVE MATRIX SUBSTRATE, LIQUID CRYSTAL PANEL, DISPLAY, TELEVISION RECEIVER

(75) Inventors: Toshihide Tsubata, Tsu (JP); Toshifumi Yagi, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 935 days.

(21) Appl. No.: 12/297,928

(22) PCT Filed: Mar. 30, 2007

(86) PCT No.: PCT/JP2007/057049
§ 371 (c)(1),
(2), (4) Date: Oct. 21, 2008

(87) PCT Pub. No.: WO2008/010334
PCT Pub. Date: Jan. 24, 2008

(65) Prior Publication Data
US 2009/0091671 A1    Apr. 9, 2009

(30) Foreign Application Priority Data

Jul. 19, 2006 (JP) .................................. 2006-197319
Dec. 8, 2006 (JP) .................................. 2006-332592

(51) Int. Cl.
G02F 1/1333 (2006.01)
G02F 1/1339 (2006.01)
G02F 1/1343 (2006.01)
(52) U.S. Cl. ........................... 349/38; 349/138; 349/155
(58) Field of Classification Search .................... 349/38, 349/138, 155
See application file for complete search history.

(56) References Cited

U.S. PATENT DOCUMENTS

| | | | |
|---|---|---|---|
| 5,380,555 A | 1/1995 | Mine et al. | |
| 5,953,084 A | 9/1999 | Shimada et al. | |
| 6,052,162 A | 4/2000 | Shimada et al. | |
| 6,057,896 A | 5/2000 | Rho et al. | |

(Continued)

FOREIGN PATENT DOCUMENTS
CN    1488083 A    4/2004
(Continued)

OTHER PUBLICATIONS

International Search Report for PCT/JP2007/057049 mailed Jun. 5, 2007.

(Continued)

*Primary Examiner* — Jerry Blevins
(74) *Attorney, Agent, or Firm* — Nixon & Vanderhye P.C.

(57) ABSTRACT

An active matrix substrate includes: storage capacitor wirings (18); a Cs trunk wiring (50) connected with the storage capacitor wirings via contact holes (48) provided in a non-display region (44); scanning signal lines (16) provided in the same layer as the storage capacitor wirings (18) and crossing the Cs trunk wiring (50) in the non-display region (44); an insulating layer between the storage capacitor wirings (18) and the Cs trunk wiring (50) which includes: a through-bore portion for forming the contact hole (48); a first film thickness portion (53) adjacent to the through-bore portion; and a second film thickness portion which is thicker than the first film thickness portion (53) and situated at least in the intersections of the storage capacitor wirings (18) with the Cs trunk wiring (50). Consequently, the storage capacitor wirings (18) and the Cs trunk wiring (50) are connected with high precision, and a short circuit between the Cs trunk wiring (50) and the scanning signal lines (16) is unlikely to occur.

28 Claims, 36 Drawing Sheets

U.S. PATENT DOCUMENTS

| | | | |
|---|---|---|---|
| 6,078,366 | A | 6/2000 | Dohjo et al. |
| 6,097,452 | A | 8/2000 | Shimada et al. |
| 6,195,138 | B1 | 2/2001 | Shimada et al. |
| 6,218,889 | B1 * | 4/2001 | Fujiki et al. ................ 327/427 |
| 6,243,146 | B1 | 6/2001 | Rho et al. |
| 6,271,543 | B1 * | 8/2001 | Ohtani et al. ................ 257/72 |
| 6,274,516 | B1 | 8/2001 | Kamei et al. |
| 6,278,502 | B1 * | 8/2001 | Colgan et al. ................ 349/38 |
| 6,329,681 | B1 * | 12/2001 | Nakamura et al. ........... 257/297 |
| 6,839,096 | B1 * | 1/2005 | Jeong et al. .................. 349/38 |
| 6,940,566 | B1 | 9/2005 | Rho et al. |
| 2001/0002857 | A1 | 6/2001 | Shimada et al. |
| 2001/0010567 | A1 | 8/2001 | Rho et al. |
| 2002/0113934 | A1 | 8/2002 | Aoki |
| 2003/0179325 | A1 | 9/2003 | Rho et al. |
| 2003/0234904 | A1 | 12/2003 | Matsuda et al. |
| 2004/0001167 | A1 | 1/2004 | Takeuchi et al. |
| 2004/0114059 | A1 | 6/2004 | Lee et al. |
| 2004/0195573 | A1 | 10/2004 | Kim |
| 2004/0241987 | A1 | 12/2004 | Kim et al. |
| 2005/0179849 | A1 | 8/2005 | Nomura et al. |
| 2005/0185109 | A1 | 8/2005 | Rho et al. |
| 2005/0287692 | A1 | 12/2005 | Kim et al. |
| 2006/0097972 | A1 | 5/2006 | Takeuchi et al. |
| 2007/0103608 | A1 * | 5/2007 | Lee et al. ................... 349/38 |
| 2007/0164286 | A1 | 7/2007 | Kim |
| 2007/0176178 | A1 | 8/2007 | Lee et al. |
| 2007/0188669 | A1 | 8/2007 | Lee et al. |
| 2007/0190703 | A1 | 8/2007 | Lee et al. |
| 2007/0195569 | A1 | 8/2007 | Lee et al. |
| 2008/0198108 | A1 | 8/2008 | Aoki |

FOREIGN PATENT DOCUMENTS

| | | |
|---|---|---|
| JP | 06-112485 | 4/1994 |
| JP | 07-114044 | 5/1995 |
| JP | 07-287252 | 10/1995 |
| JP | 10-102003 | 4/1998 |
| JP | 10-186408 A | 7/1998 |
| JP | 10-319433 | 12/1998 |
| JP | 11-133457 | 5/1999 |
| JP | 2001-098224 | 4/2001 |
| JP | 2002-006773 A | 1/2002 |
| JP | 2004-310099 A | 11/2004 |
| JP | 2006-018281 A | 1/2006 |

OTHER PUBLICATIONS

D.K. Choi et al., "Performance of TFT Passivated with Low-K Dielectrics", IDW' 03, pp. 617-620.

Supplementary EP Search Report mailed Sep. 9, 2010 in corresponding EP application 07740485.3.

* cited by examiner

US 8,330,883 B2

ACTIVE MATRIX SUBSTRATE, LIQUID CRYSTAL PANEL, DISPLAY, TELEVISION RECEIVER

This application is the U.S. national phase of International Application No. PCT/JP2007/057049 filed, 30 Mar. 2007 which designated the U.S. and claims priority to Japanese Application No(s) 2006-197319 filed 19 Jul. 2006 and 2006-332592, filed 8 Dec. 2006, the entire contents of each of which are hereby incorporated by reference.

TECHNICAL FIELD

The present invention relates to display devices such as liquid crystal display devices and various types of EL display devices, and to active matrix substrates for use in such display devices.

BACKGROUND ART

Active matrix substrates are widely used in active matrix display devices such as liquid crystal display devices and electro luminescence (EL) display devices. A normal active matrix substrate includes, in its display region: scanning signal lines; data signal lines; and thin film transistors (TFTs) provided at the intersections of those signal lines. Electric potential signals are transmitted as appropriate from the data signal lines to pixel electrodes via the TFTs. Some active matrix substrates include a storage capacitor wiring in each pixel area (display region) so as to prevent self discharge of the TFTs in the off period and a decrease in image quality caused by an off current of the TFTs, and to transmit various types of modulation signals for use in the driving of the liquid crystal.

A plurality of storage capacitor wirings are formed in the display region and connected with a common wiring (trunk wiring) in a non-display region, which is set in an area surrounding the display region. For example, the conventional art shown in FIGS. 37 (*a*) and 37 (*b*) teaches that, in the non-display region, each auxiliary capacitor line 811 is connected, via contact holes 808, with a collective auxiliary capacitor line 813 (common wiring) which is made of an electrically conductive film formed in the same layer as data lines 804 (see Patent Documents 1 and 2). Patent Documents 3 and 4 shown below are publicly known publications relevant to the above conventional art.

[Patent Document 1] Japanese Unexamined Patent Application Publication No. 6773/2002 (Tokukai 2002-6773; published on Jan. 11, 2002)
[Patent Document 2] Japanese Unexamined Patent Application Publication No. 319433/1998 (Tokukaihei 10-319433; published on Dec. 4, 1998)
[Patent Document 3] Japanese Unexamined Patent Application Publication No. 114044/1995 (Tokukaihei 7-114044; published on May 2, 1995)
[Patent Document 4] Japanese Unexamined Patent Application Publication No. 287252/1995 (Tokukaihei 7-287252; published on Oct. 31, 1995)

DISCLOSURE OF INVENTION

According to the above conventional art, the auxiliary capacitor line 811 and a gate line 802 are formed in the same layer, and the collective auxiliary capacitor line 813 (common wiring) is formed in a layer above the auxiliary capacitor line 811 and the gate line 802 (i.e., in the same layer as the data lines 804). The collective auxiliary capacitor line 813 crosses the gate line 802 (scanning signal line) in the non-display region. In an intersection of them, the collective auxiliary capacitor line 813 is formed above the gate line 802 with an insulating film 803 therebetween. The insulating film 803 in the non-display region is required to have a thickness which is sufficient to surely prevent a short circuit between the gate line 802 and the collective auxiliary capacitor line 813.

Meanwhile, if the insulating film 803 has a large thickness, deeper etching is required in order to form contact holes. In this case, a defective contact hole 808 is more likely to be formed due to variation and the like in thickness and quality of the insulating film 803. For example, if a portion of the insulating film 803 at which portion the contact holes are to be formed is large in thickness, then the holes are not completely formed in the insulating film 803 by etching. This may cause a defective connection between the auxiliary capacitor line 811 and the collective auxiliary capacitor line 813.

Further, the same problem as above concerns the portion of the insulating film 803 in the non-display region at which portion each of the scanning signal lines is to be connected, via a contact hole, with a lead wiring for external connection. Specifically, the insulating film in the non-display region is required to have a thickness which is sufficient to surely prevent a short circuit between the lead wiring and another wiring (e.g., the collective auxiliary capacitor line). Meanwhile, if the insulating film has a large thickness, deeper etching is required in order to form the contact hole. In this case, a defective contact hole is more likely to be formed due to variation and the like in thickness and quality of the insulating film.

The present invention addresses the problems discussed above, and aims to provide an active matrix substrate in which two wirings (e.g., a storage capacitor wiring and a trunk wiring) are connected in a non-display region with high precision, and a short circuit is unlikely to occur between these wirings and another wiring (e.g., a scanning signal line).

An active matrix substrate of the present invention includes: a plurality of storage capacitor wirings; and an insulating film covering the storage capacitor wirings, each of the storage capacitor wirings being connected, via a contact hole, with a trunk wiring formed above the insulating film in a non-display region, the insulating film including: a through-bore portion in the contact hole (below the opening of the contact hole); and a portion with a reduced thickness adjacent to the through-bore portion. Further, an active matrix substrate of the present invention includes: two wirings connected with each other, via a contact hole provided in a non-display region; a crossing wiring which is formed in a same layer as one of the two wirings and crosses the other of the two wirings in the non-display region; and an insulating layer between the two wirings, the insulating layer including: a through-bore portion for forming the contact hole; a first film thickness portion adjacent to the through-bore portion; and a second film thickness portion which is positioned at least in an intersection of the other of the two wirings with the crossing wiring, and larger in film thickness than the first film thickness portion. For example, the two wirings are a storage capacitor wiring and its trunk wiring, respectively, and the crossing wiring is a scanning signal line.

The above arrangement is achieved by forming, in the non-display region, a portion of the insulating film which portion has a reduced thickness locally, and then boring through a part (e.g., a central part) of the portion so that a contact hole is formed (which connects the storage capacitor wiring with the trunk wiring).

When the insulating film in the non-display region is (i) thin at a portion in which the contact hole is to be formed and at a portion surrounding the above portion, and is (ii) thick at the other portion as described above, the trunk wiring and the storage capacitor wiring can be connected with high precision, while a short circuit between the trunk wiring and another wiring (e.g., the scanning signal line) is surely prevented.

An active matrix substrate of the present invention includes in each pixel area of a display region: first and second transistors; a first pixel electrode connected with the first transistor; and a second pixel electrode connected with the second transistor, the active matrix substrate further including: in each pixel area, first and second storage capacitor wirings crossing the pixel area; and an insulating film covering the first and second storage capacitor wirings, the first storage capacitor wiring being connected, via a first contact hole, with a first trunk wiring disposed above the insulating film in a non-display region, the second storage capacitor wiring being connected, via a second contact hole, with a second trunk wiring disposed above the insulating film in the non-display region, the insulating film including: through-bore portions in the first and second contact holes (below the openings of the first and second contact holes), respectively; and portions with a reduced thickness adjacent to the through-bore portions, respectively.

According to this active matrix substrate, individual control of electric potentials supplied to the first and second storage capacitor wirings allows one pixel area to have a plurality of subregions having different luminances (i.e., multi-pixel driving). The above-mentioned effect can be achieved with this arrangement as well. In this case, the active matrix substrate may be arranged such that electric potentials of the first and second trunk wirings are controlled so that phases of electric potential waveforms of the first and second trunk wirings are shifted by 180 degrees from each other.

The electric potentials of the first and second trunk wirings may be controlled so as to be raised or lowered after the first and second transistors are turned off and then to keep thus raised or lowered electric potentials until these transistors are turned off in a subsequent frame, respectively. More specifically, the active matrix substrate may be arranged such that either (i) an electric potential of the first storage capacitor wiring is controlled so as to be raised after the transistors are turned off and to keep thus raised state until the transistors are turned off in a subsequent frame, while an electric potential of the second storage capacitor wiring is controlled so as to be lowered after the transistors are turned off and to keep thus lowered state until the transistors are turned off in the subsequent frame, or (ii) an electric potential of the first storage capacitor wiring is controlled so as to be lowered after the transistors are turned off and to keep thus lowered state until the transistors are turned off in a subsequent frame, while an electric potential of the second storage capacitor wiring is controlled so as to be raised after the transistors are turned off and to keep thus raised state until the transistors are turned off in the subsequent frame.

In this case, the active matrix substrate may be arranged such that either (i) the raising of the electric potential of the first storage capacitor wiring is one horizontal period apart from the lowering of the electric potential of the second storage capacitor wiring, or (ii) the lowering of the electric potential of the first storage capacitor wiring is one horizontal period apart from the raising of the electric potential of the second storage capacitor wiring.

The active matrix substrate may be arranged such that the insulating film is a gate insulating film, the gate insulating film further including: a first film thickness portion adjacent to the through-bore portion; and a second film thickness portion which is adjacent to the first film thickness portion and larger in film thickness than the first film thickness portion, and the two wirings respectively connected via the contact holes are disposed in different layers, and an intersection of the wirings lies entirely within a perimeter of the first film thickness portion. When a larger portion of the gate insulating film below each of the trunk wirings is made up of the first film thickness portion (i.e., a thin portion of the gate insulating film) as described above, the distance between the trunk wirings and a counter electrode is larger. Thus, a parasitic capacitance between the trunk wirings and the counter electrode can be reduced. This can prevent signals transmitted through the trunk wirings from becoming dull. Further, the active matrix substrate may preferably be arranged such that the second storage capacitor wiring connected with the second trunk wiring crosses the first trunk wiring in the non-display region, and the intersection of the second storage capacitor wiring with the first trunk wiring lies within the perimeter of the first film thickness portion and a portion of the gate insulating film which portion corresponds to the intersection of the second storage capacitor wiring with the first trunk wiring has a structure identical with a structure of the second film thickness portion (i.e., a thick portion of the gate insulating film). This allows preventing a short circuit between the second storage capacitor wiring and the first trunk wiring, while the above-mentioned effect is obtained.

An active matrix substrate of the present invention includes: a plurality of scanning signal lines; and an insulating film covering the scanning signal lines, each of the scanning signal lines being connected, via a contact hole, with a lead wiring formed above the insulating film in a non-display region, the insulating film including: a through-bore portion in the contact hole (below the opening of the contact hole); and a portion with a reduced thickness adjacent to the through-bore portion.

The above arrangement is achieved by forming, in the non-display region, a portion of the insulating film which portion is smaller in thickness than an area surrounding the portion, and then boring through a part (e.g., a central part) of the portion so that a contact hole is formed (which connects the scanning signal line with the lead wiring).

When the insulating film in the non-display region is (i) thin at a portion in which the contact hole is to be formed and is (ii) thick at the other portion as described above, the lead wiring and the scanning signal line can be connected with high precision, while a short circuit between the lead wiring and another wiring (e.g., the storage capacitor wiring) is surely prevented.

The active matrix substrate of the present invention may be arranged such that the insulating film includes a first film thickness portion corresponding to the above region; and a second film thickness portion which is adjacent to the first film thickness portion and larger in film thickness than the first film thickness portion. The above arrangement is achieved by forming, in the non-display region, the first film thickness portion in the insulating film which portion is smaller in thickness than the surrounding portion (the second film thickness portion), and then boring through a part (e.g., a central part) of the first film thickness portion so that a contact hole is formed. The first film thickness portion is preferably formed so as to surround the through-bore portion. The second film thickness portion is only required to be formed at least in the intersection of the trunk wiring with another wiring in the non-display region.

The active matrix substrate may be arranged such that the insulating layer is a gate insulating film. The active matrix substrate may also be arranged such that the gate insulating film includes a plurality of gate insulating layers, and at least one of the gate insulating layers is thinner in the thin film portion. Further, the active matrix substrate may be arranged such that the gate insulating film includes a plurality of gate insulating layers, the thin film portion includes at least one gate insulating layer, and the other portion includes more gate insulating layers than the thin film portion.

In this case, the active matrix substrate may be arranged such that at least one of the gate insulating layers is a planarizing film. This reduces the height of a bump in the intersection of the scanning signal line with the data signal line, thereby reducing the height which the data signal line is required to reach in order to cross over the scanning signal line. Thus, the data signal line is less likely to be broken in the intersection. Further, for example, in a case where a silicon nitride (SiNx) film is used as one of the gate insulating layers, the SiNx film is likely to be broken by static electricity at a portion corresponding to a tapered portion of a gate electrode because such a portion of the SiNx film has reduced minuteness (uniformity) (i.e., a reduced quality), compared to the other portion. When one of the gate insulating layers is a planarizing film, it is ensured that a portion of the gate insulating film which portion corresponds to the tapered portion of the gate electrode also has a thickness that is sufficient to prevent the SiNx film from being broken.

The active matrix substrate may be arranged such that the gate insulating film includes gate insulating layers containing an organic material. Examples of the material containing an organic material include a spin-on-glass material, an acrylic resin material, an epoxy resin, a polyimide resin, a polyurethane resin, a polysiloxane resin, and a novolac resin. A gate insulating layer of any of these materials can be formed by applying (spreading) the material on the substrate. Thus, it is relatively easy to set the thickness of such a layer in micron order. This allows increasing the distance between (i) an electrically conductive layer connected with the scanning signal line or the storage capacitor wiring and (ii) another wiring, thereby suppressing the occurrence of a short circuit.

The active matrix substrate may preferably be arranged such that the bottommost one of the gate insulating layers is a planarizing film in the other portion. The active matrix substrate may preferably be arranged such that a portion of the planarizing film which portion is in contact with a substrate is thicker than the gate electrode formed on the substrate. This improves the effect of planarization, and further suppresses the occurrence of a short circuit between the signal lines as well as the breakage of the data signal line.

The active matrix substrate may preferably be arranged such that the bottommost one of the gate insulating layers is a planarizing film formed of a spin-on-glass (SOG) material (i.e., an SOG film). This allows successively forming, on the SOG film serving as a first gate insulating layer, a second gate insulating layer, a high-resistance semiconductor layer, and a low-resistance semiconductor layer, by a method such as a CVD method. As a result, the production process can be shortened. In this case, the arrangement may be such that the thin film portion does not include an SOG film, and that the other portion includes an SOG film in the bottommost layer. Further, the active matrix substrate may be arranged such that a portion of the thin film portion of the gate insulating film which portion is adjacent to an edge of the thin film portion is in a forward tapered shape. This suppresses the breakage of the electrodes formed on the gate insulating film.

The active matrix substrate may be arranged such that a plurality of contact holes are provided. When a plurality of contact holes are formed as above, there are more contacts than sufficient. This redundancy can further suppress the occurrence of a defective contact. The active matrix substrate may further include a connecting electrode in the contact hole, the connecting electrode connecting the storage capacitor wiring and the trunk wiring. This allows reducing the area of the contact hole and thereby reducing the area of the non-display region. As a result, the active matrix substrate can be downsized. In this case, the active matrix substrate may be arranged such that the connecting electrode is made of a material identical with a material of which a pixel electrode in a display region is made. This allows simultaneously forming the connecting electrode and the pixel electrode. As a result, the process of producing the active matrix substrate can be simplified. Further, the active matrix substrate may be arranged such that the trunk wiring is made of a material identical with a material of which a data signal line provided in a display region is made. This allows simultaneously forming the trunk wiring and the data signal line. As a result, the process of producing the active matrix substrate can be simplified.

The active matrix substrate may further include first and second interlayer insulating films above the gate insulating layer, wherein the contact hole extends through the gate insulating film and the first and second interlayer insulating films. In this case, the active matrix substrate may further have an intra-pixel contact hole in each pixel area, the intra-pixel contact hole connecting a transistor and a pixel electrode, wherein a portion of the gate insulating film below the intra-pixel contact hole has a structure identical with a structure of the second film thickness portion. This suppresses the occurrence of a short circuit between the transistor (i.e., its drain electrode) and the storage capacitor wiring in the pixel area, thereby preventing the occurrence of a defective pixel.

The active matrix substrate may preferably be arranged such that the two wirings connected via the contact hole in the non-display region are formed in different layers, and an intersection of the wirings lies entirely within a perimeter of the first film thickness portion. This allows reducing the difference between (i) the thickness of a portion of the second interlayer insulating film which portion is adjacent to the contact hole provided in the non-display region and (ii) the thickness of a portion of the second interlayer insulating film which portion is adjacent to the intra-pixel contact hole. As a result, the production process can be simplified (shortened). The active matrix substrate may, for example, be arranged such that an edge of a lower one of the two wirings is 60 μm or more distant from an edge of the first film thickness portion in the intersection. This allows causing the difference in thickness to be in the range from 0.1 to 0.2 μm. Thus, it is possible to form both of the contact holes with the same amount of exposure. This can reduce the possibility of a defective contact occurring due to a residue of the second interlayer insulating film.

The active matrix substrate may be arranged such that the gate insulating film includes, in each pixel region, a thin film portion having a reduced thickness in a region which overlaps the storage capacitor wiring. This allows a capacitor to be dominantly determined at a position where the storage capacitor wiring overlaps the thin film portion. Thus, variation in the capacitor is less influenced by how well the storage capacitor is completed.

The active matrix substrate may be arranged such that the gate insulating film includes, in each pixel region, a thin film portion having a reduced thickness in a region which overlaps a gate electrode of a transistor, and an area of the thin film portion which area overlaps a source electrode of the transistor is smaller than an area of the thin film portion which area overlaps a drain electrode of the transistor. As a result, it is possible to prevent a short circuit from occurring between signal lines (the data signal line and the scanning signal line) which short circuit cannot be repaired easily, as well as to maintain the properties of the transistor.

A liquid crystal panel of the present invention includes: the active matrix substrate and a counter substrate facing the active matrix substrate; the liquid crystal panel further including between the substrates: spacers; and a liquid crystal layer, the insulating film being a gate insulating film, the spacers including: a first spacer formed in a display region; and a second spacer formed in a non-display region, wherein a portion of the gate insulating film which portion is located below the first spacer has a structure identical with a structure of a portion of the gate insulating film which portion is located below the second spacer.

As described above, the structure of a portion of the gate insulating film which portion lies under the first spacer in the display region is identical with the structure of a portion of the gate insulating film which portion lies under the second spacer in the non-display region. This facilitates setting the height of each of the first and second spacers and allows reducing the difference between the cell gap in the display region and the cell gap in the non-display region. As a result, it is possible to suppress luminance unevenness occurring near the border between the display region and the non-display region.

The liquid crystal panel may preferably be arranged such that the gate insulating film includes: a first film thickness portion adjacent to the through-bore portion; a second film thickness portion which is adjacent to the first film thickness portion and larger in film thickness than the first film thickness portion; and a portion located below the second spacer which portion has a structure identical with a structure of the second film thickness portion. This is because the second film thickness portion is a thick portion of the gate insulating film, and the planarizing effect can be obtained as the second film thickness portion includes an SOG material. The liquid crystal panel may be arranged such that the gate insulating film includes a plurality of gate insulating layers, that the first film thickness portion includes at least one of the gate insulating layer, that the second film thickness portion includes more of the gate insulating layers than the first film thickness portion, and that any one of the gate insulating layers in the second film thickness portion is a planarizing film.

The liquid crystal panel may be arranged such that each of the first and second spacers is formed so as to overlap only one metal wiring which is covered with the gate insulating film, and that the metal wiring is a scanning signal line or the storage capacitor wiring.

As described above, the structure of a portion of the gate insulating film which portion lies under the first spacer in the display region is similar to the structure of a portion of the gate insulating film which portion lies under the second spacer in the non-display region. This further facilitates setting the height of each of the first and second spacers so as to allow further reducing the difference between the cell gap in the display region and the cell gap in the non-display region.

The liquid crystal panel may be arranged such that the first spacer is formed so as to overlap either an intersection of a data signal line with a scanning signal line, or an intersection of the data signal line with the storage capacitor wiring, the data signal line being formed above the gate insulating film, and that the second spacer is formed so as to overlap either an intersection of the trunk wiring with the scanning signal line, or an intersection of the trunk wiring with the storage capacitor wiring.

As described above, the structure of a portion of the gate insulating film which portion lies under the first spacer in the display region is similar to the structure of a portion of the gate insulating film which portion lies under the second spacer in the non-display region. This further facilitates setting the height of each of the first and second spacers so as to allow further reducing the difference between the cell gap in the display region and the cell gap in the non-display region.

The liquid crystal panel may preferably be arranged such that at least the second spacer has a relative permittivity which is lower than an average relative permittivity of a liquid crystal material in the liquid crystal layer. With this arrangement, when the second spacer is provided on any one of the trunk wirings, the parasitic capacitance between the trunk wiring and the counter substrate (electrode) is reduced, and dullness of signals transmitted through the trunk wiring can be suppressed.

The liquid crystal panel may further include an interlayer insulating film between the gate insulating film and the liquid crystal layer, the interlayer insulating film including a layer containing an organic material. An interlayer insulating film including an organic material is more elastic than an inorganic film made of silicon nitride (SiNx) or silicon dioxide ($SiO_2$). Thus, when an interlayer insulating film including an organic material is provided in the liquid crystal panel that has an arrangement in which the spacers in a display region and in a non-display region are formed on the counter substrate and in contact with the active matrix substrate, variations in the thickness of a color filter layer and black matrices on the counter substrate, in the height of the spacers, and/or in the film thickness of the active matrix substrate are effectively absorbed by the elasticity of the interlayer insulating film. The liquid crystal panel may be arranged such that the interlayer insulating film including an organic material includes any one of an acrylic resin, an epoxy resin, a polyimide resin, a polyurethane resin, a polysiloxane resin, and a novolac resin.

A liquid crystal panel of the present invention includes: the active matrix substrate; and a counter substrate facing the active matrix substrate, the liquid crystal panel further including between the substrates: spacers; and a liquid crystal layer, the spacers including: a first spacer formed in a display region; and a second spacer formed in a non-display region, the second spacer being provided so as to overlap an intersection of the second storage capacitor wiring with the first trunk wiring, wherein a portion of the gate insulating film which portion is located below the first spacer has a structure identical with a structure of a portion of the gate insulating film which portion is located below the second spacer, and the second spacer has a relative permittivity which is lower than a relative permittivity of a liquid crystal material in the liquid crystal layer.

As described above, the structure of a portion of the gate insulating film which portion lies under the first spacer in the display region is similar to the structure of a portion of the gate insulating film which portion lies under the second spacer in the non-display region. This further facilitates setting the height of each of the first and second spacers so as to allow further reducing the difference between the cell gap in the display region and the cell gap in the non-display region.

When the intersection of the first trunk wiring with the second storage capacitor wiring is made up of the second film thickness portion (a thick portion of the gate insulating film) so that a short circuit between the two wirings is prevented, the distance between the first trunk wiring and the counter substrate is small. This causes an increase in the parasitic capacitance between the first trunk wiring and the counter substrate. In view of this, a spacer having a relative permittivity that is smaller than the average relative permittivity of the liquid crystal material is provided on the intersection, so that the parasitic capacitance can be reduced.

The liquid crystal panel may preferably be arranged such that the first spacer is formed so as to overlap an intersection of a data signal line, which is formed above the gate insulating film, with either a scanning signal line or any one of the storage capacitor wirings.

A liquid crystal panel of the present invention includes: the active matrix substrate; a counter substrate facing the active matrix substrate, the liquid crystal panel further including between the substrates: spacers; and a liquid crystal layer, the insulating film being a gate insulating film, the spacers including: a first spacer disposed in a display region; and a second spacer disposed in a non-display region, wherein a portion of the gate insulating film which portion is located below the first spacer has a structure identical with a structure of a portion of the gate insulating film which portion is located below the second spacer.

As described above, the structure of a portion of the gate insulating film which portion lies under the first spacer in the display region is similar to the structure of a portion of the gate insulating film which portion lies under the second spacer in the non-display region. This further facilitates setting the height of each of the first and second spacers so as to allow further reducing the difference between the cell gap in the display region and the cell gap in the non-display region.

A display of the present invention includes the active matrix substrate.

A television receiver of the present invention includes: the display; and a tuner section for receiving television broadcast.

As described above, when an insulating film in a non-display region is (i) thin at a portion in which a contact hole connecting a storage capacitor wiring with its trunk wiring is to be formed, and is (ii) thick at the other portion, the trunk wiring and the storage capacitor wiring can be connected with high precision, while a short circuit between the trunk wiring and another wiring is surely prevented. Further, when the insulating film in the non-display region is (i) thin at a portion in which the contact hole connecting a scanning signal line with its lead wiring is to be formed, and is (ii) thick at the other portion, the lead wiring and the scanning signal line can be connected with high precision, while a short circuit between the lead wiring and another wiring is surely prevented.

BRIEF DESCRIPTION OF DRAWINGS

FIG. 37 (b) is a sectional view of the active matrix substrate shown in FIG. 37 (a).

Figure 1:
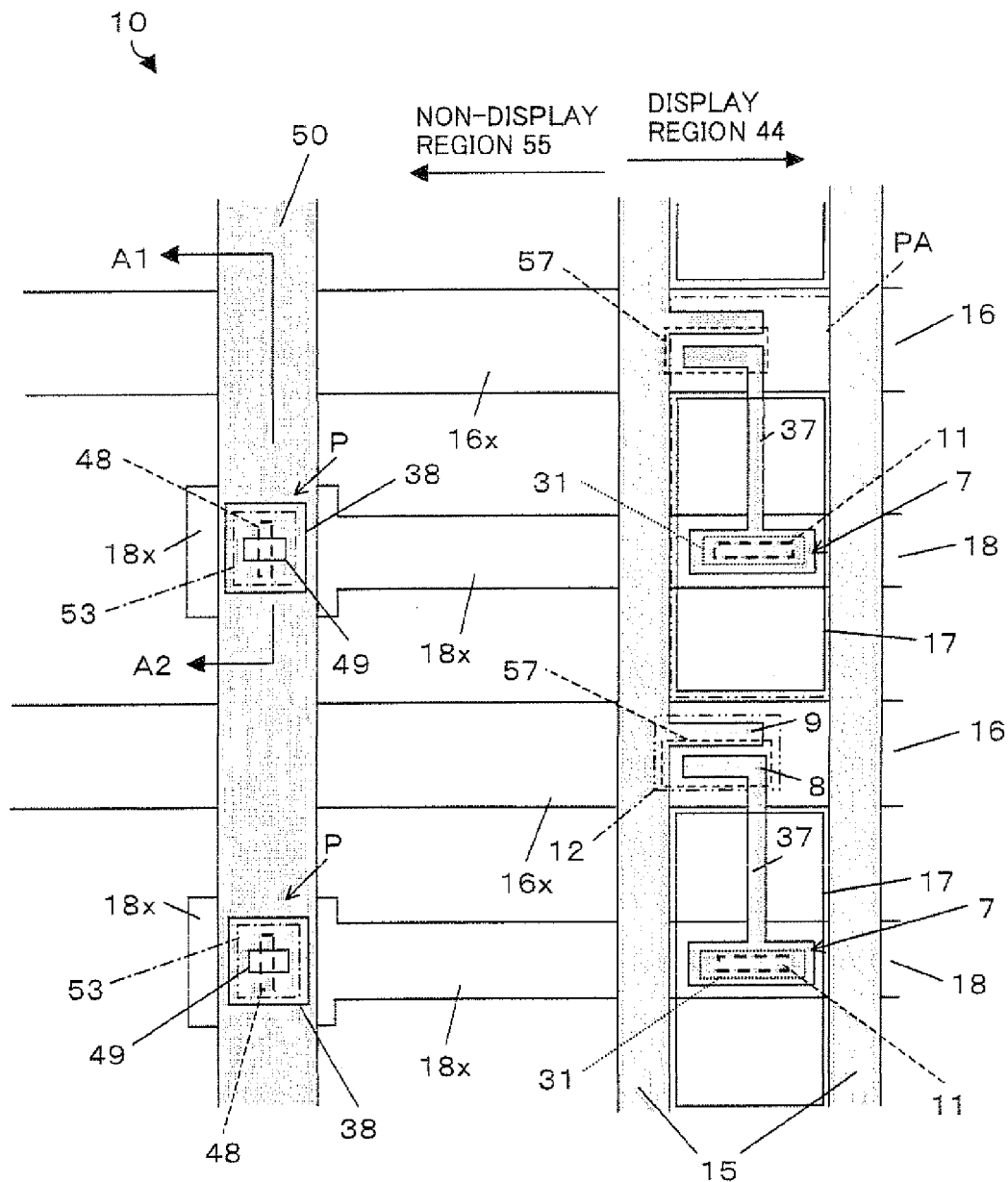
FIG. 1 is a plan view of an arrangement of an active matrix substrate of an embodiment.

DESCRIPTION OF THE NUMBERED CODES 7 drain lead electrode
8 drain electrode
9 source electrode
10 10x 10y 10z active matrix substrate
11 48 68 contact hole
12 TFT (transistor)
15 data signal line
16 scanning signal line
17 pixel electrode
18 storage capacitor wiring
21 first gate insulating layer
22 second gate insulating layer
31 57 thin film portion
40 gate insulating film
50 Cs trunk wiring
51 photo spacer
52 62 92 through-bore portion
53 63 71 93 first thickness portion
54 64 94 second thickness portion
55 non-display region
59x gate lead wiring
61 photo spacer
PA pixel area

BEST MODE FOR CARRYING OUT THE INVENTION

Figure 2:
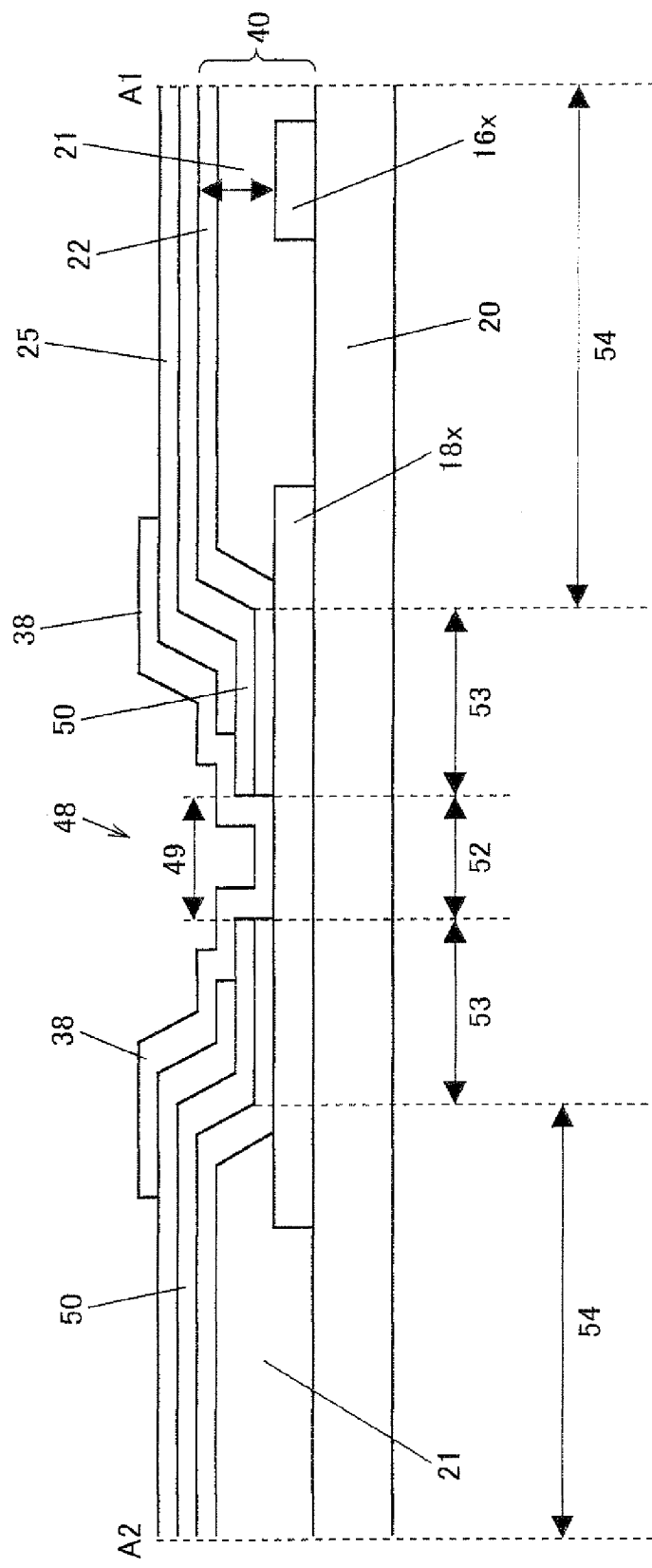
FIG. 2 is a sectional view taken along arrows A1-A2 shown in FIG. 1.

The following description deals with Embodiment 1 of the present invention with reference to FIGS. 1 through 36. FIG. 1 is a plan view schematically showing the structure of an active matrix substrate (display region, non-display region) of the present embodiment. FIG. 2 is a cross-sectional view taken along arrows A1-A2 shown in FIG. 1.

As shown in FIG. 1, an active matrix substrate 10 includes in its display region 44: a scanning signal line 16 formed in the horizontal direction in the figure; a data signal line 15 formed in the vertical direction in the figure, the scanning signal line 16 and the data signal line 15 crossing each other at right angle; a thin film transistor (TFT) 12 formed adjacent to the intersections of the signal lines (15, 16); a pixel electrode 17; and a storage capacitor wiring (Cs wiring) 18 formed in the horizontal direction in the figure. Hereinafter, the horizontal direction in the figure refers to a direction along the scanning signal line or the storage capacitor wiring, while the vertical direction in the figure refers to a direction along the data signal line.

The TFT 12 includes a source electrode 9 that is connected with the data signal line 15, and a drain electrode 8 that is connected with the pixel electrode 17, via a drain lead wiring 37, a drain lead electrode 7, and a contact hole 11. The scanning signal line 16 also serves as a gate electrode of the TFT 12. The pixel electrode 17 is made of a transparent electrode such as ITO, and transmits light (backlight) from under the active matrix substrate 10.

In the active matrix substrate 10, the TFT 12 is set in an ON state (in a state of allowing a current to flow from the source electrode 9 to the drain electrode 8) in response to a scanning signal (gate ON voltage) transmitted through the scanning signal line 16. In this state, a data signal (signal voltage) transmitted through the data signal line 15 passes through the source electrode 9, the drain electrode 8, the drain lead wiring 37, the drain lead electrode 7, and the contact hole 11, and is written in the pixel electrode 17 via the contact hole 11.

The storage capacitor wiring 18 crosses pixel areas PA respectively in the horizontal direction in the figure. The storage capacitor wiring 18 serves as one electrode (storage capacitor lower electrode) of the storage capacitor, while the drain lead electrode 7 serves as the other electrode (storage capacitor upper electrode). The storage capacitor serves, for example, as a capacitor C which maintains an electric potential written in the pixel electrode 17, until a subsequent data signal is supplied to the pixel electrode 17.

On the other hand, as shown in FIG. 1, the active matrix substrate 10 includes in its non-display region 55: an end section 16x of the scanning signal line; end sections 18x of storage capacitor wirings (Cs wirings); and a Cs trunk wiring (common wiring) 50 formed in the vertical direction in the figure. Each end section 18x of the storage capacitor wirings is connected with the Cs trunk wiring 50 via a contact hole 48, and a predetermined electric potential is supplied to each of storage capacitor wirings 18 via the Cs trunk wiring 50. Specifically, each end section 18x of the storage capacitor wirings and the Cs trunk wiring 50 cross each other at right angle in the non-display region 55, and the contact hole 48 is formed in an intersection P of them.

FIG. 2 shows a cross-sectional structure of the above intersection and its adjacent area. In the non-display region, as shown in FIG. 2, the end section 18x of the storage capacitor wiring and the end section 16x of the scanning signal line are formed on a substrate 20, and a gate insulating film 40 is provided so as to cover them. The gate insulating film 40 includes, in a region where it overlaps the end section 18x of the storage capacitor wiring: a through-bore portion 52 (located below an opening of the contact hole 48), which forms a part of the contact hole 48; and a first film thickness portion 53 which surrounds the through-bore portion 52. The gate insulating film 40 further includes a second film thickness portion 54 which surrounds the first film thickness portion 53. The second film thickness portion 54 overlaps, for example, the end section 16x of the scanning signal line. While the second film thickness portion 54 is made up of a first gate insulating layer 21 and a second gate insulating layer 22, the first film thickness portion 53 is made up only of the second gate insulating layer 22. The production process of the gate insulating film 40 is as follows: after the first gate insulating layer 21 is formed in such a manner as to cover the storage capacitor wiring 18 and the scanning signal line 16, a portion of the first gate insulating layer 21 (i.e., a portion corresponding to the first film thickness portion 53 and the through-bore portion 52) is removed by etching. Then the second gate insulating layer 22 is formed, and a portion of the second gate insulating layer 22 which portion corresponds to the through-bore portion 52 is removed by etching. This allows forming the first and second film thickness portions 53 and 54 and the through-bore portion 52.

The Cs trunk wiring 50 is formed on the gate insulating film 40, except in the area where the through-bore portion 52 is formed. In other words, the Cs trunk wiring 50 is provided with a metal absent portion 49 which entirely overlaps the through-bore portion 52 (of the gate insulating film).

Further, a first interlayer insulating film 25 is formed on the Cs trunk wiring 50. The first interlayer insulating film 25 is provided with a hole which forms a part of the contact hole 48 and overlaps the Cs trunk wiring 50. This causes a part of the Cs trunk wiring 50 to be exposed in the contact hole 48. Then a connecting electrode 38 (made of ITO) is formed so that the through-bore portion 52 of the gate insulating film, the metal absent portion 49, and the hole in the first interlayer insulating film 25 are covered with the connecting electrode 38. The end section 18x of the storage capacitor wiring and the Cs trunk wiring 50 are connected by the connecting electrode 38.

When the above arrangement is viewed from a plane angle as shown in FIG. 1, the first film thickness portion 53 entirely overlaps the intersection P (the intersection of the Cs trunk wiring with the end section of the storage capacitor wiring), and the perimeter (edges) of the first film thickness portion 53 is in the shape of a rectangle which has its long-side direction along the vertical direction in the figure. The metal absent portion 49 is in the shape of a rectangle which lies entirely within the edges of the first film thickness portion 53 and has its long-side direction along the horizontal direction in the figure. The contact hole 48 is in the shape of a rectangle which lies entirely within the edges of the first film thickness portion 53, crosses the metal absent portion 49 at right angle, and has its long-side direction along the vertical direction in the figure. Since the contact hole 48 and the metal absent portion 49 cross each other at right angle as described above, a displacement margin of them can be increased.

The contact hole 48, via which the Cs trunk wiring 50 and the end section 18x of the storage capacitor wiring are connected, is not necessarily provided singly as in FIG. 1. It is possible to provide a plurality of contact holes 49m as in FIG. 9.

As described above, when the gate insulating film in the non-display region 55 is thin in the area where the contact hole 48 is to be formed and is thick in the other area, it is possible to connect the Cs trunk wiring 50 with the end section 18x of the storage capacitor wiring with high precision, while surely preventing a short circuit between the Cs trunk wiring 50 and another wiring (e.g., the end section 16x of the scanning signal line).

The following description deals with the display region 44 of the active matrix substrate 10. The drain lead electrode 7 drawn from the drain electrode 8 of the TFT 12 and the first interlayer insulating film are formed in this order on the gate insulating film which covers the storage capacitor wiring 18. The pixel electrode 17 is formed on the first interlayer insulating film.

The drain lead electrode 7 entirely overlaps the pixel electrode 17 and the storage capacitor wiring 18. The gate insulating film in each of the pixel areas PA includes, in an area where the gate insulating film overlaps the drain lead electrode 7, a thin film portion 31 which is smaller in thickness than the surrounding area. The thin film portion 31 has the same arrangement as the first film thickness portion 53 in FIG. 2, and is therefore made up only of the second gate insulating layer 22. In addition, a portion of the gate insulating film which portion surrounds the thin film portion 31 has the same structure as the second film thickness portion (made up of the first gate insulating layer 21 and the second gate insulating layer 22). As viewed from a plane angle, the thin film portion 31 is in the shape of a rectangle which has its long-side direction along the horizontal direction and entirely overlaps the storage capacitor wiring 18 and the drain lead electrode 7. As a result, the capacitor C can be dominantly determined by the area in which the storage capacitor wiring 18, the thin film portion 31, and the drain lead electrode 7 overlap. Thus, variations in the capacitor C are less influenced by how well the storage capacitor wiring 18 is completed. Further, a contact hole 11 which entirely overlaps the thin film portion 31 and the drain lead electrode 7 is formed in each of the pixel areas PA. The drain lead electrode 7 is connected with the pixel electrode 17 via the contact hole 11.

The gate insulating film in each of the pixel areas PA is provided, also in an area where the gate insulating film overlaps the TFT 12, with a thin film portion 57 which is smaller in thickness than the surrounding area. The thin film portion 57 has the same arrangement as the first film thickness portion, and is therefore made up only of the second gate insulating layer. An area of the thin film portion 57 which area overlaps the source electrode 9 is arranged so as to be smaller than an area of the thin film portion 57 which area overlaps the drain electrode 8. As a result, it is possible to prevent a short circuit occurring between signal lines (i.e., the data signal line 15 and the scanning signal line 16) which short circuit cannot be repaired easily, as well as to maintain the properties of the TFT 12.

The first gate insulating layer 21 is made of an insulating material (e.g., a material containing an organic material); for example, a spin-on-glass (SOG) material. An SOG material refers to a material with which a glass film (silica film) can be formed by a coating method such as spin coating. Among SOG materials, a spin-on-glass material which contains an organic component (so-called organic SOG material), for example, is preferable. Among organic SOG materials, an SOG material having a skeleton of a Si—O—C bond or a Si—C bond, in particular, can be preferably used. Organic SOG materials have a low relative permittivity, and therefore a thick film of an organic SOG material can be formed easily. More specifically, the use of an organic SOG material facilitates thickly forming the first gate insulating layer 21 as well as keeping the relative permittivity of the first gate insulating layer 21 at a low level, and allows planarizing the first gate insulating layer 21. In the present embodiment, the first gate insulating layer 21 has a thickness in the range of approximately 1.5 µm to 2.0 µm. Examples of materials that contain an organic material, include an acrylic resin material, an epoxy resin, a polyimide resin, a polyurethane resin, a polysiloxane resin, a novolac resin, and the like in addition to the above SOG materials.

Examples of the SOG material which contains a Si—O—C bond include: materials disclosed in Japanese Unexamined Patent Application Publications No. 98224/2001 (Tokukai 2001-98224) and No. 240455/1994 (Tokukaihei 6-240455), respectively; and DD1100 manufactured by Dow Corning Toray Silicone Co., Ltd., disclosed in IDW '03 Proceedings, on page 617. Examples of the SOG material having a skeleton (fundamental structure) of a Si—C bond include a material disclosed in Japanese Unexamined Patent Application Publication No. 102003/1998 (Tokukaihei 10-102003).

Further, an organic SOG material which contains a silica filler can also be used for the first gate insulating layer 21. In this case, a silica filler is preferably dispersed in a base material formed of an organic SOG material. This allows forming the first gate insulating layer 21 without causing a crack, even when the substrate 20 is large. The silica filler has a particle size of 10 nm to 30 nm, for example, and the mixing ratio of the silica filler is in the range from 20% by volume to 80% by volume. LNT-025 manufactured by Catalysts & Chemicals Industries Co., Ltd., for example, can be used for the organic SOG material which contains a silica filler.

The second gate insulating layer 22 is an insulating film formed on the first gate insulating layer 21. In the present embodiment, the second gate insulating layer 22 is a film made of silicon nitride (SiNx) having a thickness of 300 nm to 500 nm (3000 Å to 5000 Å).

Each of the data signal line 15, the source electrode 9, the drain electrode 8, the Cs trunk wiring 50, and the like may be a single layer film or a laminated film, made of a metal such as titanium, chromium, aluminum, molybdenum, tantalum, tungsten, copper, and the like, or an alloy of these metals. The thickness of such films may be approximately in the range from 100 nm to 300 nm (1000 Å to 3000 Å).

The first interlayer insulating film 25 (channel protection film) is made up of an inorganic insulating film made of silicon nitride, silicon oxide or the like, a laminated film of these, or the like. In the present embodiment, the first interlayer insulating film 25 is made up of a silicon nitride film having a thickness of approximately 200 nm to 500 nm (2000 Å to 5000 Å).

The pixel electrode 17 (in the display region) and the connecting electrode 38 (in the non-display region), which are formed on the first interlayer insulating film 25, are made of an electrically conductive film having transparency such as ITO, IZO, zinc oxide, tin oxide, and the like. The thickness of the pixel electrode 17 and the connecting electrode 38 is approximately in the range from 100 nm to 200 nm (1000 Å to 2000 Å).

The following description deals with an exemplary method for producing the active matrix substrate of the present invention, with reference to FIGS. 1 and 2.

First, a film of a metal such as titanium, chromium, aluminum, molybdenum, tantalum, tungsten, copper, and the like, or an alloy of these metals is formed on a transparent insulating substrate 20 by such a method as sputtering. The metal film or the alloy film is patterned to have a required shape by such a method as photo-etching, so that the storage capacitor wirings 18 and scanning signal lines 16 (gate electrodes of individual TFTs) are formed. In the non-display region, end sections 18x of the storage capacitor wirings are formed.

Then, an SOG material or the like is applied by spin coating so as to cover the storage capacitor wirings 18 and the scanning signal lines 16, so that the first gate insulating layer 21 (planarizing film) is formed. After a photoresist is applied to the first gate insulating layer 21, exposure is carried out with use of a photomask, and then development is carried out. After that, dry-etching is carried out so that the first gate insulating layer 21 is partially removed. The dry-etching can be carried out using a mixture gas made of carbon tetrafluoride ($CF_4$) and oxygen ($O_2$), for example. Suitable adjustment of the mixing ratio of carbon tetrafluoride ($CF_4$) and oxygen ($O_2$) allows forming a portion of the first gate insulating layer in a forward tapered shape which portion is adjacent to the edge of the portion of the first gate insulating layer to be removed.

Patterning the first gate insulating layer 21 as described above allows forming: the first film thickness portion 53 in the non-display region; and thin film portions (i.e., the thin film portion 31 overlapping the storage capacitor wiring 18 and the thin film portion 57 overlapping the TFT) in the display region.

The second gate insulating layer 22 and semiconductor layers (high-resistance semiconductor layer and low-resistance semiconductor layer) are successively formed by such a method as a plasma chemical vapor deposition (CVD). The second gate insulating layer 22 and the semiconductor layers are then patterned by such a method as photo-etching.

Subsequently, data signal lines 15, source electrodes 9, drain electrodes 8, drain lead wirings 37, drain lead electrodes 7, and, in the non-display region, the Cs trunk wiring 50 are formed. All of these can be formed in the same process. Specifically, a film of a metal such as titanium, chromium, aluminum, molybdenum, tantalum, tungsten, copper, and the like, or an alloy of these metals is formed by such a method as sputtering. The metal film or the alloy film is then patterned to have a required shape by such a method as photo-etching.

While the high-resistance semiconductor layer (i layer) made up of a film such as an amorphous silicon film and the low-resistance semiconductor layer (n+ layer) made up of a film such as an n+ amorphous silicon film are subjected to channel etching by way of dry-etching, using patterns of the data signal lines 15, the source electrodes 9, and the drain electrodes 8 as masks. The thickness of the i layer is optimized in this process, so that the TFT 12 is formed. Specifically, portions of the semiconductor layers which portions are not covered by the data lines 15, the source electrodes 8, or the drain electrode 9s are removed by etching. This causes the i layer to have a thickness which is necessary for the TFT 12 to perform its function.

Then, the first interlayer insulating film 25 is formed which protects the channels (covers the channels) of the TFT 12. In the present embodiment, the first interlayer insulating film 25 is made up of an inorganic insulating film that is made of silicon nitride, silicon oxide, or the like by such a method as a plasma CVD.

After that, in the display region, a hole is formed in the first interlayer insulating film 25 by etching, in correspondence with the position of the contact hole 11. Further, in the non-display region, a hole is formed in the first interlayer insulating film 25 and in the second gate insulating layer 22 by etching, in correspondence with the position of the contact hole 48. In this process, a photosensitive resist is patterned by photolithography (exposure and development), for example, and then etching is carried out.

Next, the electrically conductive film having transparency such as ITO, IZO, zinc oxide, tin oxide, and the like is formed on the first interlayer insulating film and in the respective holes of the insulating layers (25, 22) by such a method as sputtering. The electrically conductive film is patterned to have a required shape by such a method as photo-etching. This allows forming a pixel electrode 17 in the display region. The pixel electrode 17 and the drain lead electrode 7 are connected in the contact hole 11. Further, the connecting electrode 38 is formed in the non-display region, so that the Cs trunk wiring 50 and the end section 18x of the storage capacitor wiring are connected in the contact hole 48.

Figure 3:
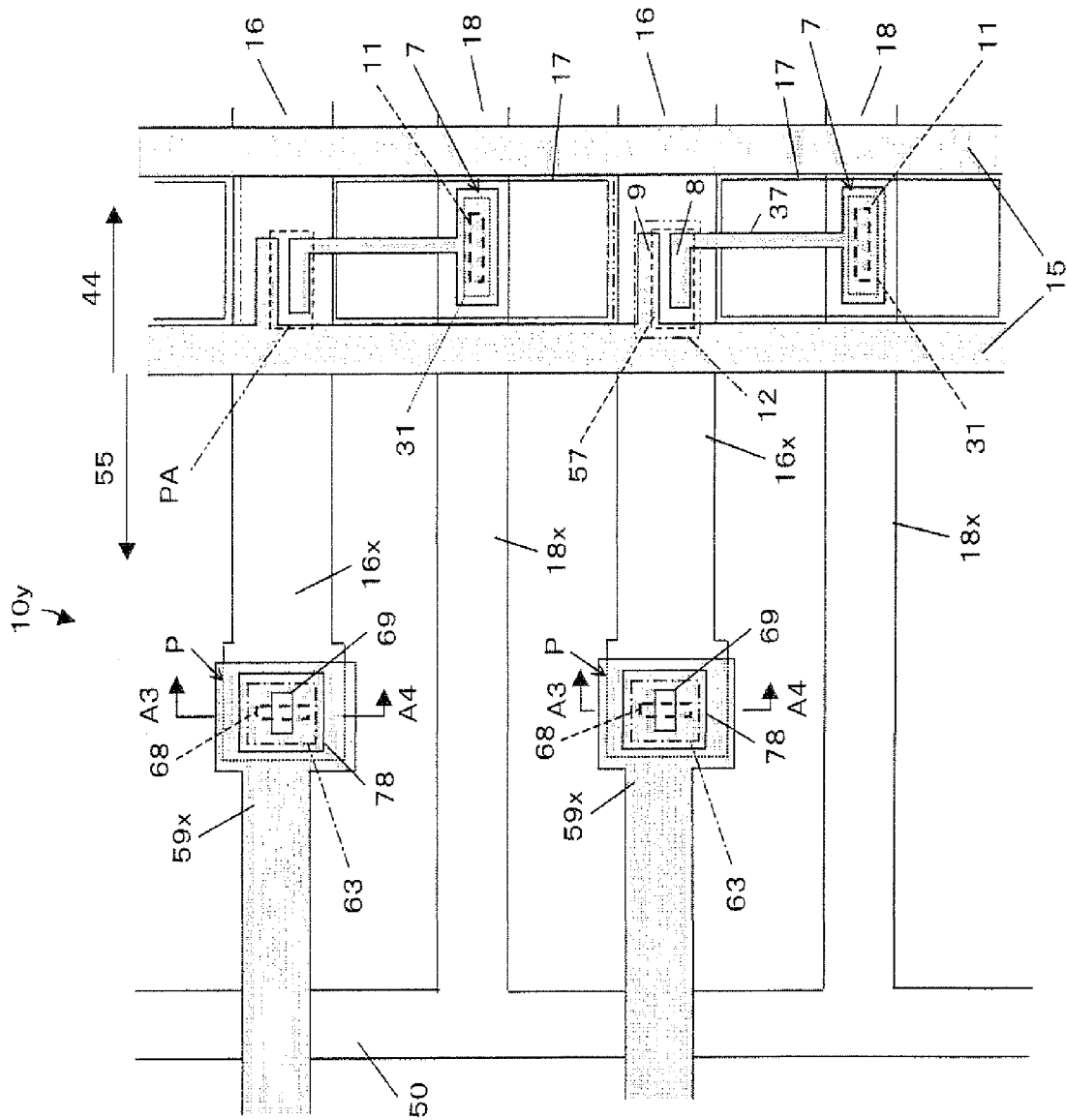
FIG. 3 is a plan view of another arrangement of the active matrix substrate.

The present active matrix substrate may be arranged as in FIG. 3. As shown in FIG. 3, an active matrix substrate 10y includes in its non-display region 55: an end section 16x of a scanning signal line formed in the horizontal direction in the figure; an end section 59x of a gate lead wiring formed in the horizontal direction in the figure; an end section 18x of a storage capacitor wiring (Cs wiring) formed in the horizontal direction in the figure; and a Cs trunk wiring (common wiring) 50 formed in the vertical direction in the figure. The arrangement of the display region 44 is the same as in FIG. 1. The end section 16x of the scanning signal line is connected with the end section 59x of the gate lead wiring, via a contact hole 68. Specifically, the end section 16x of the scanning signal line overlaps the end section 59x of the gate lead wiring in the non-display region 55, and the contact hole 68 is formed in the overlapping portion P.

Figure 4:
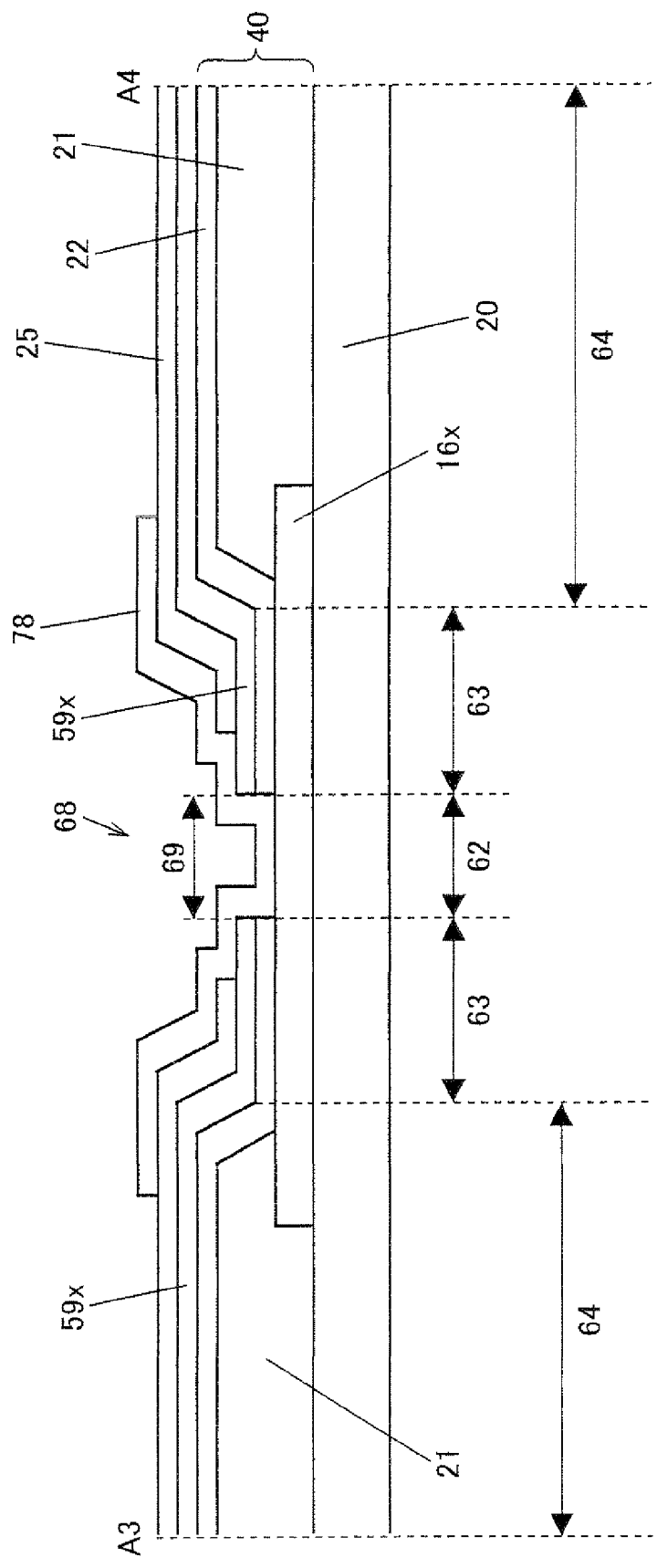
FIG. 4 is a sectional view taken along arrows A3-A4 shown in FIG. 3.

FIG. 4 shows a cross-sectional structure (a cross-sectional view taken along line A3-A4 of FIG. 3) of the above overlapping portion P and its adjacent area. As shown in FIG. 4, the end section 16x of the scanning signal line is formed on a substrate 20, and a gate insulating film 40 is formed so as to cover the end section 16x of the scanning signal line. The gate insulating film 40 includes, in a region where it overlaps the end section 16x of the scanning signal line: a through-bore portion 62 (located at a lower portion of the contact hole 68), which forms a part of the contact hole 68; and a first film thickness portion 63 which surrounds the through-bore portion 62. Further, the gate insulating film 40 includes a second film thickness portion 64 which surrounds the first film thickness portion 63. The second film thickness portion 64 overlaps, for example, the Cs trunk wiring 50. While the second film thickness portion 64 is made up of a first gate insulating layer 21 and a second gate insulating layer 22, the first film thickness portion 63 is made up only of the second gate insulating layer 22. The production process of the gate insulating film 40 is as follows: after the first gate insulating layer 21 is formed so as to cover the storage capacitor wiring 18 and the scanning signal line 16, a portion of the first gate insulating layer 21 (i.e., a portion corresponding to the first film thickness portion 63 and the through-bore portion 62) is removed by etching. Then the second gate insulating layer 22 is formed, and a portion of the second gate insulating layer 22 which portion corresponds to the through-bore portion 62 is removed by etching. This allows forming the first and second film thickness portions 63 and 64 and the through-bore portion 62.

The end section 59x of the gate lead wiring is formed on the gate insulating film 40, except in the area where the through-bore portion 62 is formed. In other words, the end section 59x of the gate lead wiring is provided with a metal absent portion 69 which entirely overlaps the through-bore portion 62 of the gate insulating film.

A first interlayer insulating film 25 is formed on the end section 59x of the gate lead wiring. The first interlayer insulating film 25 is provided with a hole which forms a part of the contact hole 68 and overlaps the end section 59x of the gate lead wiring. This causes a part of the end section 59x of the gate lead wiring to be exposed in the contact hole. A connecting electrode 78 (made of ITO) is formed so that holes of the through-bore portion 62 of the gate insulating film, the metal absent portion 69, and the hole of the first interlayer insulating film 25 are embedded. The end section 16x of the scanning signal line and the end section 59x of the gate lead wiring are connected by the connecting electrode 78.

When the above arrangement is viewed from a plane angle as shown in FIG. 3, the first film thickness portion 63 entirely overlaps the intersection P (the intersection of the end section of the gate lead wiring with the end section of the scanning signal line), and the perimeter (edges) of the first film thickness portion 63 is in the shape of a rectangle which has its long-side direction along the vertical direction in the figure. The metal absent portion 69 is in the shape of a rectangle which lies entirely within the edges of the first film thickness portion 63 and has its long-side direction along the horizontal direction in the figure. The contact hole 68 is in the shape of a rectangle which lies entirely within the edges of the first film thickness portion 63, crosses the metal absent portion 69 at right angle, and has its long-side direction along the vertical direction in the figure.

Figure 35:
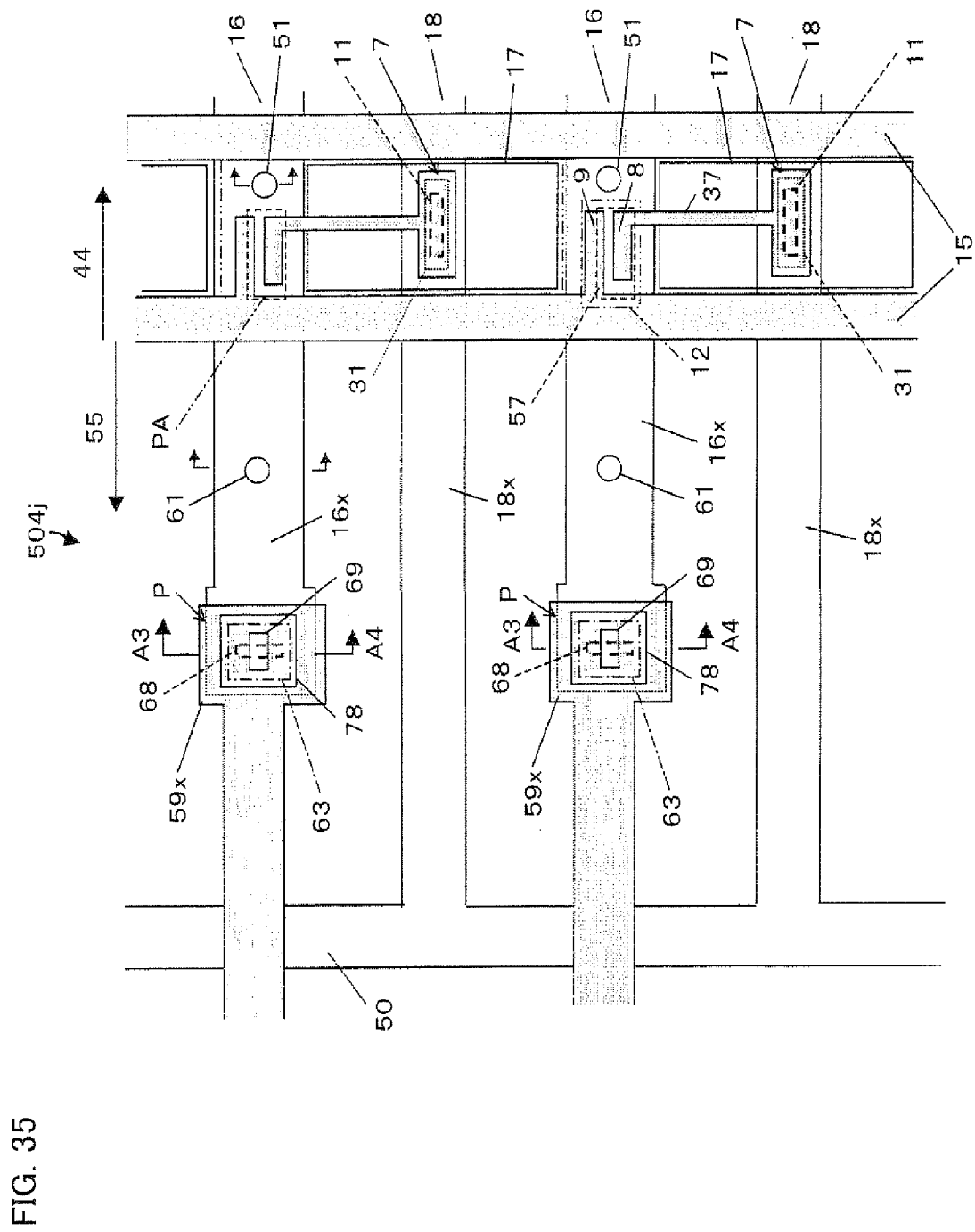
FIG. 35 is a plan view of an arrangement of a liquid crystal panel which includes the active matrix substrate shown in FIG. 3.

FIG. 35 shows an arrangement of a liquid crystal panel which includes the active matrix substrate 10y shown in FIG. 3 and a color filter substrate (CF substrate). Among the constituent members of the color filter substrate, only photo spacers are shown in FIG. 35. As shown in FIG. 35, the liquid crystal panel 504j includes: photo spacers 51 (first spacers) provided so as to overlap scanning signal lines 16 in the display region 44; and photo spacers 61 (second spacers) provided so as to overlap end sections 16x of the scanning signal lines in the non-display region 55. Although not shown in FIG. 35, the photo spacers 51 are provided at an interval in the horizontal direction in the figure, so as to overlap the scanning signal lines 16 in the display region 44.

The photo spacers 51 and 61 are columnar spacers provided on the CF substrate. Alternatively, they may be provided on the active matrix substrate.

Figure 36:
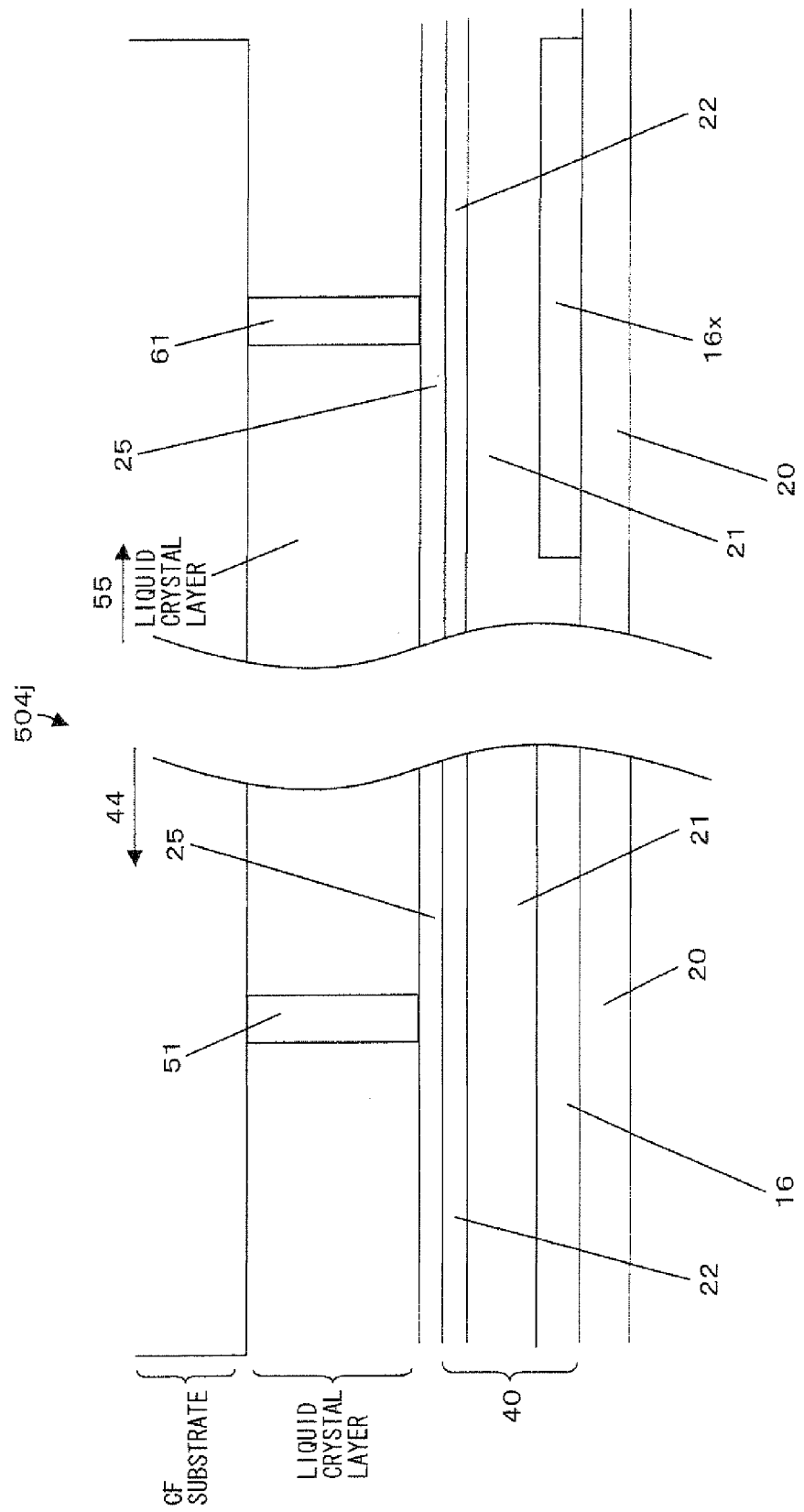
FIG. 36 is a cross sectional view taken along the arrows shown in the display region and a cross sectional view taken along the arrows shown in the non-display region in the liquid crystal panel shown in FIG. 35.
Figure 37:
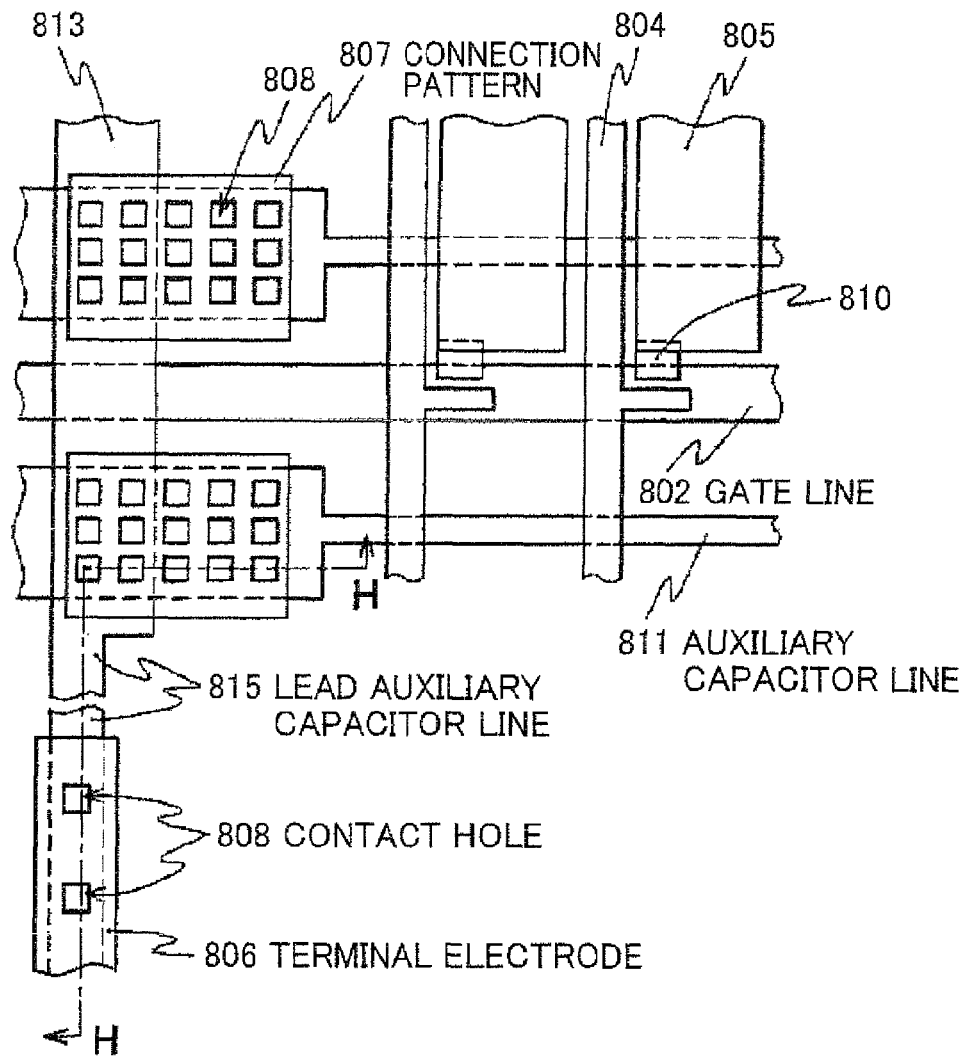
FIG. 37 (a) is a plan view of an arrangement of a conventional active matrix substrate.
Figure 37:
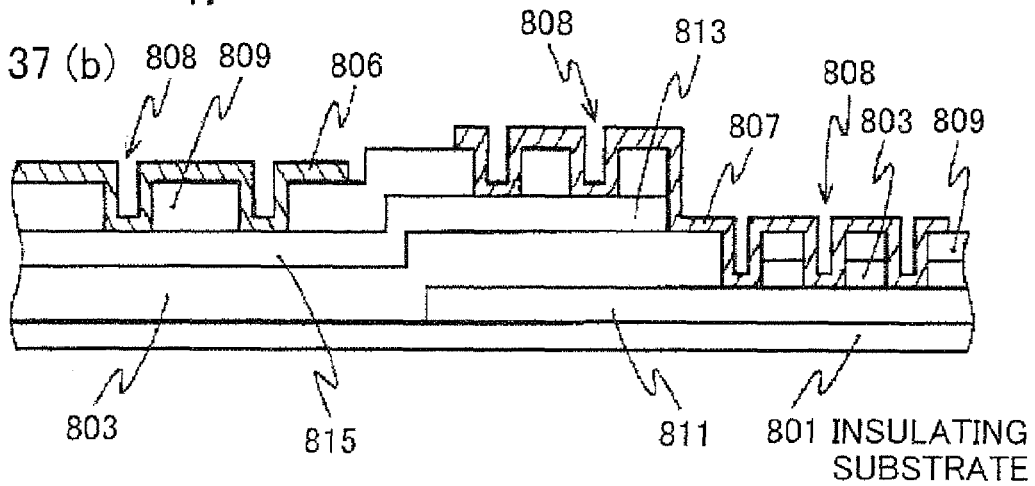

FIG. 36 shows (i) a cross-sectional view taken along the arrows shown in the display region of FIG. 35, including a photo spacer 51, and (ii) a cross-sectional view taken along the arrows shown in the non-display region of FIG. 35, including a photo spacer 61. As shown in FIG. 36, provided below the photo spacer 51 in the display region are: the scanning signal line 16; the first gate insulating layer 21; the second gate insulating layer 22; and the first interlayer insulating film 25, in this order from the transparent insulating substrate 20. Further, provided below the photo spacer 61 in the non-display region are: an end section 16x of the scanning signal line; the first gate insulating layer 21; the second gate insulating layer 22; and the first interlayer insulating film 25, in this order from the transparent insulating substrate 20.

The structure of the active matrix substrate below the photo spacer in the non-display region is the same as that in the display region with the arrangement in FIG. 35 as well. This facilitates setting the height of each of the photo spacers 51 and 61 and allows reducing the difference between the cell gap in the display region 44 and that in the non-display region 55.

Figure 5:
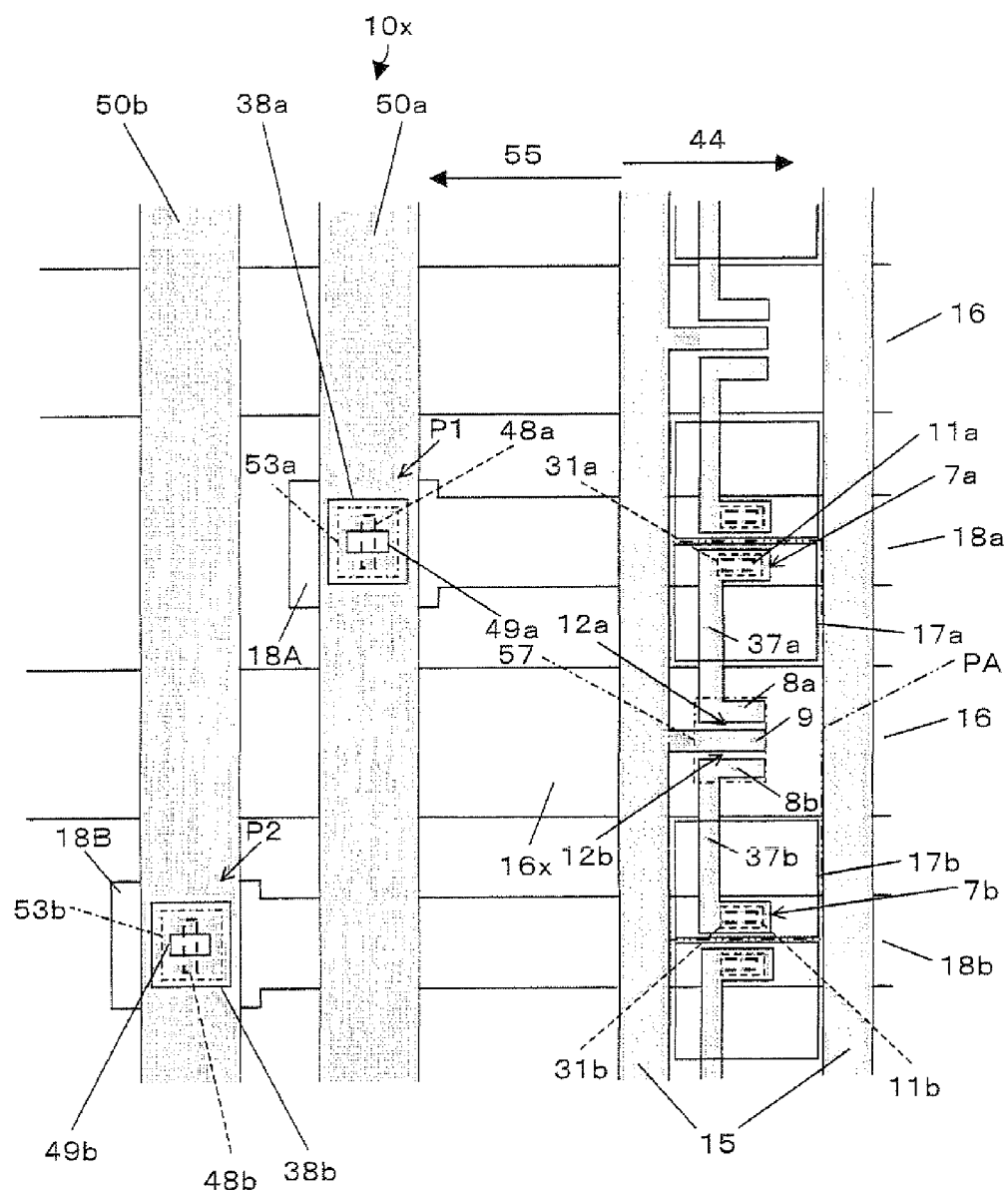
FIG. 5 is a plan view of another arrangement of the active matrix substrate.

The active matrix substrate may be arranged as in FIG. 5. This active matrix substrate is used for multi-pixel driving, in which multiple regions having different luminances are formed in one sub-pixel (which corresponds to one of R, G, and B).

As shown in FIG. 5, an active matrix substrate 10x includes in its display region 44: a scanning signal line 16 formed in the horizontal direction in the figure; a data signal line 15 formed in the vertical direction in the figure, the scanning signal line 16 and the data signal line 15 crossing each other at right angle; first and second TFTs 12a and 12b formed adjacent to the intersection of the signal lines (15, 16); first and second pixel electrodes 17a and 17b; and first and second storage capacitor wirings (Cs wirings) 18a and 18b formed in the horizontal direction in the figure. One pixel area PA encompasses the first and second TFTs 12a and 12b and the first and second pixel electrodes 17a and 17b.

The first TFT 12a includes a source electrode 9 that is connected with the data signal line 15, and a drain electrode 8a that is connected with the first pixel electrode 17a, via a drain lead wiring 37a, a drain lead electrode 7a, and a contact hole 11a. Similarly, the second TFT 12b includes a source electrode 9 that is connected with the data signal line 15, and a drain electrode 8b that is connected with the second pixel electrode 17b, via a drain lead wiring 37b, a drain lead electrode 7b, and a contact hole 11b. The scanning signal line 16 serves as a gate electrode of each of the first and second TFTs 12a and 12b.

In the present active matrix substrate, the first storage capacitor wiring 18a overlaps the drain lead electrode 7a, while the second storage capacitor wiring 18b overlaps the drain lead electrode 7b. The drain lead electrode 7a serves as one electrode of a capacitor C1, and the first storage capacitor wiring 18a serves as the other electrode of the capacitor C1. Similarly, the drain lead electrode 7b serves as one electrode of a capacitor C2, and the second storage capacitor wiring 18b serves as the other electrode of the capacitor C2. The capacitors C1 and C2 serve both as capacitors for respectively controlling the electric potentials of the respective pixel electrodes and as storage capacitors of the electric potentials of the respective pixel electrodes.

Specifically, according to the present active matrix substrate, data (signal electric potential) is supplied from the data signal line 15 to the first and second pixel electrodes 17a and 17b, via the source electrode 9 which is common to the TFTs (12a, 12b), the drain electrodes 8a and 8b, and the like, respectively. Further, signal voltages having phases reverse to each other are applied to the first and second storage capacitor wirings 18a and 18b, so that the first and second pixel electrodes 17a and 17b are controlled so as to have electric potentials different from each other. This allows forming a bright region and a dark region in one pixel area and displaying a halftone by area coverage modulation (pulse-surface-area modulation). As a result, it is possible to improve display quality, e.g., to reduce excess brightness (white-tinged phenomena) associated with oblique viewing angles.

The active matrix substrate 10x includes in its non-display region 55: end sections 16x of the scanning signal lines; end sections 18A and 18B of the first and second storage capacitor wirings (Cs wirings); and first and second Cs trunk wirings (common wirings) 50a and 50b formed in the vertical direction in the figure.

The end section 18A of the first storage capacitor wiring is connected with the first Cs trunk wiring 50a via a contact hole 48a, and a signal electric potential is supplied to the first storage capacitor wiring 18a via the first Cs trunk wiring 50a. Specifically, the end section 18A of the first storage capacitor wiring and the first Cs trunk wiring 50a cross each other in the non-display region 55, and the contact hole 48a is formed in an intersection P1 of the end section 18A and the first Cs trunk wiring 50a. Similarly, the end section 18B of the second storage capacitor wiring is connected with the second Cs trunk wiring 50b via a contact hole 48b, and a signal electric potential (having a phase reverse to the phase of the signal electric potential supplied to the first storage capacitor wiring 18a) is supplied to the second storage capacitor wiring 18b via the second Cs trunk wiring 50b. Specifically, the end section 18B of the second storage capacitor wiring and the second Cs trunk wiring 50b cross each other in the non-display region 55, and the contact hole 48b is formed in an intersection P2 of the end section 18B and the second Cs trunk wiring 50b.

The active matrix substrate 10x includes, at a position that overlaps the intersection P1: a first film thickness portion 53a; a metal absent portion 49a; a connecting electrode 38a; and the contact hole 48a. The first film thickness portion 53a is a portion of a gate insulating film which portion is thinner than the surrounding area (i.e., made up only of the first gate insulating layer). The gate insulating film further includes a second film thickness portion (not shown) which is large in thickness and provided so as to surround the first film thickness portion 53a. The second film thickness portion overlaps the end section 16x of the scanning signal line and the first Cs trunk wiring 50a, for example. The metal absent portion 49a is a portion of the first Cs trunk wiring 50a which portion has been bored through, and overlaps a through-bore portion of the gate insulating film.

The first film thickness portion 53a entirely overlaps the intersection P1 (the intersection of the first Cs trunk wiring 50a and the end section 18A of the first storage capacitor wiring), and the perimeter (edges) of the first film thickness portion 53a is in the shape of a rectangle which has its long-side direction along the vertical direction in the figure. The metal absent portion 49a is in the shape of a rectangle which lies entirely within the edges of the first film thickness portion 53a and has its long-side direction along the horizontal direction in the figure. The contact hole 48a is in the shape of a rectangle which lies entirely within the edges of the first film thickness portion 53a, crosses the metal absent portion 49a at right angle, and has its long-side direction along the vertical direction in the figure. The connecting electrode 38a (made of ITO) is formed so as to overlap the metal absent portion 49a and the contact hole 48a, and connects the first Cs trunk wiring 50a and the end section 18A of the first storage capacitor wiring.

The active matrix substrate 10x includes, at a position that overlaps the intersection P2: a first film thickness portion 53b; a metal absent portion 49b; a connecting electrode 38b; and a contact hole 48b. The first film thickness portion 53b is a portion of the gate insulating film which portion is thinner than the surrounding area (i.e., made up only of the first gate insulating layer). The gate insulating film further includes a second film thickness portion (not shown) which is large in thickness and provided so as to surround the first film thickness portion 53b. The second film thickness portion overlaps the end section 16x of the scanning signal line and the second Cs trunk wiring 50b, for example.

The metal absent portion 49b is a portion of the second Cs trunk wiring 50b which portion has been bored through, and overlaps a through-bore portion of the gate insulating film. The first film thickness portion 53b entirely overlaps the intersection P2 (the intersection of the second Cs trunk wiring 50b and the end section 18B of the second storage capacitor wiring), and the perimeter (edges) of the first film thickness portion 53b is in the shape of a rectangle which has its long-side direction along the vertical direction in the figure. The metal absent portion 49b is in the shape of a rectangle which lies entirely within the edges of the first film thickness portion 53b and has its long-side direction along the horizontal direction in the figure. The contact hole 48b is in the shape of a rectangle which lies entirely within the edges of the first film thickness portion 53b, crosses the metal absent portion 49b at right angle, and has its long-side direction along the vertical direction in the figure. The connecting electrode 38b (made of ITO) is formed so as to overlap the metal absent portion 49b and the contact hole 48b, and connects the second Cs trunk wiring 50b and the end section 18B of the second storage capacitor wiring.

The display region 44 is arranged as follows. The drain lead electrode 7a entirely overlaps the first pixel electrode 17a and the first storage capacitor wiring 18a. The gate insulating film in each of the pixel areas PA includes, in an area where the gate insulating film overlaps the drain lead electrode 7a, a thin film portion 31a which is smaller in film thickness than the surrounding area. The thin film portion 31a has the same arrangement as the first film thickness portions 53a and 53b (see FIG. 5), and is made up only of the second gate insulating layer 22. In addition, the portion of the gate insulating film that surrounds the thin film portion 31a has the same structure as the second film thickness portion (made up of the first gate insulating layer 21 and the second gate insulating layer 22).

As viewed from a plane angle, the thin film portion 31a is in the shape of a rectangle which has its long-side direction along the horizontal direction, and entirely overlaps the first storage capacitor wiring 18a and the drain lead electrode 7a. Consequently, the capacitor C1 can be dominantly determined by the area in which the storage capacitor wiring 18a, the thin film portion 31a, and the drain lead electrode 7a overlap. Further, a contact hole 11a which entirely overlaps the thin film portion 31a is provided in each of the pixel areas PA. The drain lead electrode 7a is connected with the first pixel electrode 17a via the contact hole 11a.

The drain lead electrode 7b entirely overlaps the second pixel electrode 17b and the second storage capacitor wiring 18b. The gate insulating film in each of the pixel areas PA includes, in an area where the gate insulating film overlaps the drain lead electrode 7b, a thin film portion 31b which is smaller in film thickness than the surrounding area. The thin film portion 31b has the same arrangement as the first film thickness portions 53a and 53b (see FIG. 5), and is made up only of the second gate insulating layer 22. In addition, the portion of the gate insulating film that surrounds the thin film portion 31b has the same structure as the second film thickness portion. As viewed from a plane angle, the thin film portion 31b is in the shape of a rectangle which has its long-side direction along the horizontal direction, and entirely overlaps the second storage capacitor wiring 18b and the drain lead electrode 7b. Consequently, the capacitor C2 can be dominantly determined by the area in which the storage capacitor wiring 18b, the thin film portion 31b, and the drain lead electrode 7b overlap. Further, a contact hole 11b which entirely overlaps the thin film portion 31b is provided in each of the pixel areas. The drain lead electrode 7b is connected with the second pixel electrode 17b via the contact hole 11b.

When the active matrix substrate 10x is used in an MVA liquid crystal panel, each of the first and second pixel electrodes 17a and 17b is provided with a slit, for example, having a sideway V shape (V shape rotated by 90 degrees).

Figure 15:
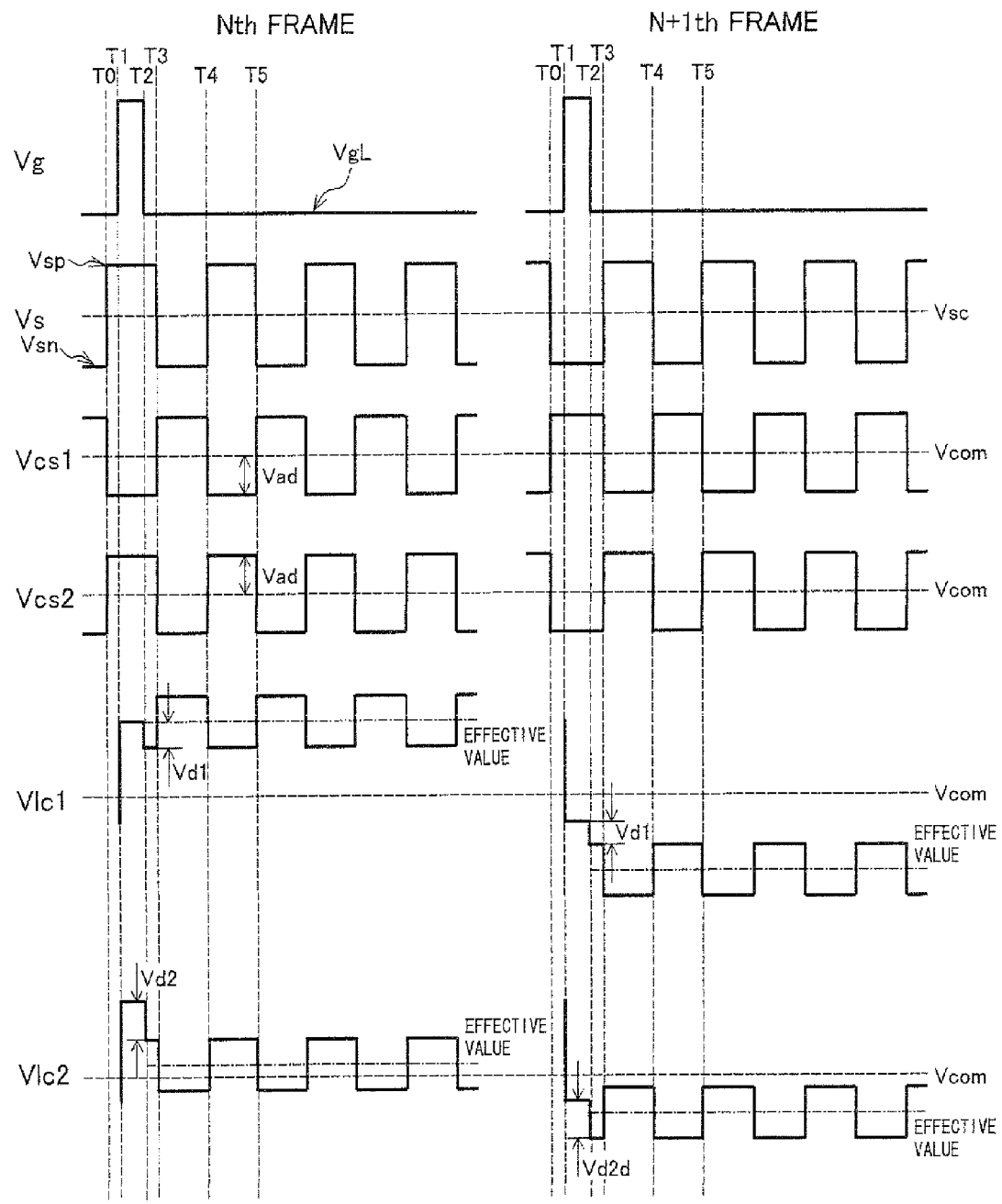
FIG. 15 is a timing chart showing a method for driving the active matrix substrate shown in FIG. 5.

FIG. 15 is a timing chart showing operations of the individual constituent members of FIG. 5. Vg refers to a voltage supplied to the scanning signal line 16; Vs refers to a voltage (source voltage) supplied to the data signal line 15; Vcs1 refers to a voltage supplied to the first storage capacitor wiring 18a; Vcs2 refers to a voltage supplied to the second storage capacitor wiring 18b; Vlc1 refers to a voltage supplied to the first pixel electrode 17a; and Vlc2 refers to a voltage supplied to the second pixel electrode 17b. A liquid crystal display device is generally subjected to alternating current driving such as a frame inversion, a line inversion, and a dot inversion so that liquid crystals are not polarized. Specifically, a source voltage (Vsp) having a positive polarity with respect to a central value Vsc of the source voltage is supplied in the nth frame. In the subsequent (n+1)th frame, a voltage (Vsn) having a negative polarity with respect to Vsc is supplied, while a dot inversion is carried out for every frame. The voltages supplied to the first storage capacitor wiring 18a and the second storage capacitor wiring 18b are oscillated so as to have an amplitude Vad, while the two voltages are caused to have phases which are shifted by 180 degrees from each other. In other words, the two voltages are controlled so that, immediately after Vg is caused to be "Low (L)" (i.e., both of the TFTs 12a and 12b are turned off) at T2, Vcs1 is caused to be "High (H)", and Vcs2 is caused to be "L".

Figure 16:
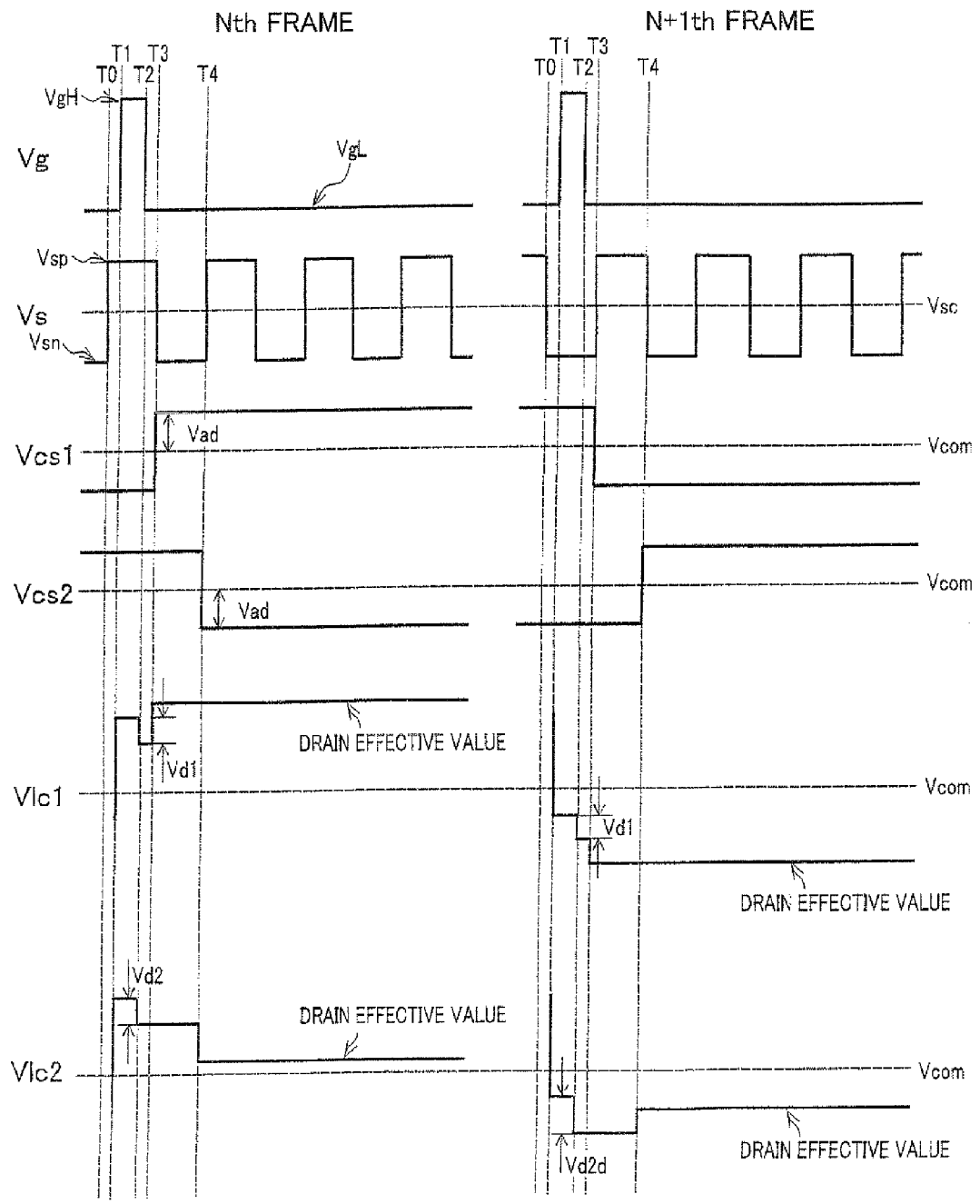
FIG. 16 is a timing chart showing another method for driving the active matrix substrate shown in FIG. 5.

A control may be performed as in FIG. 16 such that Vcs1 has a waveform which is caused to be "High" at T3 and then to remain "High" (or to be "Low" at T3 and then to remain "Low") immediately after Vg is caused to be "L" (i.e., both of the TFTs 12a and 12b are turned off) at T2, and that Vcs2 has a waveform which is caused to be "Low" at T4 (one horizontal (1H) period after T3) and then to remain "Low" (or to be "High" at T4 and then to remain "High"). More specifically, an electric potential is controlled so that after the transistors are turned off, Vcs1 is raised to be high and, during a current frame, to remain in the state of being high, and that Vcs2 is dropped to be low 1H period after Vcs1 is raised to be high, and, during the current frame, to remain in the state of being. Alternatively, an electric potential is controlled so that after the transistors are turned off, Vcs1 is dropped to be low and, during a current frame, to remain in the state of being low, and that Vcs2 is raised to be high 1H period after Vcs1 is dropped to be low, and, during the current frame, to remain in the state of being. In consequence of this, a drain effective electric potential is less influenced by unsharpness (dullness) of the waveforms of Vcs1 and Vcs2, and therefore luminance unevenness is effectively reduced.

Figure 17:
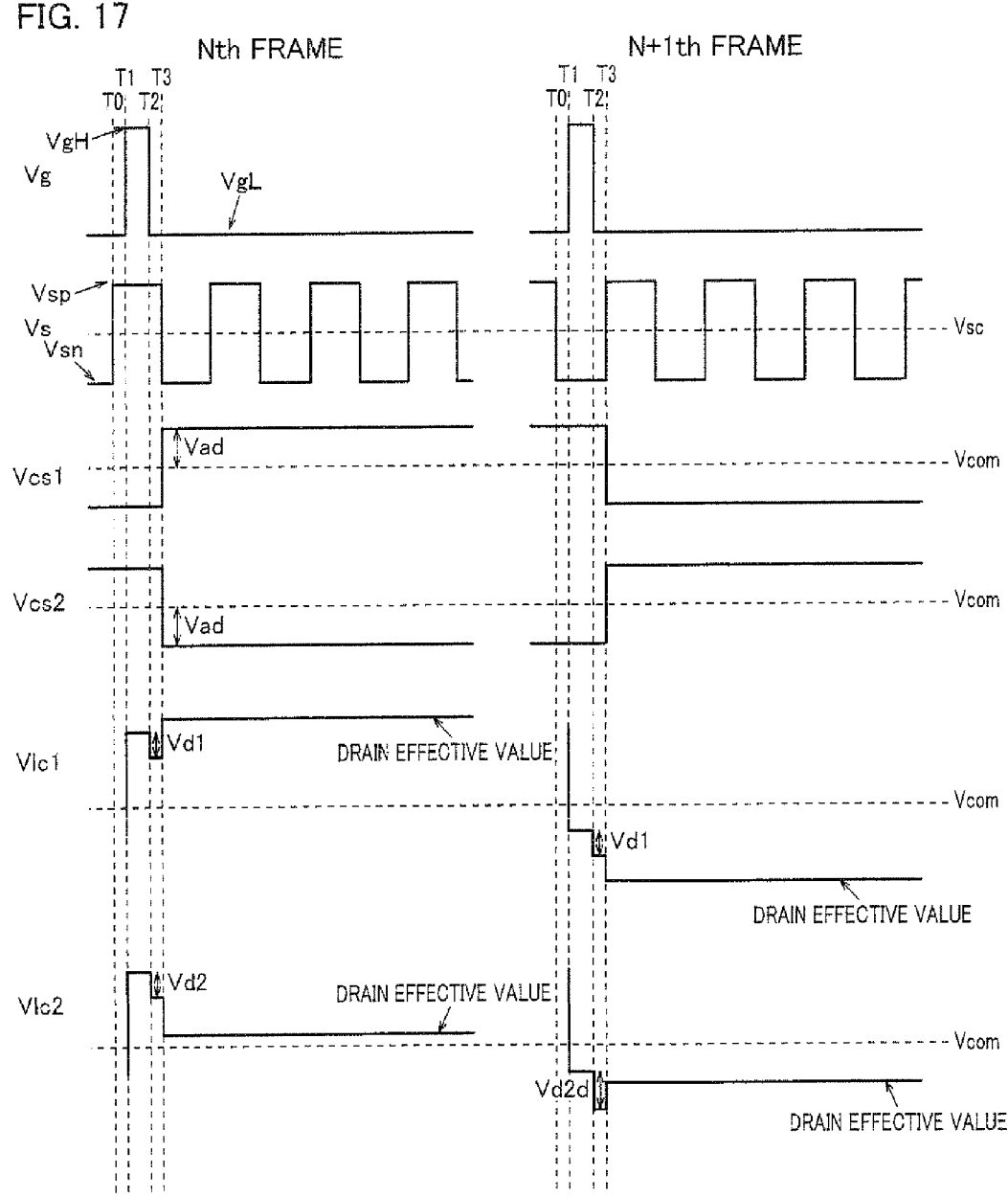
FIG. 17 is a timing chart showing another method for driving the active matrix substrate.

The active matrix substrate shown in FIG. 5 is arranged such that each of the storage capacitor wirings is shared by pixels which are adjacent vertically (in the direction along the data signal line). In a case of an arrangement in which each of the storage capacitor wirings is not shared by pixels which are adjacent vertically, a control may be performed such that, as shown in FIG. 17, Vcs1 has a waveform which is caused to be "High" at T3 (i.e., immediately after Vg is caused to be "L" (i.e., both of the TFTs 12a and 12b are turned off) at T2) and then to remain "High" (or to be "Low" at T3 and then to remain "Low"), and that similarly Vcs2 has a waveform which is caused to be "Low" at T3 (i.e., immediately after Vg is caused to be "L" at T2) and then to remain "Low" (or to be "High" at T3 and then to remain "High"). More specifically, an electric potential is controlled so that after the transistors are turned off, Vcs1 is raised to be high and, during a current frame, to remain in the state of being high, and that Vcs2 is dropped to be low in synchronization with raising Vcs1 to be high, and, during the current frame, to remain in the state of being low. Alternatively, an electric potential is controlled so that after the transistors are turned off, Vcs1 is dropped to be low and, during a current frame, to remain in the state of being low, and that Vcs2 is raised to be high in synchronization with dropping Vcs1 to be low, and, during the current frame, to remain in the state of being high. In this case as well, a drain effective electric potential is less influenced by unsharpness of the waveforms of Vcs1 and Vcs2, and therefore luminance unevenness is effectively reduced.

Figure 18:
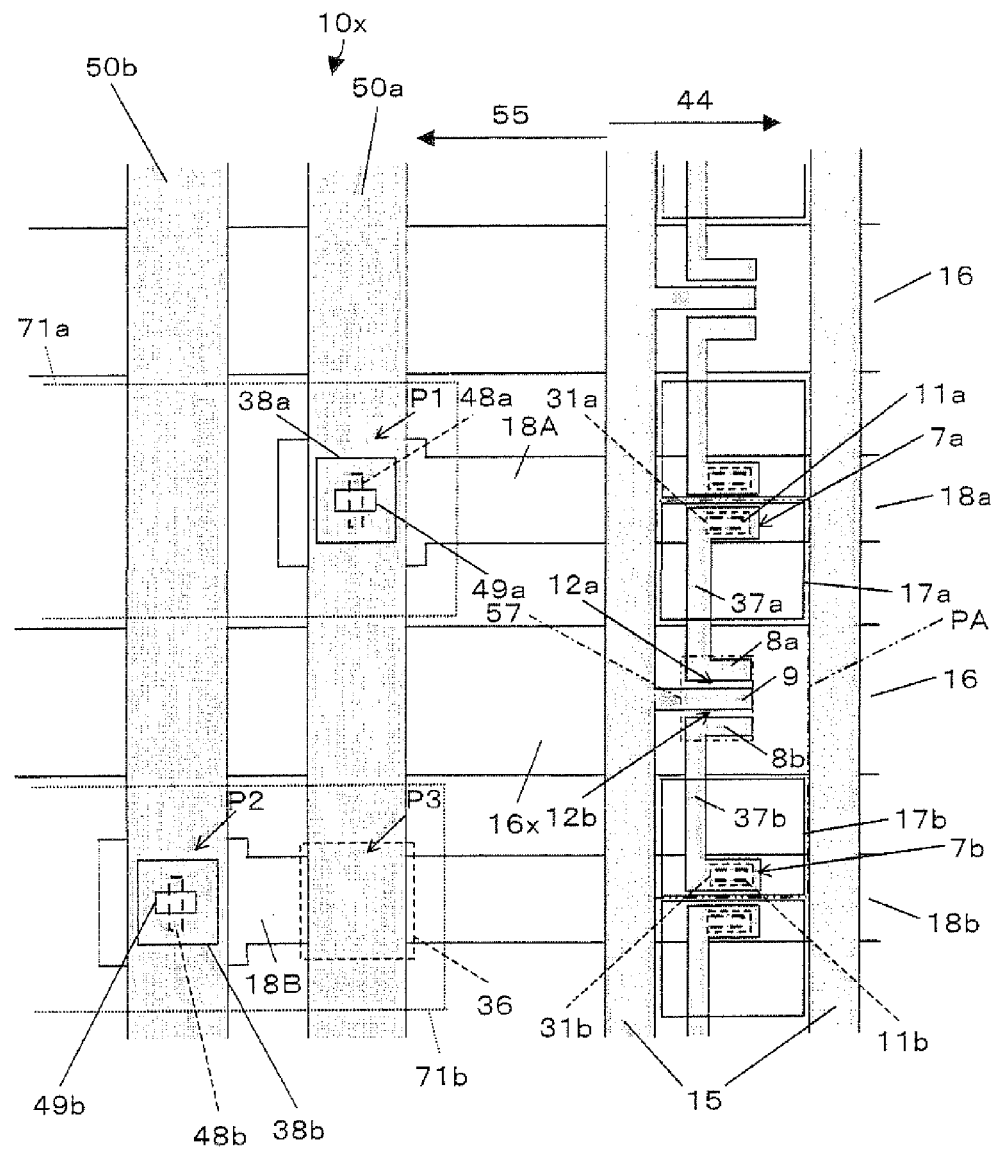
FIG. 18 is a plan view of a modification of the active matrix substrate shown in FIG. 5.

The active matrix substrate 10x may be modified as in FIG. 18. Specifically, the first film thickness portion (a thin portion of the gate insulating film) is formed so as to cover as large portions of the first and second Cs trunk wirings 50a and 50b as possible which portions are sandwiched by two adjacent scanning signal lines.

In the active matrix substrate shown in FIG. 18, the perimeter of a first film thickness portion 71a is in the shape of a rectangle which encompasses the intersection P1 and has its long-side direction along the horizontal direction in the figure. One side of the rectangle, extending in the horizontal direction, (i) is close to one of the two scanning signal lines which sandwich the end section 18A of the first storage capacitor wiring, and (ii) crosses the first Cs trunk wiring 50a and the second Cs trunk wiring 50b. Meanwhile, the other side extending in the horizontal direction (i) is close to the other scanning signal line, and (ii) crosses the first Cs trunk wiring 50a and the second Cs trunk wiring 50b. The metal absent portion 49a is in the shape of a rectangle which lies entirely within the intersection P1 and has its long-side direction along the horizontal direction in the figure. The contact hole 48a is in the shape of a rectangle which lies entirely within the intersection P1, crosses the metal absent portion 49a at right angle, and has its long-side direction along the vertical direction in the figure.

The perimeter of a first film thickness portion 71b (a thin portion of the gate insulating film) shown in FIG. 18 is in the shape of a rectangle which encompasses the intersection P2 and an intersection P3 (an intersection of the first Cs trunk wiring 50a and the end section 18B of the second storage capacitor wiring), and has its long-side direction along the horizontal direction in the figure. One side of the rectangle, extending in the horizontal direction, (i) is close to one of the two scanning signal lines which sandwich the end section 18B of the first storage capacitor wiring, and (ii) crosses the first Cs trunk wiring 50a and the second Cs trunk wiring 50b. Meanwhile, the other side extending in the horizontal direction (i) is close to the other scanning signal line, and (ii) crosses the first Cs trunk wiring 50a and the second Cs trunk wiring 50b. It should be noted that the intersection P3 is made up of a second film thickness portion 36 (a thick portion of the gate insulating film). The metal absent portion 49b is in the shape of a rectangle which lies entirely within the intersection P2 and has its long-side direction along the horizontal direction in the figure. The contact hole 48b is in the shape of a rectangle which lies entirely within the intersection P2, crosses the metal absent portion 49b at right angle, and has its long-side direction along the vertical direction in the figure.

According to the active matrix substrate in FIG. 18, since the electric potential of the first Cs trunk wiring 50a is different from that of a common electrode formed on a counter substrate (CF substrate; not shown), the electric potential waveform of the first Cs trunk wiring 50a (and consequently of the first storage capacitor wiring 18) may become dull due to a parasitic capacitance between the first Cs trunk wiring 50a and the common electrode. However, by forming the first film thickness portion 71a (a thin portion of the gate insulating film) so as to cover as large portions of the first and second Cs trunk wirings 50a and 50b as possible which portions are sandwiched by two adjacent scanning signal lines as in the above arrangement, it is possible to lower a position of as large a portion of the first Cs trunk wiring 50a as possible (toward the glass substrate). This causes the space between the first Cs trunk wiring 50a and the counter substrate (CF) to be wide, so that the parasitic capacitance is reduced. As a result, the electric potential waveform of each of the Cs trunk wirings can be sharpened. The same principle holds true of the first film thickness portion 71b. In addition, since the portion of the gate insulating film which portion corresponds to the intersection P3 is made up of the second film thickness portion 36 (the thick portion of the gate insulating film), it is also possible to prevent a short circuit occurring between the first Cs trunk wiring 50a and the end section 18B of the second storage capacitor wiring.

Figure 19:
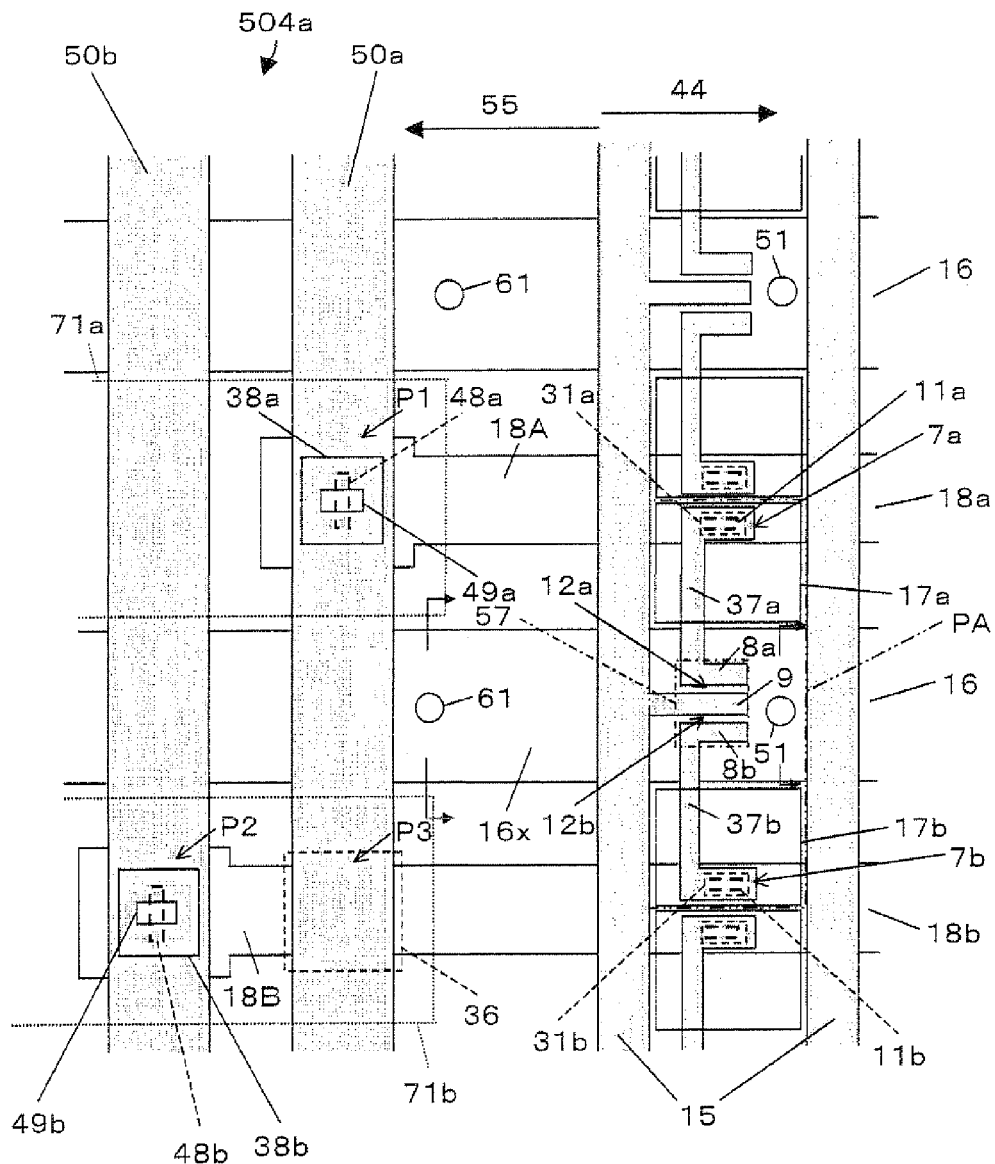
FIG. 19 is plan view of an arrangement of a liquid crystal panel which includes the active matrix substrate shown in FIG. 18.

FIG. 19 shows an arrangement of a liquid crystal panel which includes the active matrix substrate shown in FIG. 18 and a color filter substrate (referred to as a CF substrate when appropriate). Among the constituent members of the CF substrate, only photo spacers are shown in FIG. 19. As shown in FIG. 19, a liquid crystal panel 504a includes: photo spacers 51 (first spacers) provided so as to overlap the scanning signal lines 16 in the display region 44; and photo spacers 61 (second spacers) provided so as to overlap the end sections 16x of the scanning signal lines in the non-display region 55. Although not shown in FIG. 19, the photo spacers 51 are provided at an interval in the horizontal direction in the figure, so as to overlap the scanning signal lines 16 in the display region 44.

Figure 20:
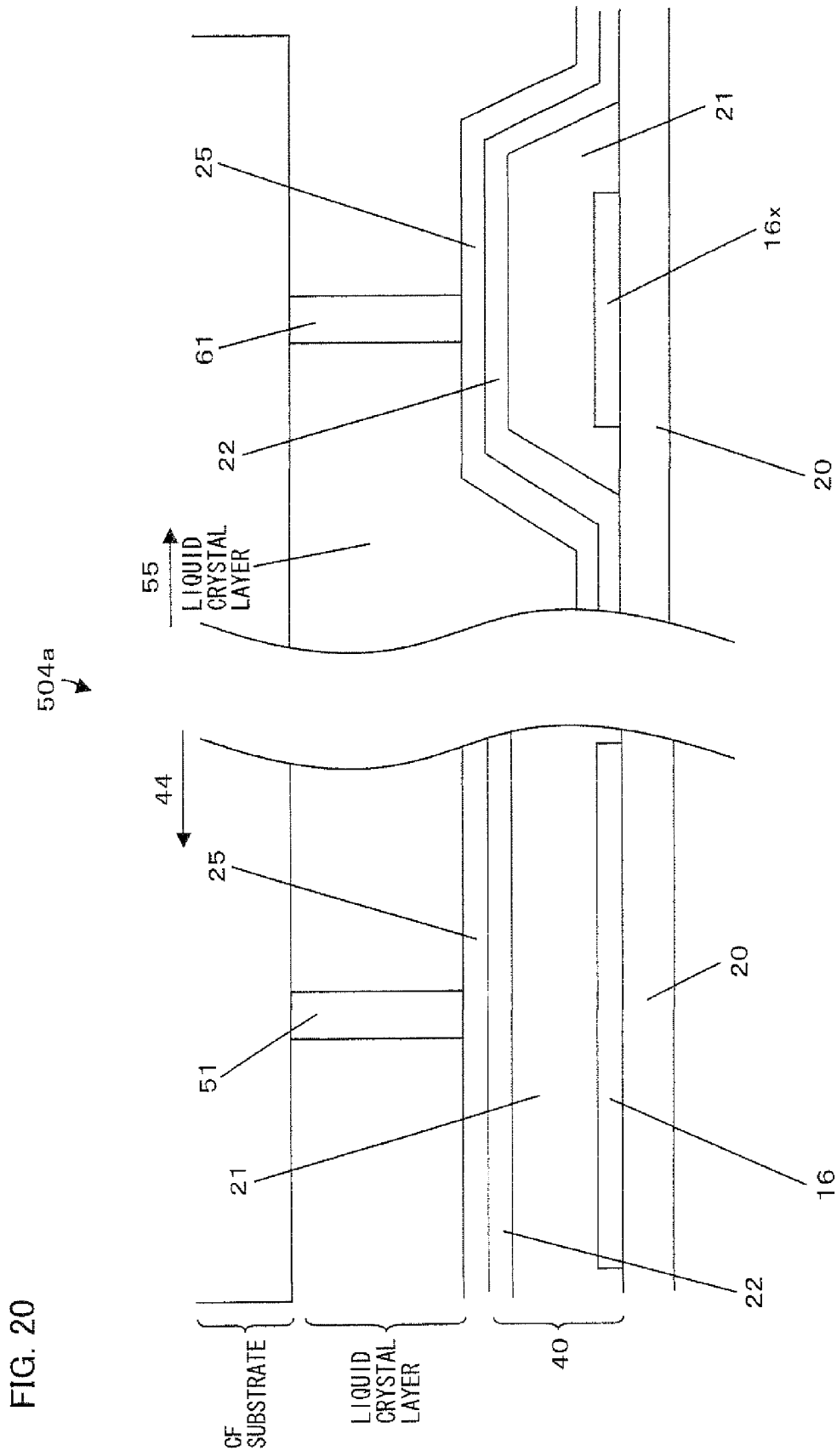
FIG. 20 is a cross sectional view taken along the arrows shown in the display region and a cross sectional view taken along the arrows shown in the non-display region in the liquid crystal panel shown in FIG. 19.

FIG. 20 shows (i) a cross section taken along the arrows shown in the display region of FIG. 19, and (ii) a cross section taken along the arrows shown in the non-display region of FIG. 19. As shown in FIG. 20, provided below the photo spacer 51 in the display region are: the scanning signal line 16; the first gate insulating layer 21; the second gate insulating layer 22; and the first interlayer insulating film 25, in this order from the transparent insulating substrate 20. Further, provided below the photo spacer 61 in the non-display region are: the end section 16x of the scanning signal line; the first gate insulating layer 21; the second gate insulating layer 22; and the first interlayer insulating film 25, in this order from the transparent insulating substrate 20.

As described above, the structure of the active matrix substrate below the photo spacers (in particular, the structure of the gate insulating film 40) in the non-display region is the same as that in the display region. This facilitates setting the height of each of the photo spacers 51 and 61 and allows reducing the difference between the cell gap in the display region 44 and that in the non-display region 55. As a result, it is possible to suppress the occurrence of luminance unevenness near the border between the display region 44 and the non-display region 55.

In a liquid crystal display device of a so-called VA mode, in which the alignment of a liquid crystal layer is a vertical alignment, the cell gap in the non-display region is only required to be in the range from −0.4 μm to +0.2 μm, and preferably in the range from −0.2 μm to +0.1 μm, relative to the cell gap in the display region. Specifically, it is only required that the difference between the cell gaps in the display region and in the non-display region be in the above numerical range even when variations in the thickness of a color filter layer and black matrices on the CF substrate, in the height of the photo spacers, in the thickness of the active matrix substrate, and/or the like are taken into account. The negative portion of the range is larger because luminance unevenness is unlikely to be visible when the cell gap in the non-display region is smaller than the cell gap in the display region (which lies surrounded by the non-display region), as compared to when the cell gap in the non-display region is larger than the cell gap in the display region.

Figure 21:
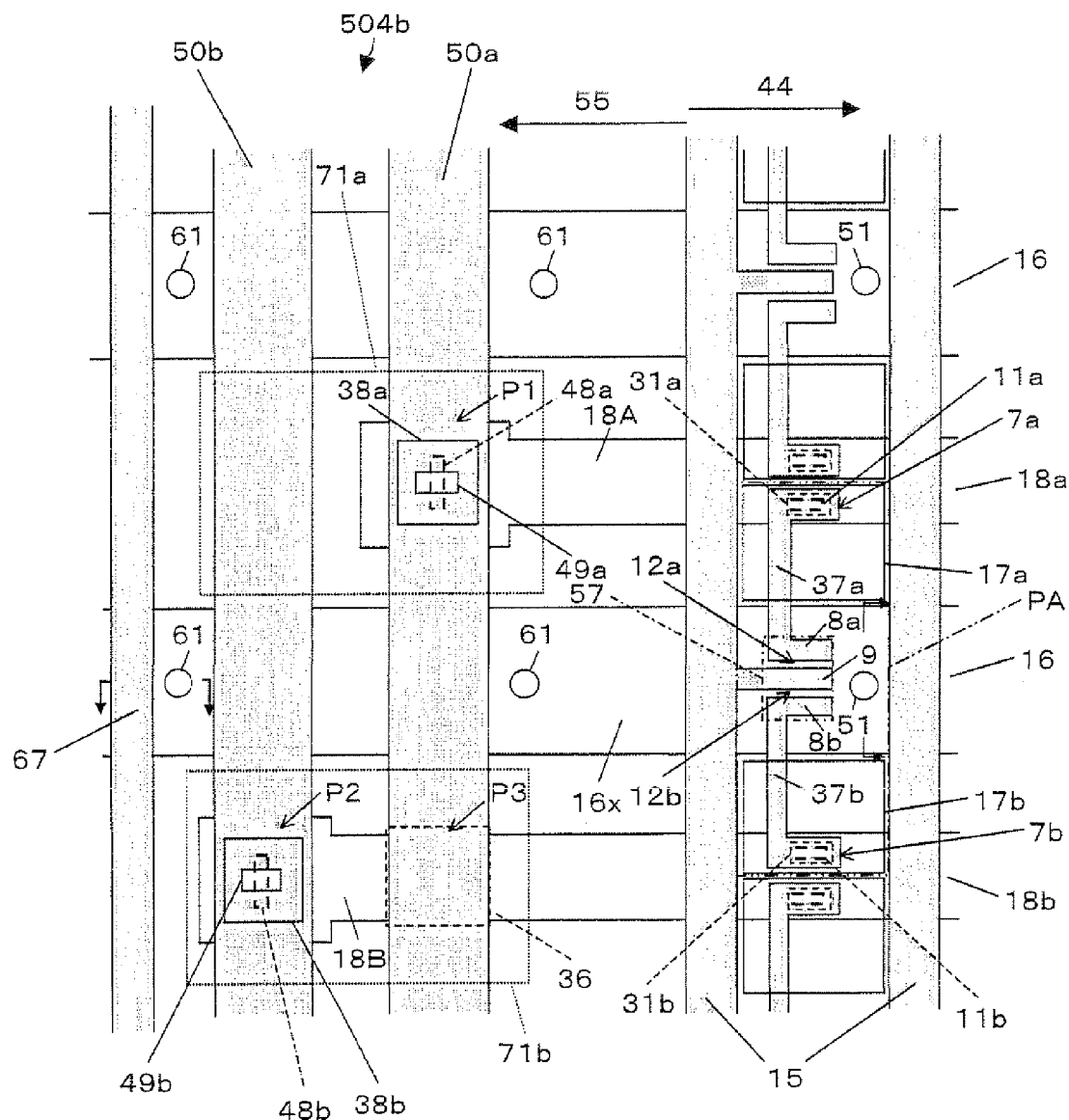
FIG. 21 is a plan view of a modification of the liquid crystal panel shown in FIG. 19.
Figure 22:
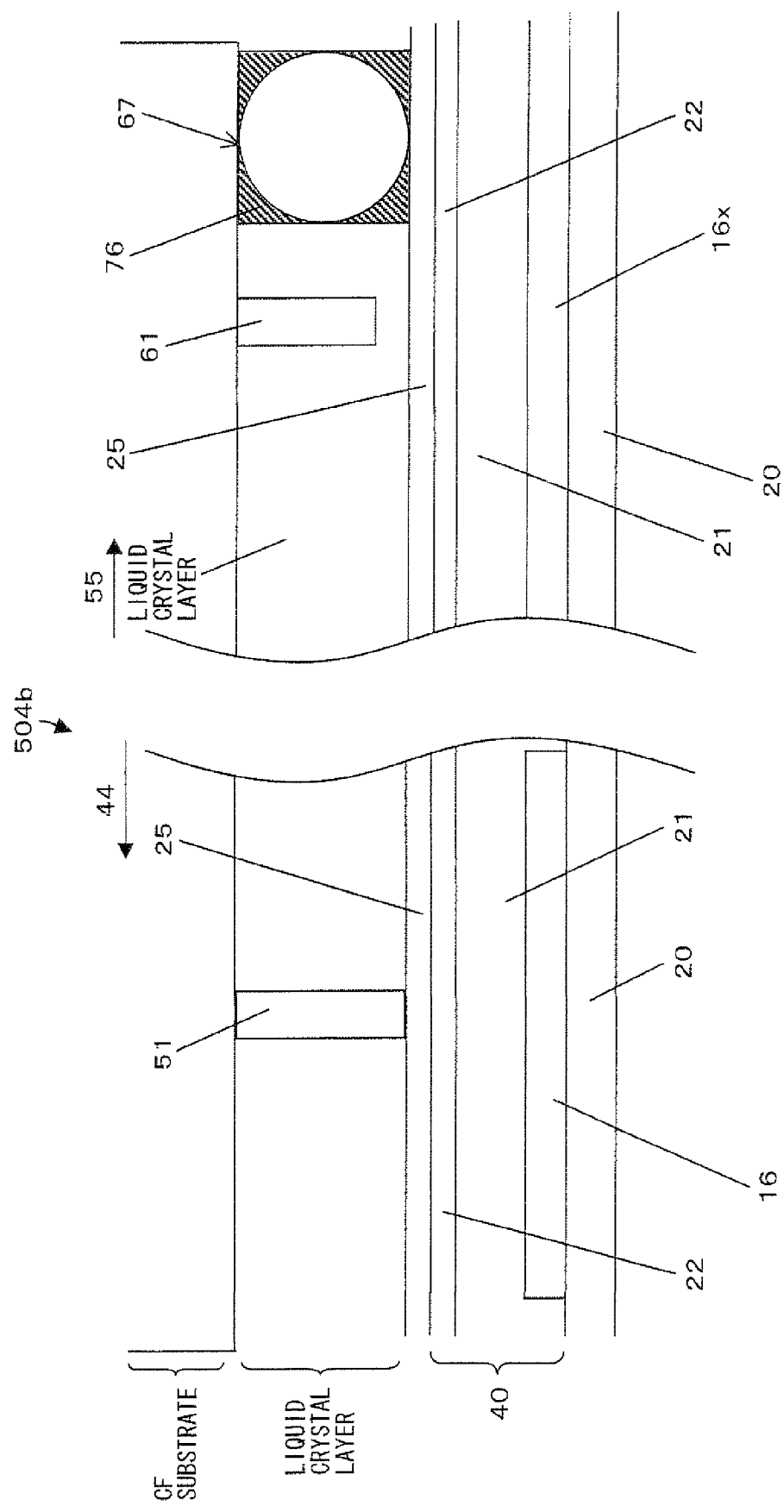
FIG. 22 is a cross sectional view taken along the arrows shown in the display region and a cross sectional view taken along the arrows shown in the non-display region in the liquid crystal panel shown in FIG. 21.

When it is possible to design a non-display region to be sufficiently small, the cell gap in the non-display region 55 can be maintained by including a bead-like spacer 76 in a seal 67 of a liquid crystal panel 504b, as shown in FIGS. 21 and 22 (FIG. 22 shows (i) a cross section taken along the arrows shown in the display region of FIG. 21 and (ii) a cross section taken along the arrows shown in the non-display region of FIG. 21). In this case, the photo spacer 61 in the non-display region 55 may be formed so as to be shorter in height than the photo spacer 51 (the photo spacer 61 performs the function of preventing the cell gap in the non-display region from being smaller than a certain level when an external pressure is applied to the liquid crystal panel).

Figure 23:
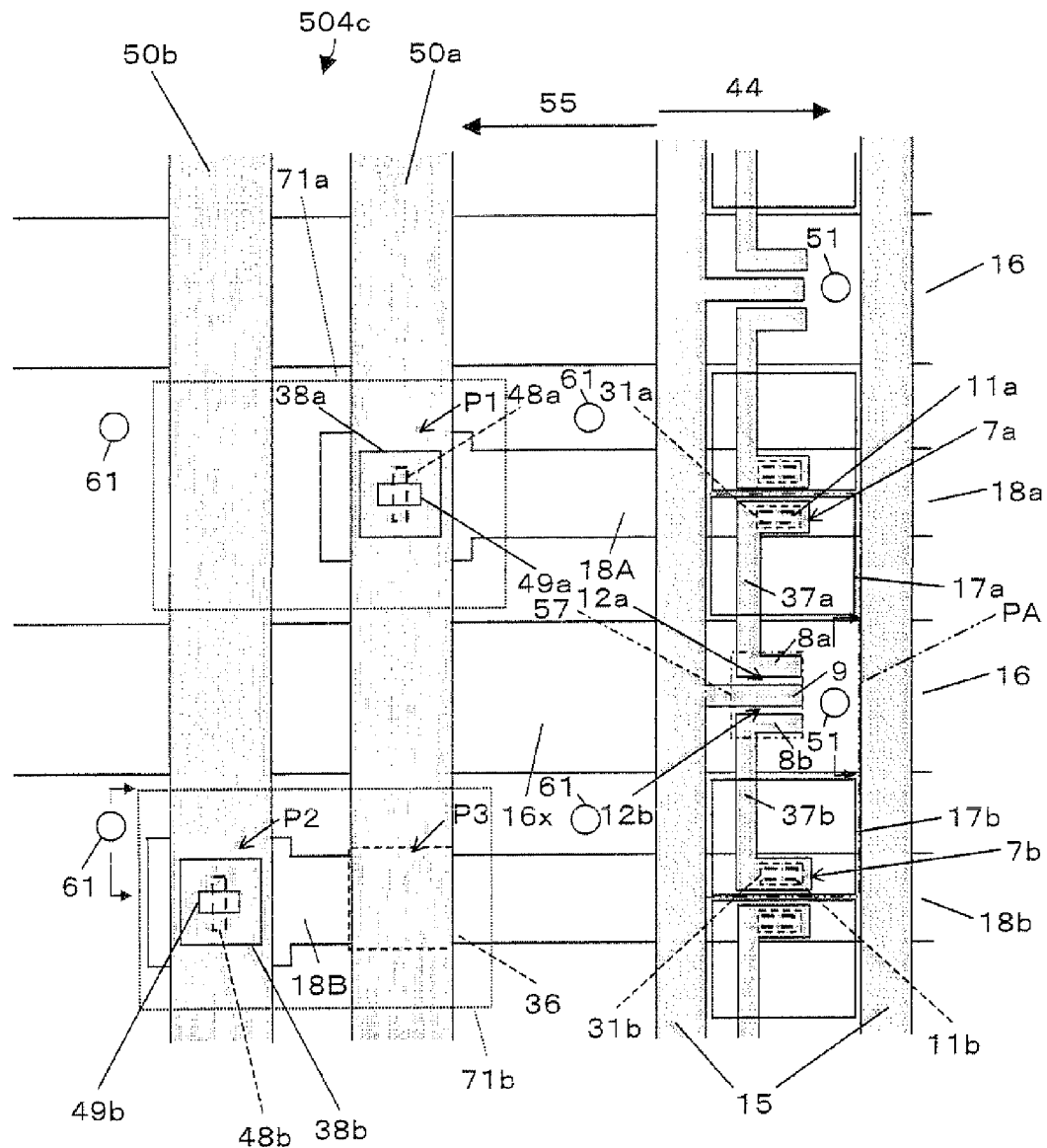
FIG. 23 is a plan view of a modification of the liquid crystal panel shown in FIG. 19.
Figure 24:
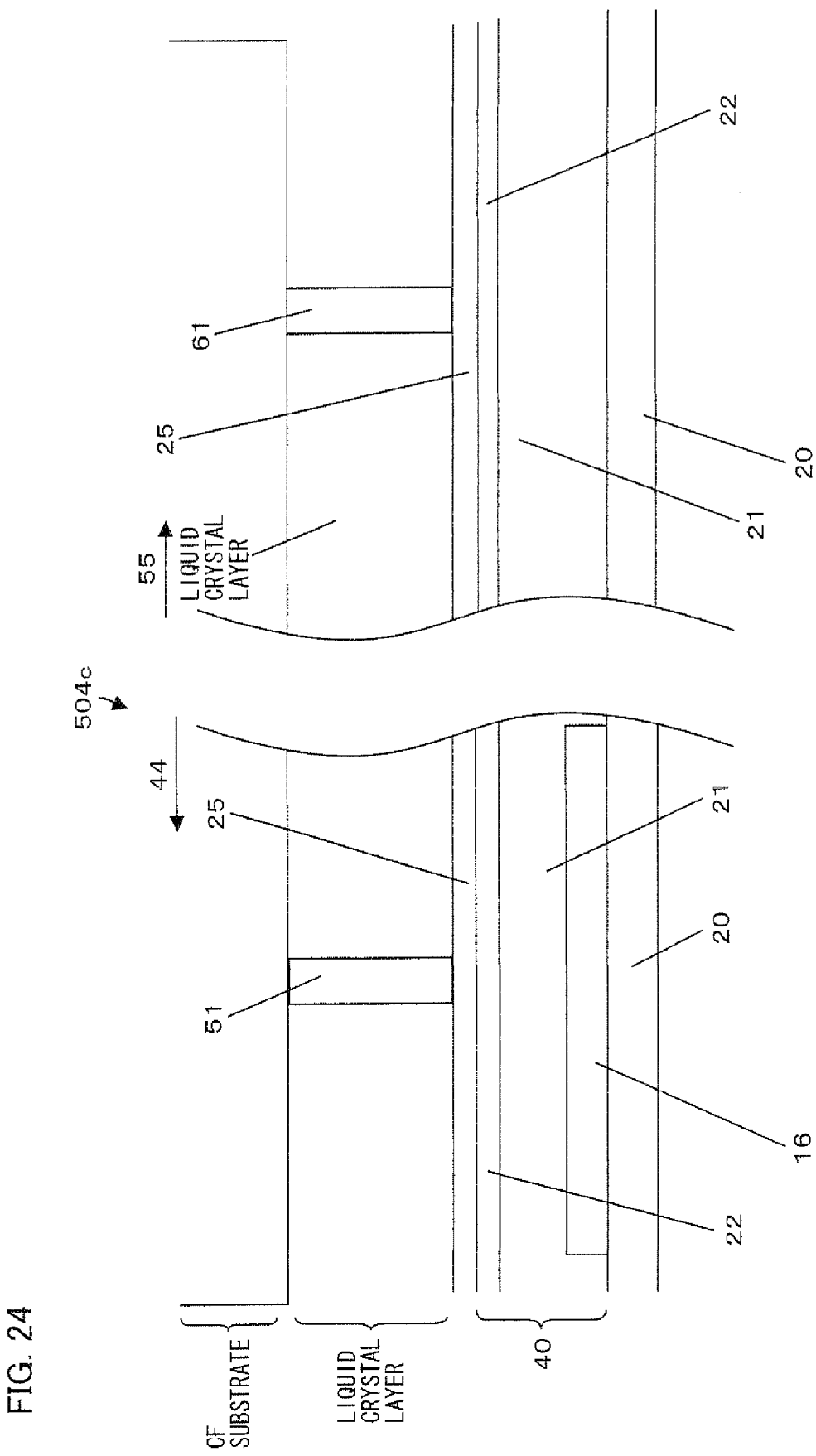
FIG. 24 is a cross sectional view taken along the arrows shown in the display region and a cross sectional view taken along the arrows shown in the non-display region in the liquid crystal panel shown in FIG. 23.

The liquid crystal panel of the present embodiment may be arranged as in FIG. 23. As shown in FIG. 23, a liquid crystal panel 504c includes: photo spacers 51 (first spacers) provided so as to overlap the scanning signal lines 16 in the display region 44; and photo spacers 61 (second spacers) provided so as not to overlap the metal wirings (i.e., the end section 16x of the scanning signal line and the end sections 18A and 18B of the storage capacitor wirings) in the non-display region 55. FIG. 24 shows (i) a cross section taken along the arrows shown in the display region of FIG. 23 and (ii) a cross section taken along the arrows shown in the non-display region of FIG. 23. As shown in FIG. 24, provided below the photo spacer 51 in the display region are: the scanning signal line 16; the first gate insulating layer 21; the second gate insulating layer 22; and the first interlayer insulating film 25, in this order from the transparent insulating substrate 20. Further, provided below the photo spacer 61 in the non-display region are: the first gate insulating layer 21; the second gate insulating layer 22; and the first interlayer insulating film 25, in this order from the transparent insulating substrate 20.

In this case, although the structure of the active matrix substrate below the photo spacer in the non-display region is not the same as that in the display region, the structure of the gate insulating film 40 (made up of the first gate insulating layer 21 and the second gate insulating layer 22) below the photo spacer is the same in the non-display region and in the display region. Since the first gate insulating layer 21 is a planarizing film (such as an SOG film), the total film thickness of the films formed below the photo spacer 51 and on the transparent insulating substrate 20 is hardly different from the total film thickness of the films formed below the photo spacer 61 and on the transparent insulating substrate 20. Thus, the arrangement shown in FIGS. 23 and 24 also facilitates setting the height of each of the photo spacers 51 and 61 and allows reducing the difference between the cell gap in the display region 44 and that in the non-display region 55. As a result, it is possible to suppress the occurrence of luminance unevenness near the border between the display region 44 and the non-display region 55.

The photo spacer 51 in the display region 44 is not necessarily provided on a metal wiring (e.g., scanning signal line). However, the photo spacer 51 is preferably provided so as to overlap neither of the pixel electrodes 17a and 17b. If the photo spacer 51 is provided so as to overlap either of the pixel electrodes 17a and 17b, then the liquid crystal alignment may be disturbed by the photo spacer 51.

Figure 29:
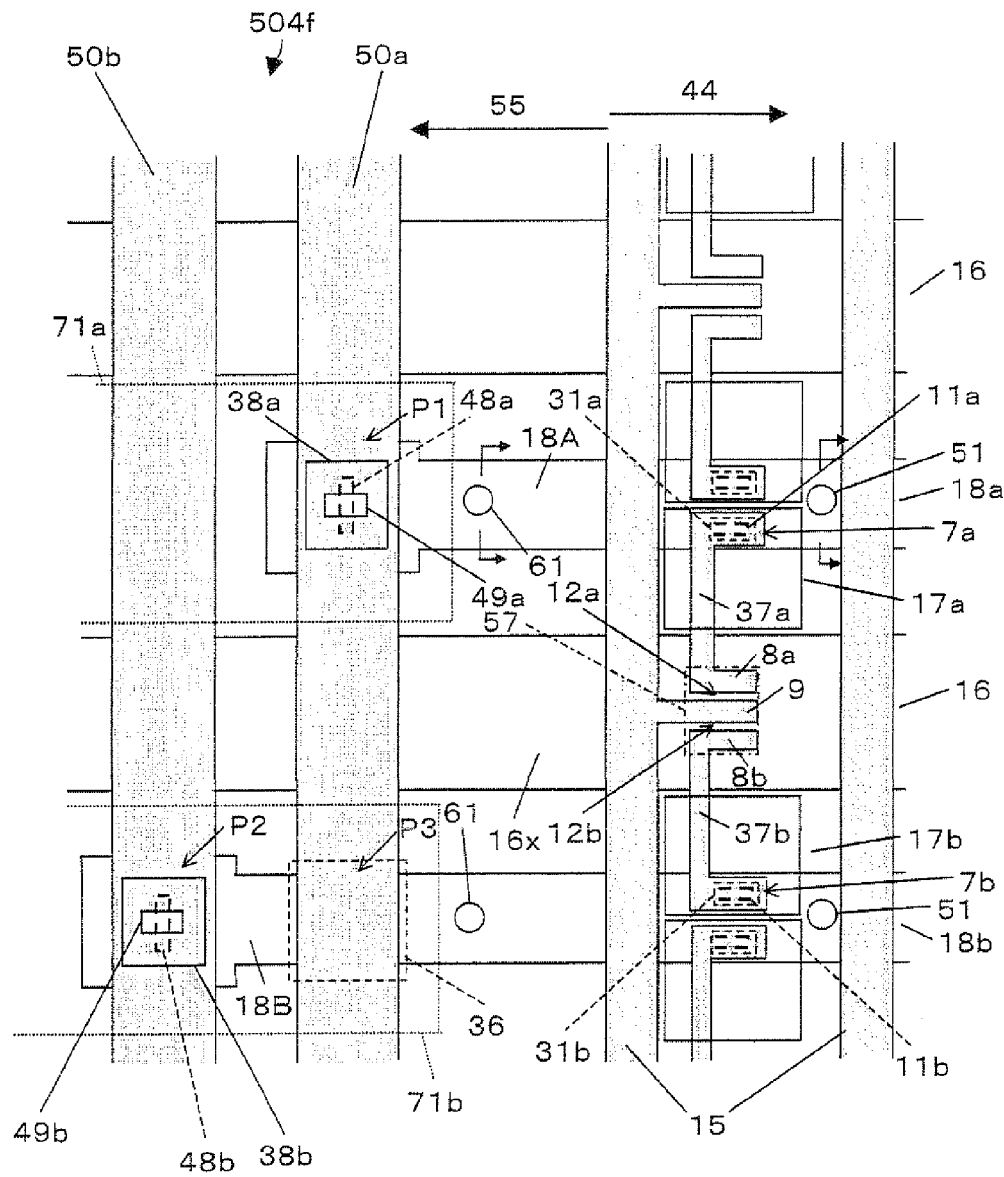
FIG. 29 is a plan view of a modification of the liquid crystal panel shown in FIG. 19.

The liquid crystal panel of the present embodiment may be arranged as in FIG. 29. As shown in FIG. 29, a liquid crystal panel 504f includes: photo spacers 51 (first spacers) provided so as to overlap the first storage capacitor wiring 18a in the display region 44; and photo spacers 61 (second spacers) provided so as to overlap the end section 18A of the first storage capacitor wiring in the non-display region 55.

Figure 30:
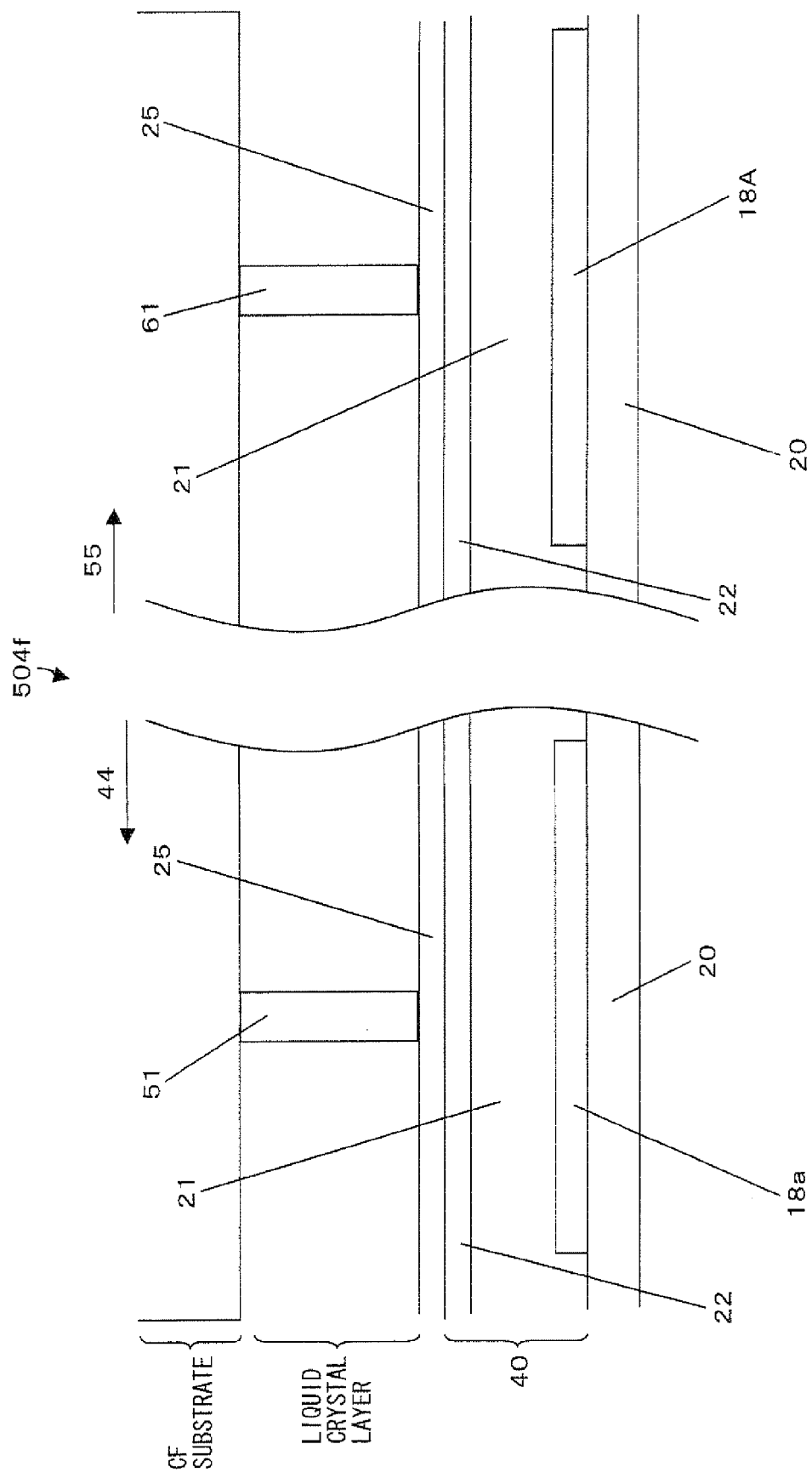
FIG. 30 is a cross sectional view taken along the arrows shown in the display region and a cross sectional view taken along the arrows shown in the non-display region in the liquid crystal panel shown in FIG. 29.

FIG. 30 shows (i) a cross section taken along the arrows shown in the display region of FIG. 29, and (ii) a cross section taken along the arrows shown in the non-display region of FIG. 29. As shown in FIG. 30, provided below the photo spacer 51 in the display region are: the first storage capacitor wiring 18a; the first gate insulating layer 21; the second gate insulating layer 22; and the first interlayer insulating film 25, in this order from the transparent insulating substrate 20. Further, provided below the photo spacer 61 in the non-display region are: the end section 18A of the first storage capacitor wiring; the first gate insulating layer 21; the second gate insulating layer 22; and the first interlayer insulating film 25, in this order from the transparent insulating substrate 20.

The structure of the active matrix substrate below the photo spacer in the non-display region is the same as that in the display region with the arrangement in FIG. 29 as well. This facilitates setting the height of each of the photo spacers 51 and 61 and allows reducing the difference between the cell gap in the display region 44 and that in the non-display region 55.

Figure 31:
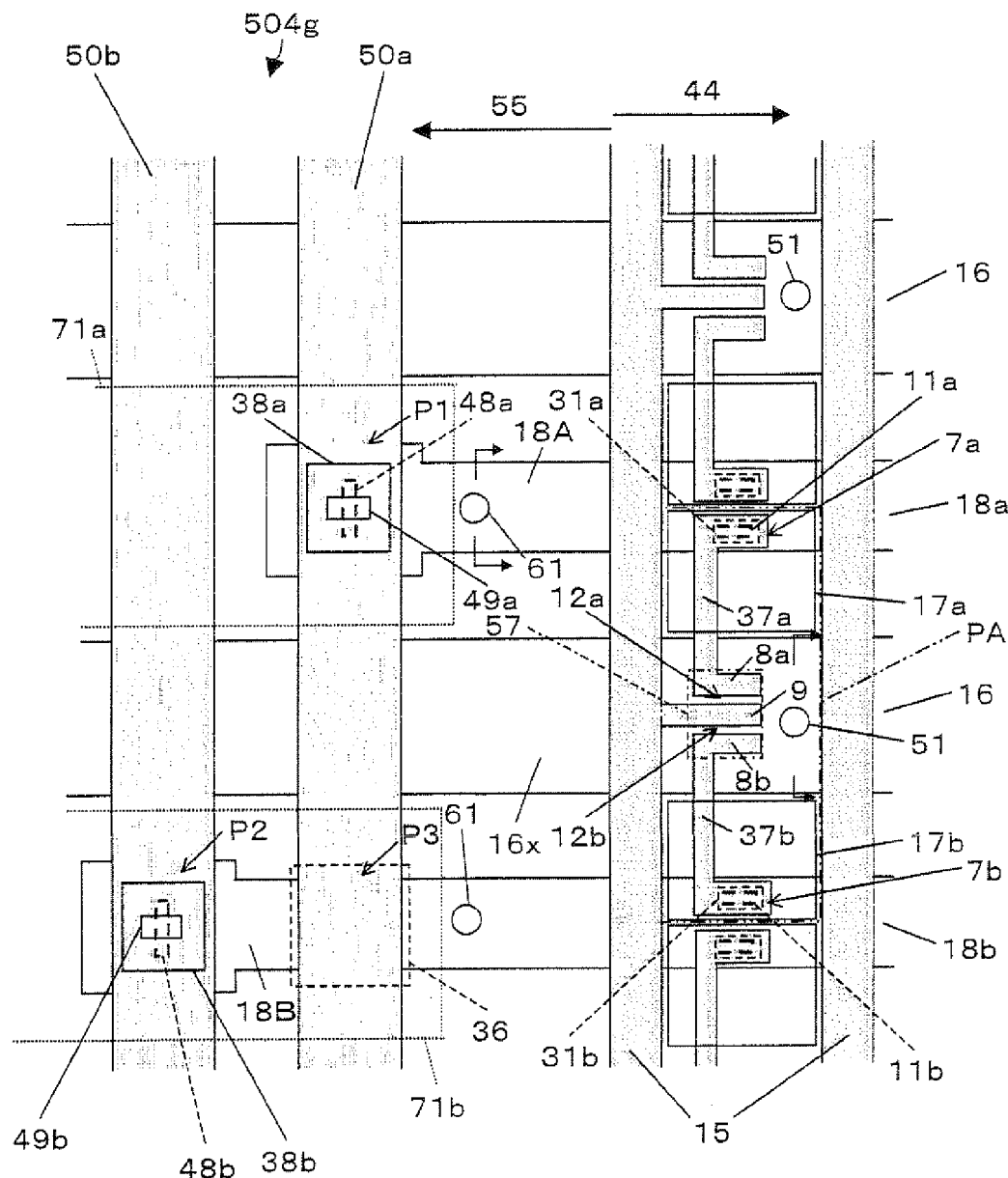
FIG. 31 is a plan view of a modification of the liquid crystal panel shown in FIG. 19.

The liquid crystal panel of the present embodiment may be arranged as in FIG. 31. As shown in FIG. 31, a liquid crystal panel 504g includes: photo spacers 51 (first spacers) provided so as to overlap the scanning signal line 16 in the display region 44; and photo spacers 61 (second spacers) provided so as to overlap the end section 18A of the first storage capacitor wiring in the non-display region 55.

Figure 32:
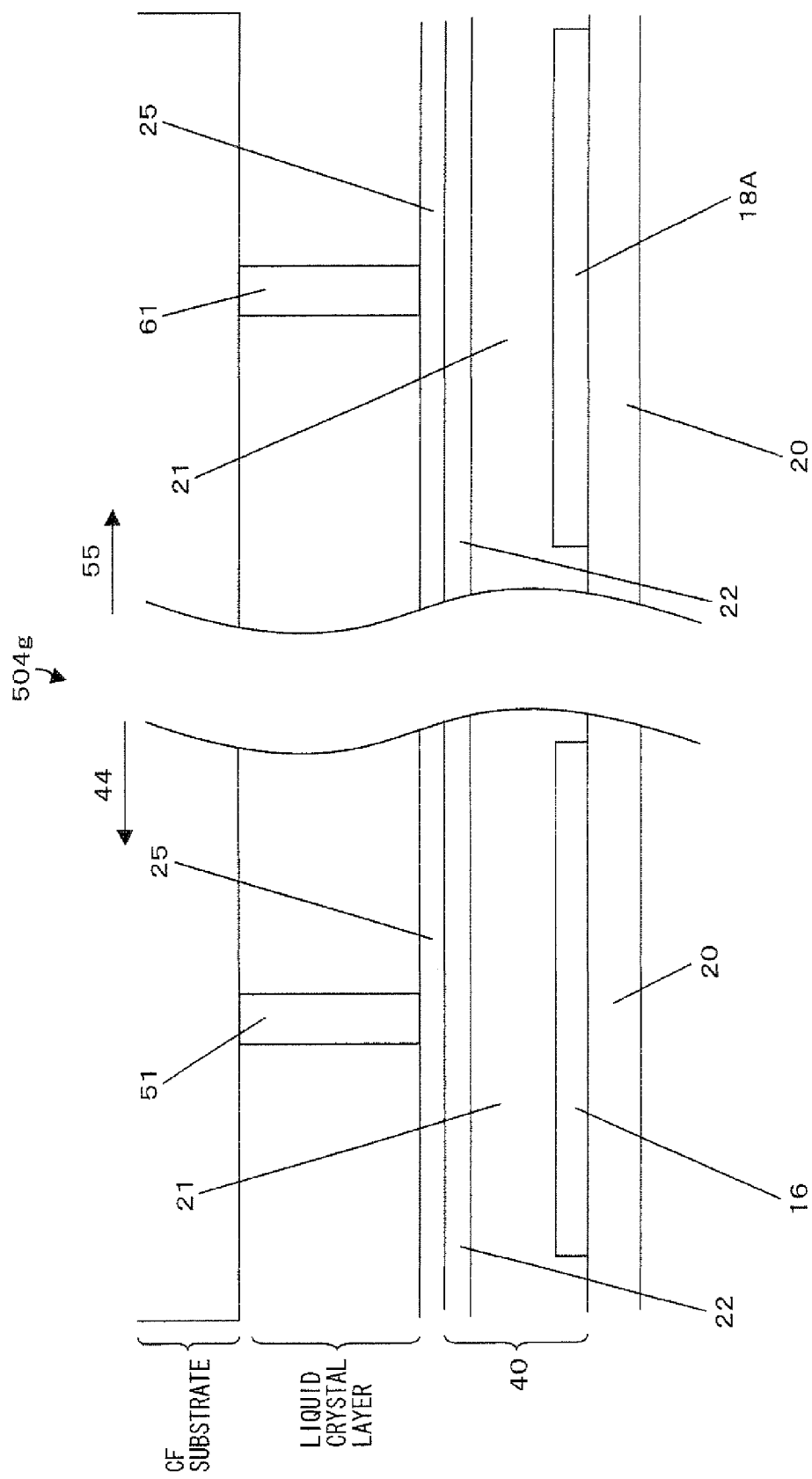
FIG. 32 is a cross sectional view taken along the arrows shown in the display region and a cross sectional view taken along the arrows shown in the non-display region in the liquid crystal panel shown in FIG. 31.

FIG. 32 shows (i) a cross section taken along the arrows shown in the display region of FIG. 31 and (ii) a cross section taken along the arrows shown in the non-display region of FIG. 31. As shown in FIG. 32, provided below the photo spacer 51 in the display region are: the scanning signal line 16; the first gate insulating layer 21; the second gate insulating layer 22; and the first interlayer insulating film 25, in this order from the transparent insulating substrate 20. Further, provided below the photo spacer 61 in the non-display region are: the end section 18A of the first storage capacitor wiring; the first gate insulating layer 21; the second gate insulating layer 22; and the first interlayer insulating film 25, in this order from the transparent insulating substrate 20.

The structure of the active matrix substrate below the photo spacer in the non-display region is the same as that in the display region with the arrangement in FIG. 31 as well. This facilitates setting the height of each of the photo spacers 51 and 61 and allows reducing the difference between the cell gap in the display region 44 and that in the non-display region 55.

Figure 25:
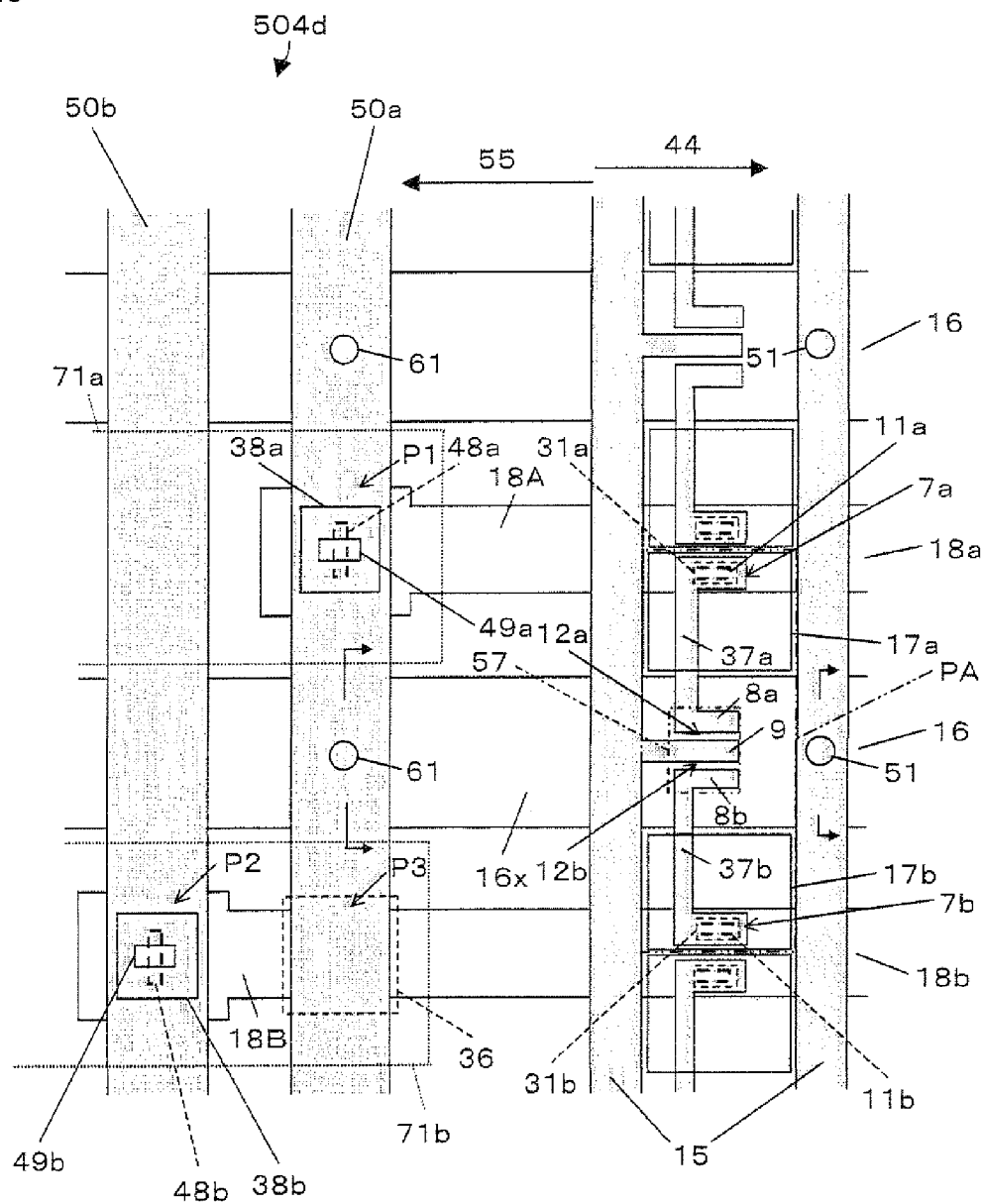
FIG. 25 is a plan view of a modification of the liquid crystal panel shown in FIG. 19.
Figure 26:
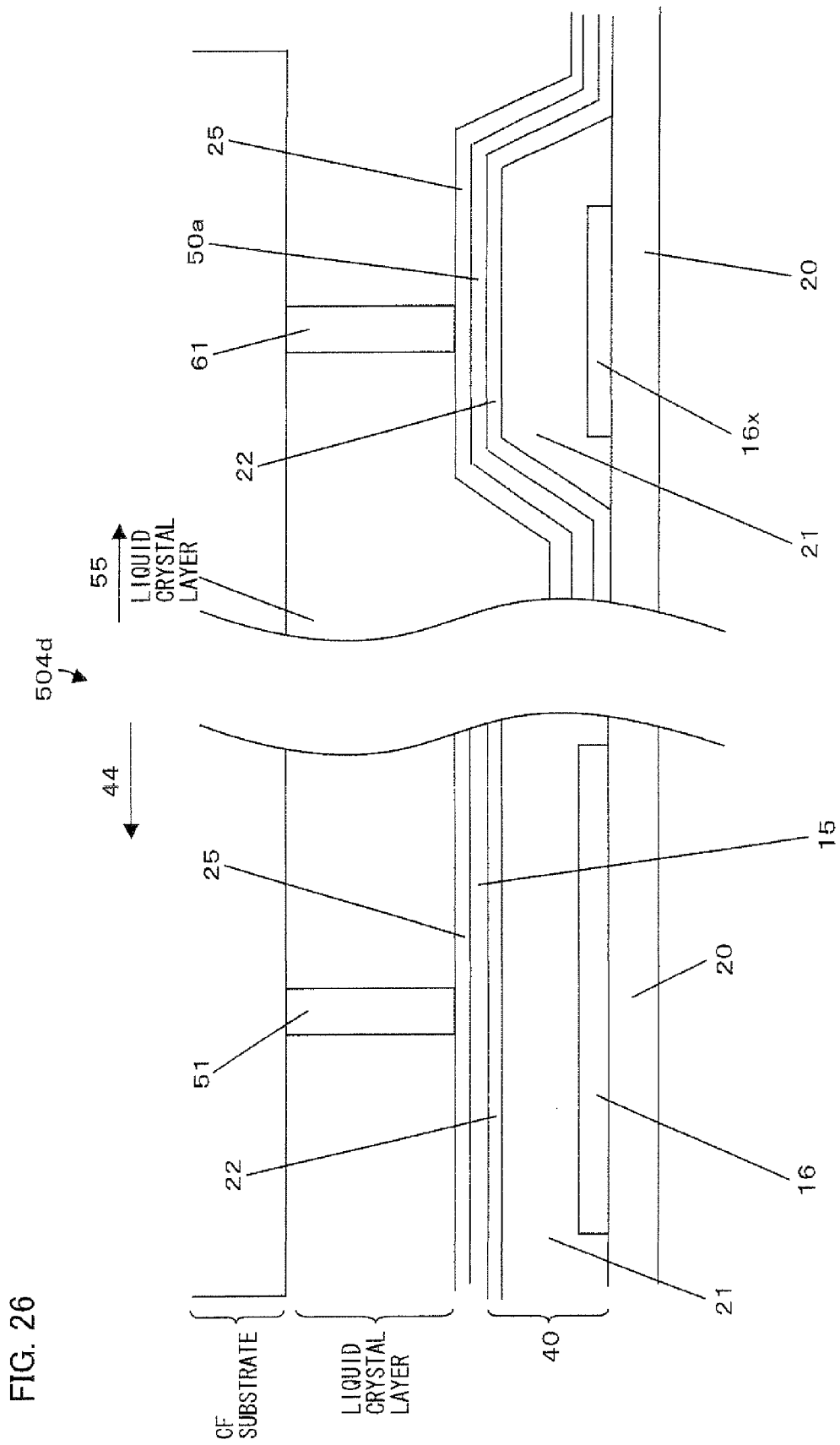
FIG. 26 is a cross sectional view taken along the arrows shown in the display region and a cross sectional view taken along the arrows shown in the non-display region in the liquid crystal panel shown in FIG. 25.

The liquid crystal panel of the present embodiment may be arranged as in FIG. 25. As shown in FIG. 25, a liquid crystal panel 504d includes: photo spacers 51 (first spacers) provided so as to overlap the intersections of the scanning signal lines 16 and the data signal lines 15 in the display region 44; and photo spacers 61 (second spacers) provided so as to overlap the intersections of the first Cs trunk wiring 50a and each end section 16x of the scanning signal lines in the non-display region 55. FIG. 26 shows (i) a cross section taken along the arrows shown in the display region of FIG. 25 and (ii) a cross section taken along the arrows shown in the non-display region of FIG. 25. As shown in FIG. 26, provided below the photo spacer 51 in the display region are: the scanning signal line 16; the first gate insulating layer 21; the second gate insulating layer 22; the data signal line 15; and the first interlayer insulating film 25, in this order from the transparent insulating substrate 20. Further, provided below the photo spacer 61 in the non-display region are: the end section 16x of the scanning signal line; the first gate insulating layer 21; the second gate insulating layer 22; the first Cs trunk wiring 50a; and the first interlayer insulating film 25, in this order from the transparent insulating substrate 20.

The structure of the active matrix substrate below the photo spacer in the non-display region is the same as that in the display region with the arrangement in FIG. 25 as well. This facilitates setting the height of each of the photo spacers 51 and 61 and allows reducing the difference between the cell gap in the display region 44 and that in the non-display region 55. As a result, it is possible to suppress the occurrence of luminance unevenness near the border between the display region 44 and the non-display region 55. As a result, it is possible to suppress the occurrence of luminance unevenness near the border between the display region 44 and the non-display region 55.

In addition, the height of the photo spacer 61 can be reduced by the degree corresponding to the thickness of the first Cs trunk wiring 50a in the non-display region 55, whereas the height of the photo spacer 61 can be reduced by the degree corresponding to the thickness of the data signal line 15 in the display region 44. Thus, it is possible to shorten the time for exposure and development of the photo spacers and to improve the throughput. Further, it is also possible to reduce the amount of the material needed to produce the photo spacers. The first Cs trunk wiring 50a and the data signal line 15 are produced in the same process, and provided in the same layer (on the gate insulating film 40).

Figure 27:
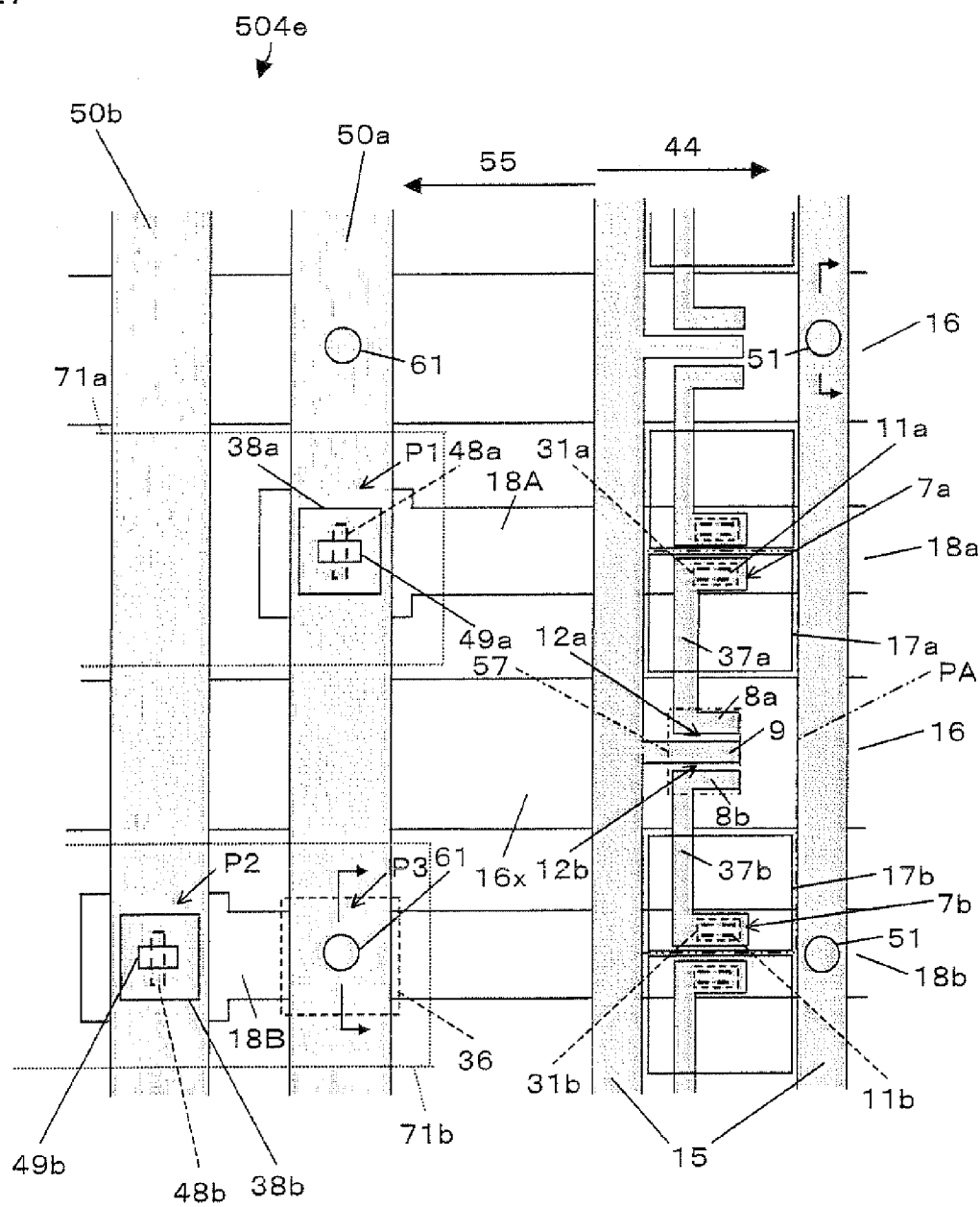
FIG. 27 is a plan view of a modification of the liquid crystal panel shown in FIG. 19.
Figure 28:
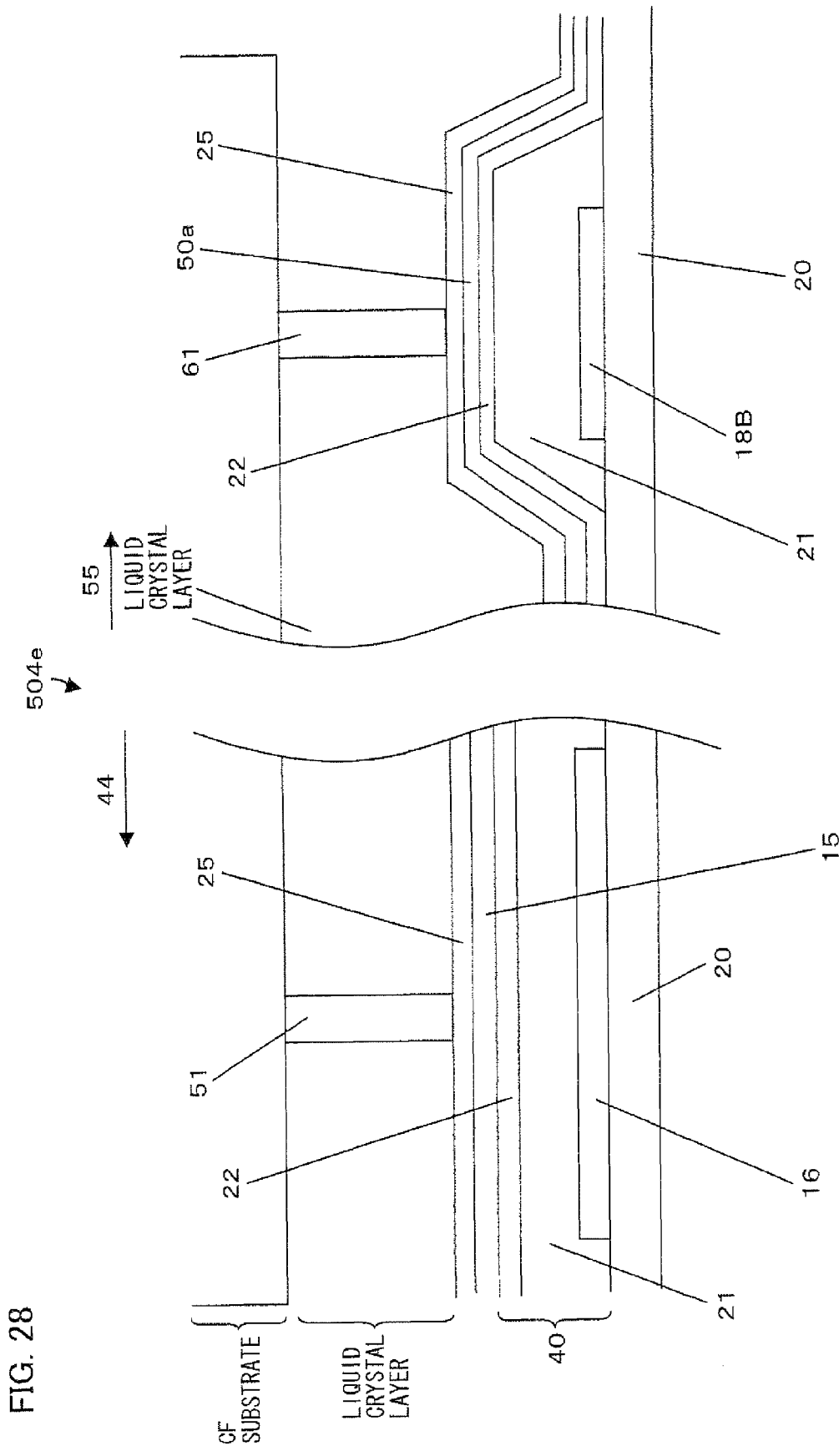
FIG. 28 is a cross sectional view taken along the arrows shown in the display region and a cross sectional view taken along the arrows shown in the non-display region in the liquid crystal panel shown in FIG. 27.

The liquid crystal panel of the present embodiment may be arranged as in FIG. 27. As shown in FIG. 27, a liquid crystal panel 504e includes: photo spacers 51 (first spacers) provided so as to overlap the intersections of the scanning signal line 16 or the second storage capacitor wiring 18b and the data signal lines 15 in the display region 44; and photo spacers 61 (second spacers) provided so as to overlap the intersections of the end section 16x of the scanning signal line 16 or the end section 18B of the second Cs trunk wiring and the first Cs trunk wiring 50a in the non-display region 55. FIG. 28 shows (i) a cross section taken along the arrows shown in the display region of FIG. 27 and (ii) a cross section taken along the arrows shown in the non-display region of FIG. 27. As shown in FIG. 28, provided below the photo spacer 51 in the display region are: the scanning signal line 16; the first gate insulating layer 21; the second gate insulating layer 22; the data signal line 15; and the first interlayer insulating film 25, in this order from the transparent insulating substrate 20. Further, provided below the photo spacer 61 in the non-display region are: the end section 18B of the second storage capacitor wiring; the first gate insulating layer 21; the second gate insulating layer 22; the first Cs trunk wiring 50a; and the first interlayer insulating film 25, in this order from the transparent insulating substrate 20.

The structure of the active matrix substrate below the photo spacer in the non-display region is the same as that in the display region with the arrangement in FIG. 27 as well. This facilitates setting the height of each of the photo spacers 51 and 61 and allows reducing the difference between the cell gap in the display region 44 and that in the non-display region 55. As a result, it is possible to suppress the occurrence of luminance unevenness near the border between the display region 44 and the non-display region 55. As a result, it is possible to suppress the occurrence of luminance unevenness near the border between the display region 44 and the non-display region 55.

In addition, since the photo spacer 61 is provided at the intersection (P3) of the end section 18B of the second Cs trunk wiring and the first Cs trunk wiring 50a, when the relative permittivity of the photo spacer 61 is lower than the average relative permittivity of a liquid crystal material (in the liquid crystal layer), it is possible to suppress a parasitic capacitance at the intersection P3 that is generated between the first Cs trunk wiring 50a and the CF substrate.

As described above, when the intersection P3 is made up of the second film thickness portion 36 (a thick portion of the gate insulating film) so that a short circuit between the first Cs trunk wiring 50a and the end section 18B of the second storage capacitor wiring is prevented, the distance between the first Cs trunk wiring 50a and the CF substrate is shortened, so that the parasitic capacitance between the first Cs trunk wiring 50a and the CF substrate is increased. In view of this, providing the intersection 3P with the photo spacer 61 having a relative permittivity which is lower than the average relative permittivity of the liquid crystal material allows reducing the parasitic capacitance. Since the average relative permittivity (the average of $\epsilon_\|$ and $\epsilon_\perp$) of a normal liquid crystal for vertical alignment is approximately 6.0, the use of an acrylic photosensitive resin having a relative permittivity of approximately 4.3 for the photo spacer 61, for example, allows effectively reducing the parasitic capacitance. The photo spacer 61 is not required to be in contact with the active matrix substrate in order to reduce the parasitic capacitance, and further, the photo spacer 61 preferably has a bottom area which is equivalent to the area of the intersection P3. The photo spacer 61 provided in the intersection P3 can be made of novolac resin having a relative permittivity of approximately 3.5 to 4.0, urethane resin having a relative permittivity of 3 to 5, polyester resin having a relative permittivity of approximately 3, or polyolefin resin having a relative permittivity of approximately 2 to 3.

Figure 6:
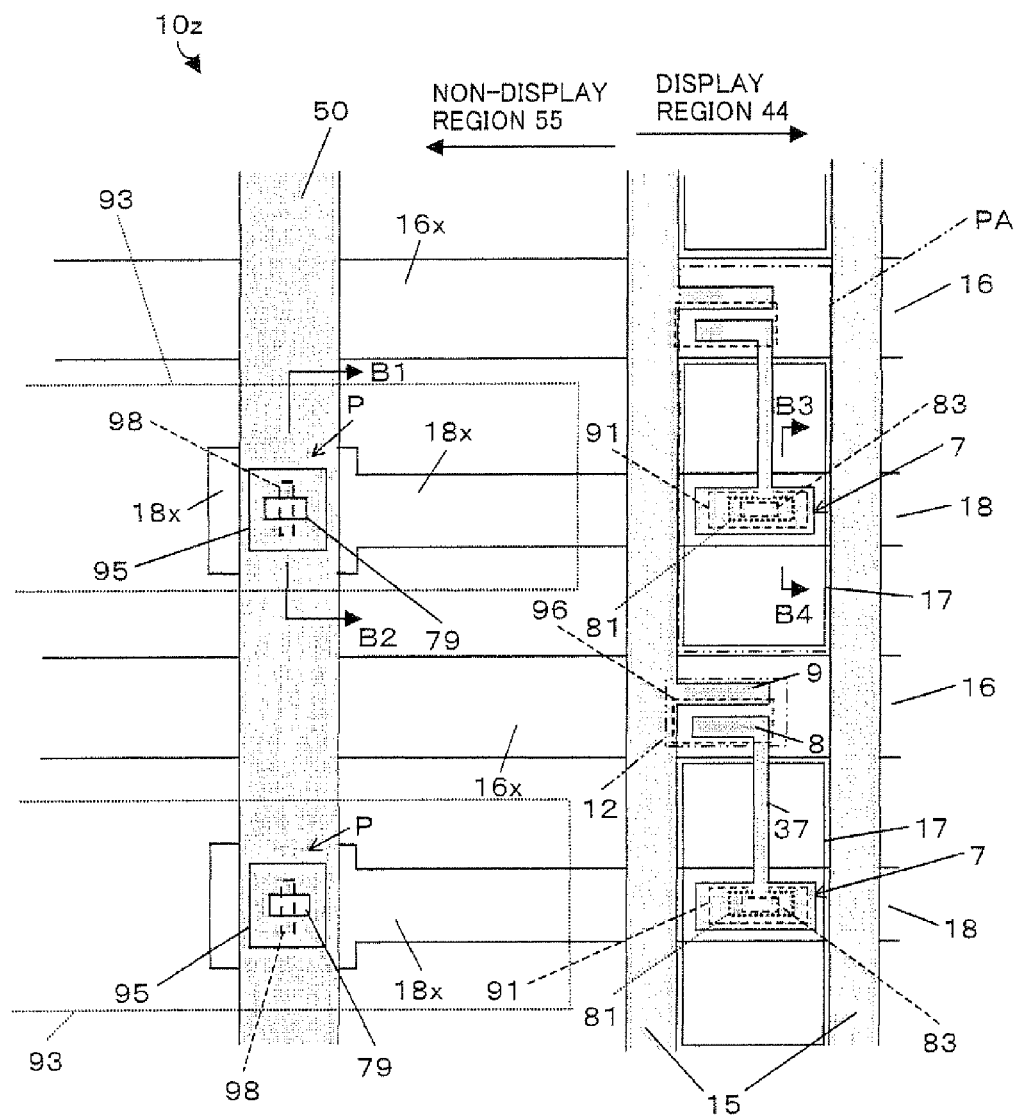
FIG. 6 is a plan view of another arrangement of the active matrix substrate.

The active matrix substrate of the present invention may be arranged as in FIG. 6. FIG. 6 schematically shows the structure of an active matrix substrate (display region and non-display region) of the present embodiment. As shown in FIG. 6, an active matrix substrate 10z includes in its non-display region 55: end sections 16x of scanning signal lines; end sections 18x of storage capacitor wirings (Cs wiring); and a Cs trunk wiring (common wiring) 50 formed in the vertical direction in the figure. Each end section 18x of the storage capacitor wiring is connected with the Cs trunk wiring 50 via a contact hole 98, and a predetermined electric potential is supplied to each of the storage capacitor wirings 18 via the Cs trunk wiring 50. Specifically, each end section 18x of the storage capacitor wirings and the Cs trunk wiring 50 cross each other in the non-display region 55, and the contact hole 98 is formed in an intersection P of them.

Figure 7:
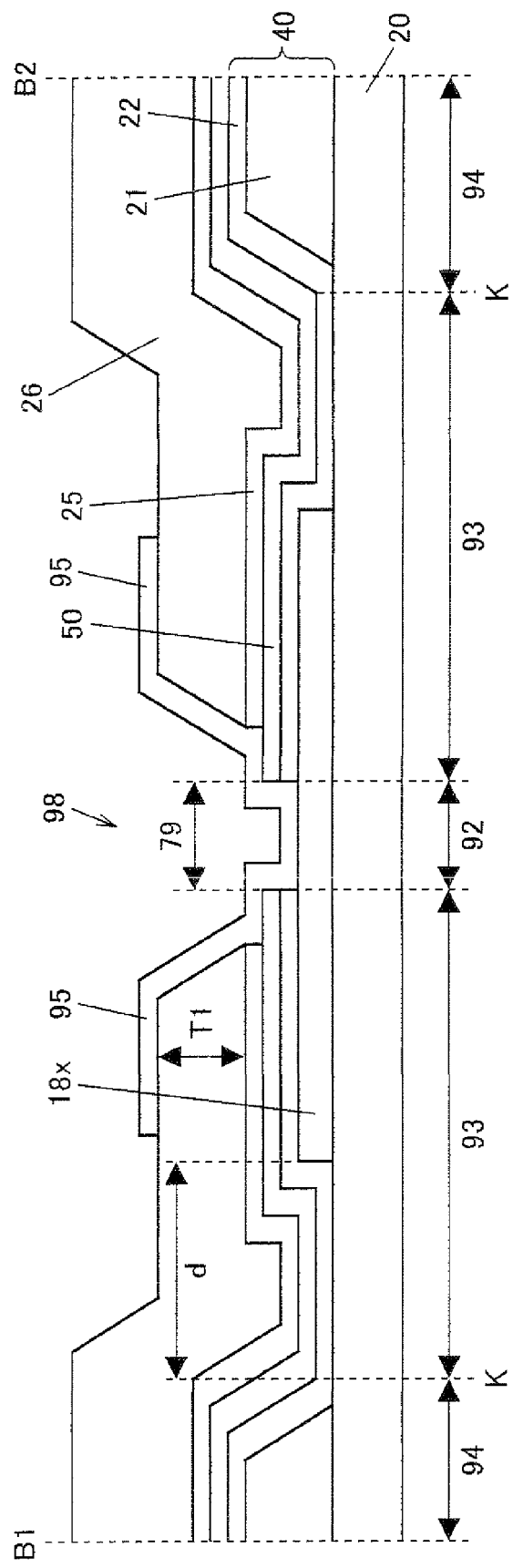
FIG. 7 is a sectional view taken along arrows B1-B2 shown in FIG. 6.

FIG. 7 shows a cross-sectional structure (a cross sectional view taken along line B1-B2 shown in FIG. 6) of the above intersection P and its adjacent area. As shown in FIG. 7, the end section 18x of the storage capacitor wiring is formed on a substrate 20, and a gate insulating film 40 is provided so as to cover the end section 18x of the storage capacitor wiring. The gate insulating film 40 includes, in a region where it overlaps the end section 18x of the storage capacitor wiring: a through-bore portion 92, which forms a part of the contact hole 98; and a first film thickness portion 93 which surrounds the through-bore portion 92. The gate insulating film 40 further includes a second film thickness portion 94 which surrounds the first film thickness portion 93. The border K between the first and second film thickness portions 93 and 94 is positioned outwardly away by a distance d from the edge of the end section 18x of the storage capacitor wiring. The second film thickness portion 94 overlaps the end section 16x of the scanning signal line, for example (see FIG. 6). The second film thickness portion 94 is made up of a first gate insulating layer 21 and a second gate insulating layer 22, whereas the first film thickness portion 93 is made up only of the second gate insulating layer 22. The production process of the gate insulating film 40 is as follows: after the first gate insulating layer 21 is formed so as to cover the storage capacitor wiring 18 and the scanning signal line 16, a portion of the first gate insulating layer 21 (i.e., a portion corresponding to the first film thickness portion 93 and the through-bore portion 92) is removed by etching. Then the second gate insulating layer 22 is formed, and a portion of the second gate insulating layer 22 which portion corresponds to the through-bore portion 92 is removed by etching. This allows forming the first and second film thickness portions 93 and 94 and the through-bore portion 92.

The Cs trunk wiring 50 is formed on the gate insulating film 40, except in the area where the through-bore portion 92 is formed. In other words, the Cs trunk wiring 50 is provided with a metal absent portion 79 which entirely overlaps the through-bore portion 92 (of the gate insulating film).

Further, a first interlayer insulating film 25 and a second interlayer insulating film 26 are formed on the Cs trunk wiring 50. The first interlayer insulating film 25 and the second interlayer insulating film 26 are provided with a hole which forms a part of the contact hole 98 and overlaps the Cs trunk wiring 50. This causes a part of the Cs trunk wiring 50 to be exposed in the contact hole 98. A connecting electrode 95 (made of ITO) is formed so that the through-bore portion 92, the metal absent portion 79, the hole in the first interlayer insulating film 25, and the hole in the second interlayer insulating film 26 are covered with the connecting electrode 95. The end section 18x of the storage capacitor wiring and the Cs trunk wiring 50 are connected by the connecting electrode 95.

When the above arrangement is viewed from a plane angle as shown in FIG. 6, the perimeter (edges) of the first film thickness portion 93 is in the shape of a rectangle which has its long-side direction along the horizontal direction in the figure, and the intersection P (the intersection of the Cs trunk wiring and the end section of the storage capacitor wiring) lies entirely within the perimeter of the first film thickness portion 93. The metal absent portion 79 is in the shape of a rectangle which lies entirely within the edges of the first film thickness portion 93 and has its long-side direction along the horizontal direction in the figure. The contact hole 98 is in the shape of a rectangle which lies entirely within the edges of the first film thickness portion 93, crosses the metal absent portion 79 at right angle, and has its long-side direction along the vertical direction in the figure.

Figure 8:
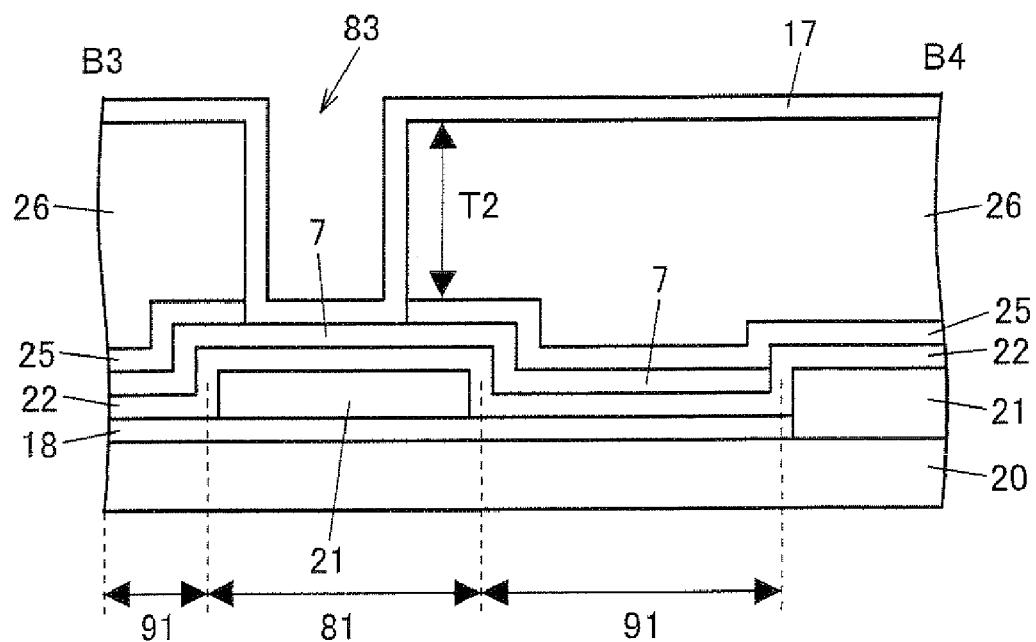
FIG. 8 is a sectional view taken along arrows B3-B4 shown in FIG. 6.
Figure 9:
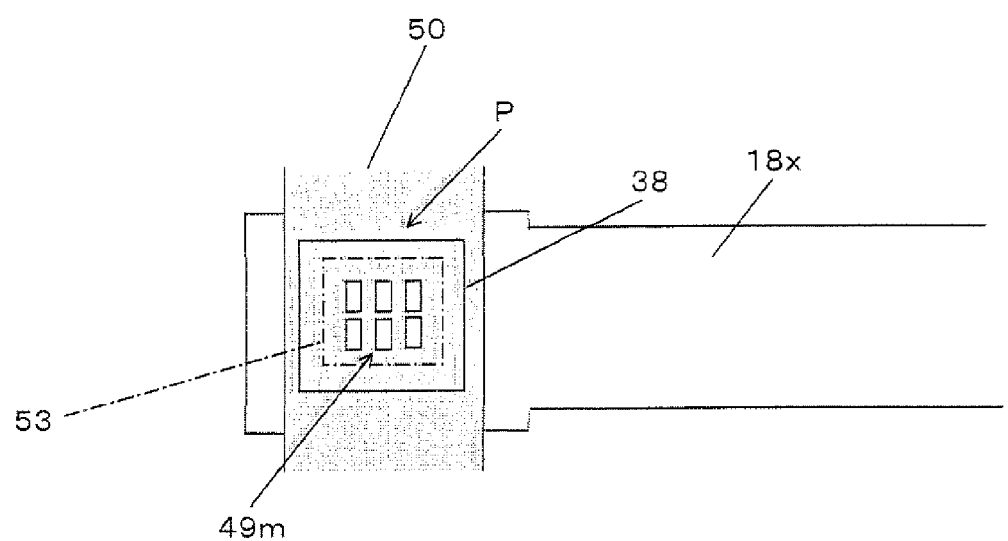
FIG. 9 is a plan view of an arrangement of a contact hole of the active matrix substrate.

The following description deals with the display region 44 of the active matrix substrate 10z, with reference to FIGS. 6, 7, and 8 (FIG. 8 is a cross-sectional view taken along line B3-B4 shown in FIG. 6). The drain lead electrode 7 connected with the drain electrode 8 of the TFT 12 entirely overlaps the pixel electrode 17 and the storage capacitor wiring 18. The gate insulating film in each of the pixel areas includes, in an area where the gate insulating film overlaps the drain lead electrode 7: a thick film portion 81 having a large film thickness; and a thin film portion 91 having a small film thickness and surrounding the thick film portion 81. The thick film portion 81 has the same arrangement as the second film thickness portion 94 in FIG. 7, and is therefore made up of the first and second gate insulating layers. The thin film portion 91 has the same arrangement as the first film thickness portion 93 in FIG. 7, and is made up only of the second gate insulating layer. In addition, the portion of the gate insulating film which portion surrounds the thin film portion 91 has the same structure as the second film thickness portion 94 (made up of the first gate insulating layer 21 and the second gate insulating layer 22). As viewed from a plane angle, the thin film portion 91 is in the shape of a rectangle which has its long-side direction along the horizontal direction, and entirely overlaps the storage capacitor wiring 18 and the drain lead electrode 7. As a result, the capacitor can be dominantly determined by the area in which the storage capacitor wiring 18, the thin film portion 91, and the drain lead electrode 7 overlap. The thick film portion 81 is in the shape of a rectangle which has its long-side direction along the horizontal direction and is formed within the thin film portion 91. Further, each of the pixel areas is provided with a contact hole 83 which entirely overlaps the thick film portion 81. The drain lead electrode 7 is connected with the pixel electrode 17 via the contact hole 83.

The gate insulating film in each of the pixel areas is provided, also in an area where the gate insulating film overlaps the TFT 12, with a thin film portion 96 which is small in film thickness. The thin film portion 96 has the same arrangement as the first film thickness portion 93, and is also made up only of the second gate insulating layer. The area where the thin film portion 96 overlaps the source electrode 9 is arranged so as to be smaller than the area where the thin film portion 96 overlaps the drain electrode 8.

Figure 10:
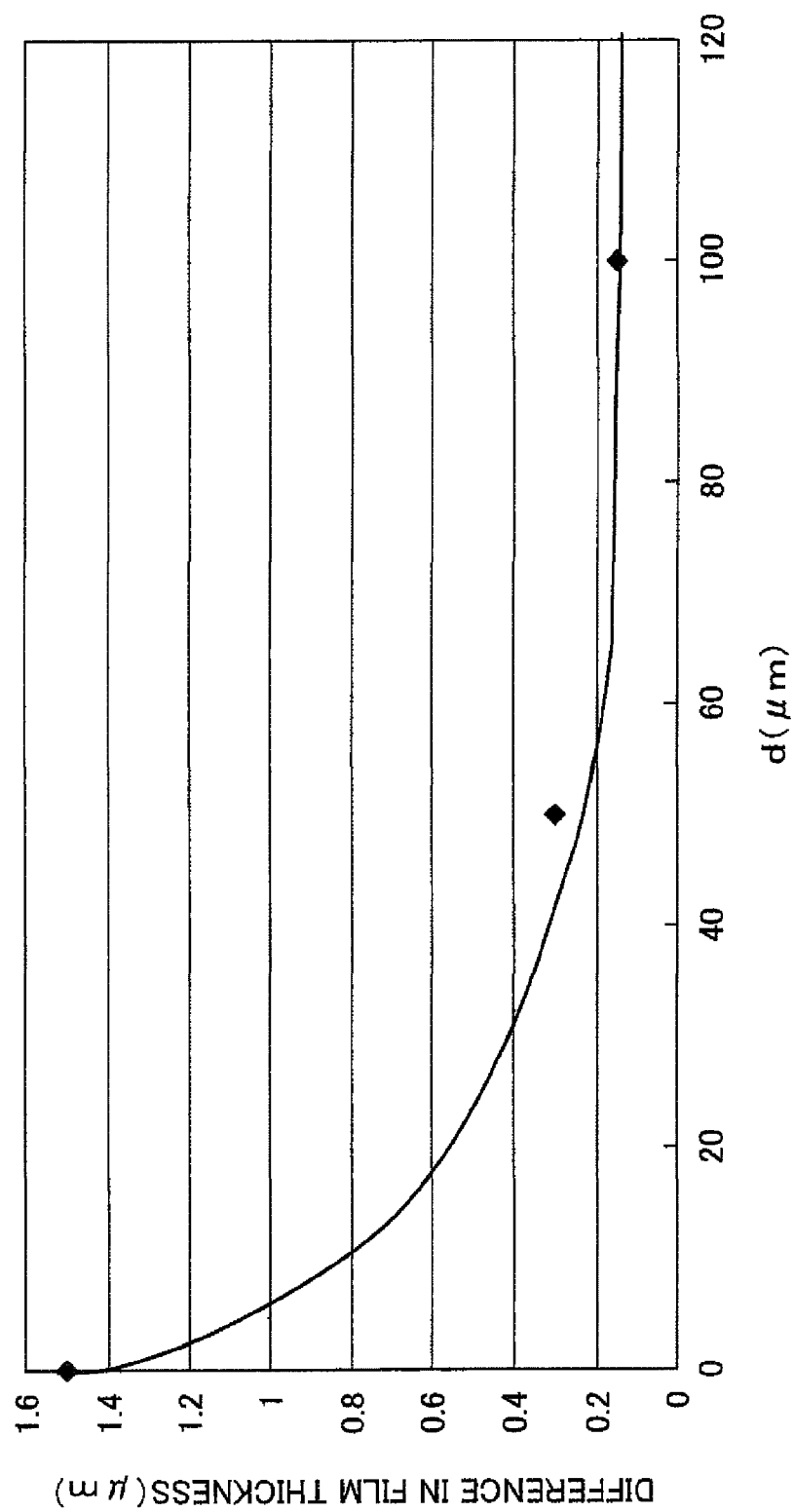
FIG. 10 is a graph showing the relationship between the distance d in FIG. 7 and a difference (in film thickness) between T1 and T2 shown respectively in FIGS. 7 and 8.

When the distance d between (i) the border K between the first and second film thickness portions 93 and 94 and (ii) the edge of the end section 18x of the storage capacitor wiring is small, the difference (difference in film thickness) between (i) a thickness T1 (see FIG. 7) of the portion of the second interlayer insulating film 26 which portion is adjacent to the contact hole 98 (in the non-display region) and (ii) a thickness T2 (see FIG. 8) of the portion of the second interlayer insulating film 26 which portion is adjacent to the contact hole 83 (in the display region) is disadvantageously large. This is shown in a graph in FIG. 10. FIG. 10 shows the result of examination of the relationship between the distance d and the difference in film thickness, obtained in a case where, in FIGS. 7 and 8, the first gate insulating layer 21 (SOG film) is 1.5 µm in thickness, the second gate insulating layer 22 is 0.4 µm in thickness, the storage capacitor wiring (18, 18x) is 0.3 µm in thickness, the first interlayer insulating film 25 is 0.3 µm in thickness, the second interlayer insulating film 26 is 2.5 µm in thickness, and the second interlayer insulating film 26 made up of an acrylic photosensitive resin is 7.5 centipoise (cp) in viscosity. FIG. 10 shows that, when the distance d is 60 µm (preferably 70 µm) or greater, the difference in film thickness falls within a range (from 0.1 to 0.2 µm) in which it is possible to carry out exposure under a single condition.

Figure 33:
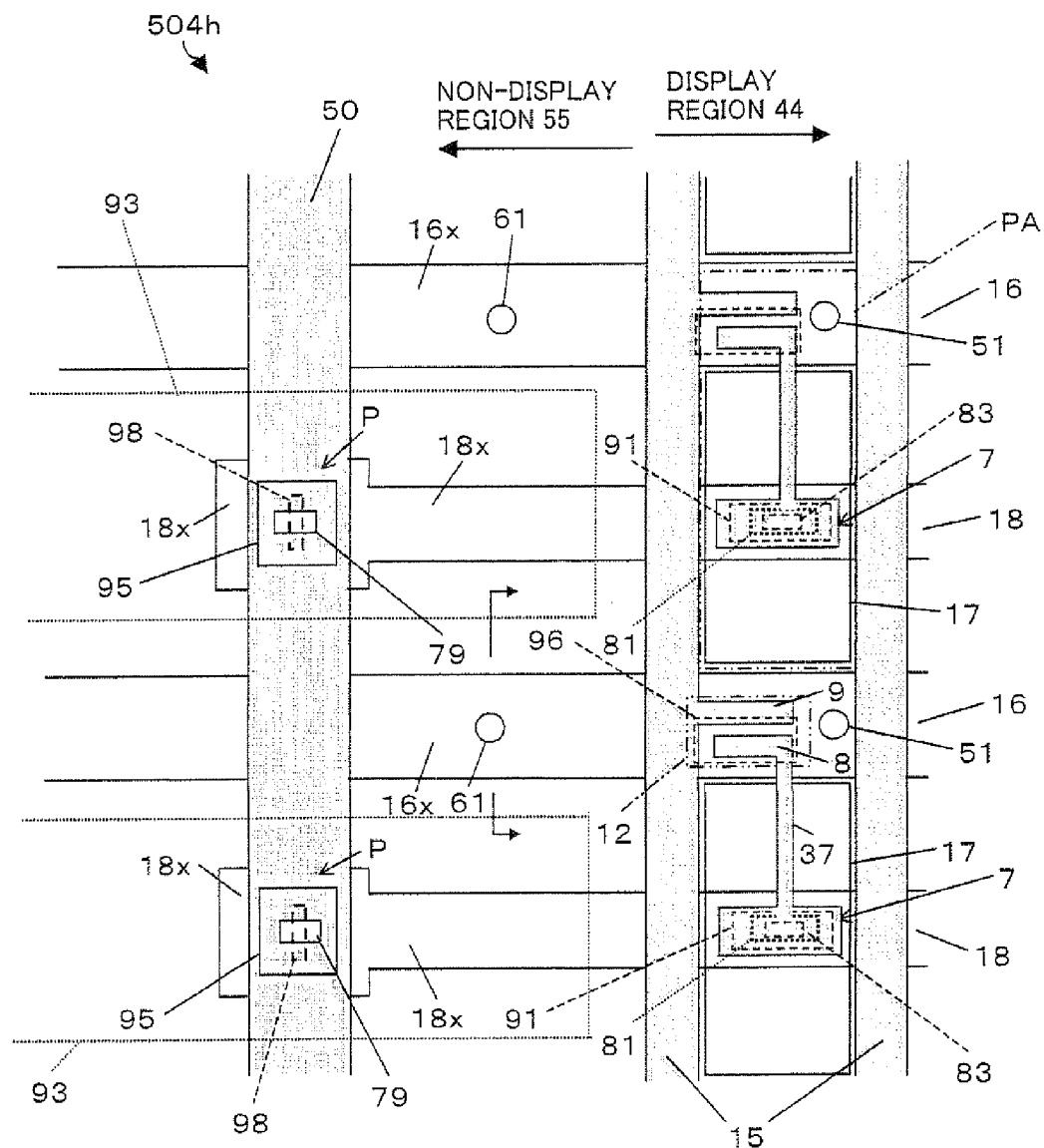
FIG. 33 is a plan view of an arrangement of a liquid crystal panel which includes the active matrix substrate shown in FIG. 6.

FIG. 33 shows an arrangement of a liquid crystal panel which includes the active matrix substrate 10z shown in FIG. 6 and a color filter substrate (CF substrate). As shown in FIG. 33, a liquid crystal panel 504h includes: photo spacers 51 (first spacers) provided so as to overlap the scanning signal lines 16 in the display region 44; and photo spacers 61 (second spacers) provided so as to overlap the end sections 16x of the scanning signal lines in the non-display region 55. Although not shown in FIG. 33, the photo spacers 51 are provided at an interval in the horizontal direction in the figure, so as to overlap the scanning signal lines 16 in the display region 44.

Figure 34:
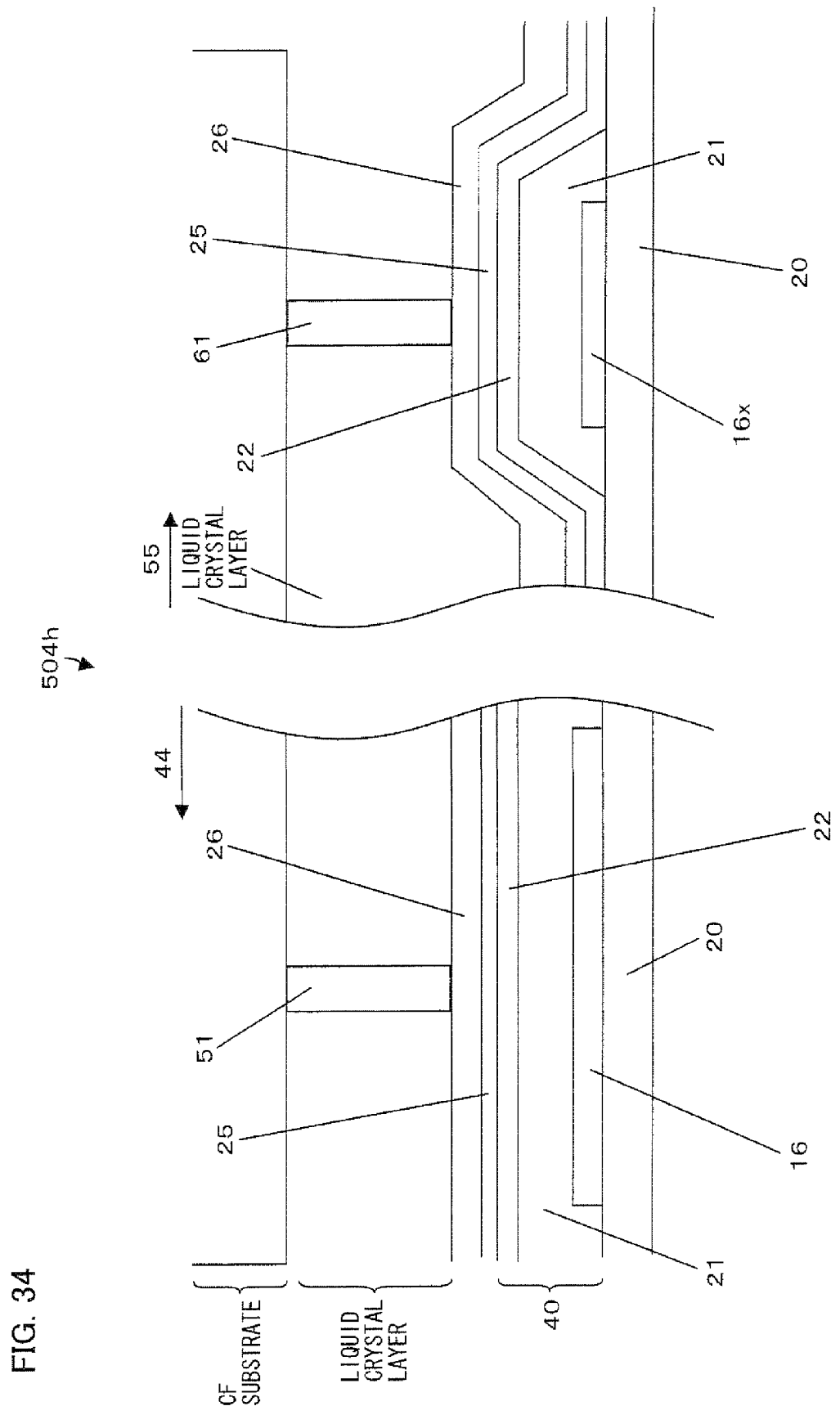
FIG. 34 is a cross sectional view taken along the arrows shown in the display region and a cross sectional view taken along the arrows shown in the non-display region in the liquid crystal panel shown in FIG. 33.

FIG. 34 shows (i) a cross section taken along the arrows shown in the display region of FIG. 33, and (ii) a cross section taken along the arrows shown in the non-display region of FIG. 33. As shown in FIG. 34, provided below the photo spacer 51 in the display region are: the scanning signal line 16; the first gate insulating layer 21; the second gate insulating layer 22; the first interlayer insulating film 25; and the second interlayer insulating film 26, in this order from the transparent insulating substrate 20. Further, provided below the photo spacer 61 in the non-display region are: the end section 16x of the scanning signal line; the first gate insulating layer 21; the second gate insulating layer 22; the first interlayer insulating film 25; and the second interlayer insulating film 26, in this order from the transparent insulating substrate 20.

The structure of the active matrix substrate below the photo spacer in the non-display region is the same as that in the display region with the arrangement in FIG. 33 as well. This facilitates setting the height of each of the photo spacers 51 and 61 and allows reducing the difference between the cell gap in the display region 44 and that in the non-display region 55.

In addition, an interlayer insulating film (the second interlayer insulating film 26) containing an organic material is elastic, as compared to an inorganic film made of SiNx or SiO2. Thus, when the interlayer insulating film (the second interlayer insulating film 26) containing an organic material is provided in the liquid crystal panel that has an arrangement in which the photo spacers 51 and 61 in the display region and in the non-display region are formed on the CF substrate and in contact with the active matrix substrate, elastic deformation of the interlayer insulating film effectively absorbs variations in the thickness of a color filter layer and black matrices on the CF substrate, variations in the height of the photo spacers, and/or variations in the film thickness of the active matrix substrate. The interlayer insulating film (the second interlayer insulating film 26) containing an organic material can be made of an acrylic resin, an epoxy resin, a polyimide resin, a polyurethane resin, a polysiloxane resin, a novolac resin, or the like.

Figure 11:
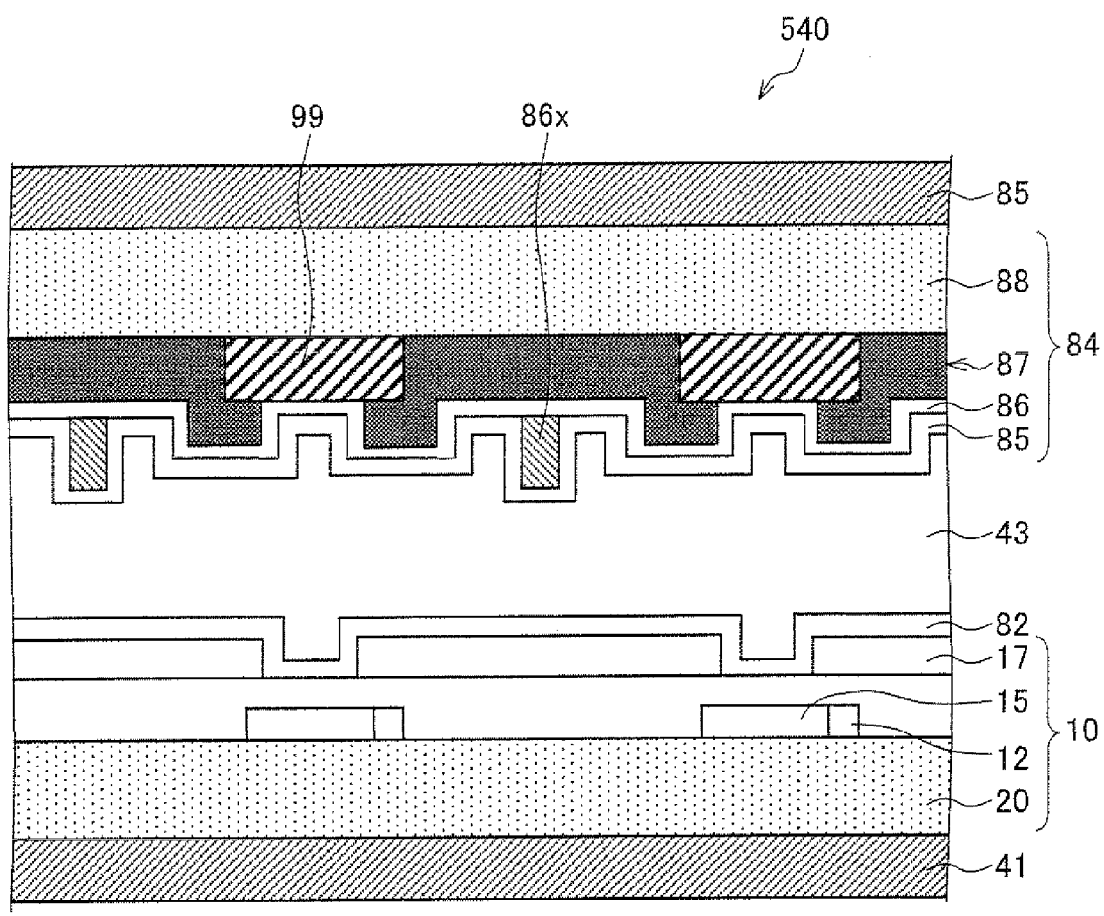
FIG. 11 is a sectional view of an arrangement of a liquid crystal panel of the present embodiment.

FIG. 11 is a cross-sectional view specifically showing a structure of a liquid crystal panel including the active matrix substrate of the present invention. As shown in FIG. 11, a liquid crystal panel 504 of the present invention includes: a polarizing plate 41; the active matrix substrate 10 (10x through 10z); an alignment film 82, a liquid crystal layer 43; a color filter substrate (CF substrate) 84; and a polarizing plate 85, in this order from the side on which a backlight source is provided. The color filter substrate 84 includes: photo spacers (not shown); an alignment film 85; a common (counter) electrode 86; a color filter layer 87 (including black matrices 99); and a glass substrate 88, in this order from the side on which the liquid crystal layer 43 is provided.

In an MVA liquid crystal panel as in FIG. 11, the common (counter) electrode 86 is provided with a liquid crystal molecule alignment controlling projections (rib) 86x. The liquid crystal molecule alignment controlling projections 86x are made, for example, of a photosensitive resin or the like. An exemplary planar shape (as viewed in a direction vertical with respect to the substrate) of the rib 86x is a regularly zigzagged strip (e.g., a sideway V shape that is a V shape rotated 90 degrees). Further, the pixel electrode of the active matrix substrate 10 is provided with a slit in the shape of a regularly zigzagged strip (e.g., a sideway V shape that is a V shape rotated 90 degrees), in correspondence with the rib 86x on the CF substrate 84. In other words, when an MVA liquid crystal panel is formed using the active matrix substrate of the present invention, the pixel electrode 17 (or the first and second pixel electrodes 17a and 17b) shown in FIGS. 1, 3, 5, and the like, is provided with the slit described above.

The following description deals with a method for producing the color filter substrate (CF substrate). As described above, the color filter substrate includes, on a glass substrate: a color filter layer made up of color filters (colored layers) of the three primary colors (red, green, blue), black matrices (BM), and the like; a counter electrode (common electrode); a vertical alignment film; a rib (alignment controlling projection); and photo spacers.

First, a negative acrylic photosensitive resin in which carbon particles are dispersed is applied onto a transparent substrate by spin coating, and then the resin is dried, so that a black photosensitive resin layer is formed. Subsequently, the black photosensitive resin layer is exposed via a photomask, and then developed, so that a black matrix (BM) is formed. The BM is formed so that openings (positionally corresponding to respective pixel electrodes) for a first colored layer, a second colored layer, and a third colored layer (e.g., red layer, green layer, blue layer, respectively) are formed in respective regions in which the first colored layer, the second colored layer, and the third colored layer are to be formed.

Next, a negative acrylic photosensitive resin in which a pigment is dispersed is applied by spin coating, and then the resin is dried, exposed and developed with use of a photomask, so that a red layer is formed. Subsequently, the second colored layer (e.g., green layer) and the third colored layer (e.g., blue layer) are formed in the same manner, so that a color filter is produced.

Further, a counter electrode made of a transparent electrode such as ITO is formed by sputtering. After that, a positive phenolnovolac photosensitive resin is applied by spin coating, and then the resin is dried, exposed and developed with use of a photomask, so that alignment controlling projections are formed.

Next, a negative acrylic photosensitive resin is applied, and then the resin is dried, exposed and developed with use of a photomask, so that photo spacers are formed.

The color filter substrate is produced as above.

The following description deals with a method for injecting and sealing a liquid crystal between the active matrix substrate and the color filter substrate in constructing a liquid crystal panel. The liquid crystal may be injected and sealed by a method such as a vacuum filling method, in which: an opening for injecting a liquid crystal is provided on the periphery of the substrate; the opening is immersed in the liquid crystal in vacuum; the substrate is exposed to the atmosphere so that the liquid crystal is injected; and the opening is sealed with an ultraviolet (UV) curable resin. However, it takes a very long time to inject a liquid crystal into a vertically aligned liquid crystal panel, as compared to a horizontally aligned panel. Thus, it is preferable to employ a liquid crystal dropping and sealing method described below: first, a UV curable seal resin is applied to the periphery of the active matrix substrate, and liquid crystal is dropped onto the color filter substrate by a dropping method. An appropriate amount of the liquid crystal is dropped by the liquid crystal dropping method evenly on the area surrounded by the seal so that a desired cell gap is formed by the liquid crystal. After that, the color filter substrate, onto which the seal is applied and the liquid crystal is dropped, and the active matrix substrate are placed in an attachment device, and then the air in the attachment device is decompressed to 1 Pa. The two substrates are attached to each other at the decompressed pressure. Then, the air is returned to the atmospheric pressure, so that the top portion of the photo spacer is in contact with the active matrix substrate and a desired cell gap is obtained. Subsequently, the seal resin is temporarily cured by an UV irradiation, and then the seal resin is baked so as to be permanently cured. At this stage, the liquid crystal is spread in the area surrounded by the seal resin, and the cell is filled with the liquid crystal. Then, after the baking is finished, the attached substrates are divided into individual panels, and polarizing plates are attached to the individual panels. As a result of the above, the liquid crystal panel shown in FIG. 11 is produced.

The following description deals with a liquid crystal display device of the present embodiment.

Figure 12:
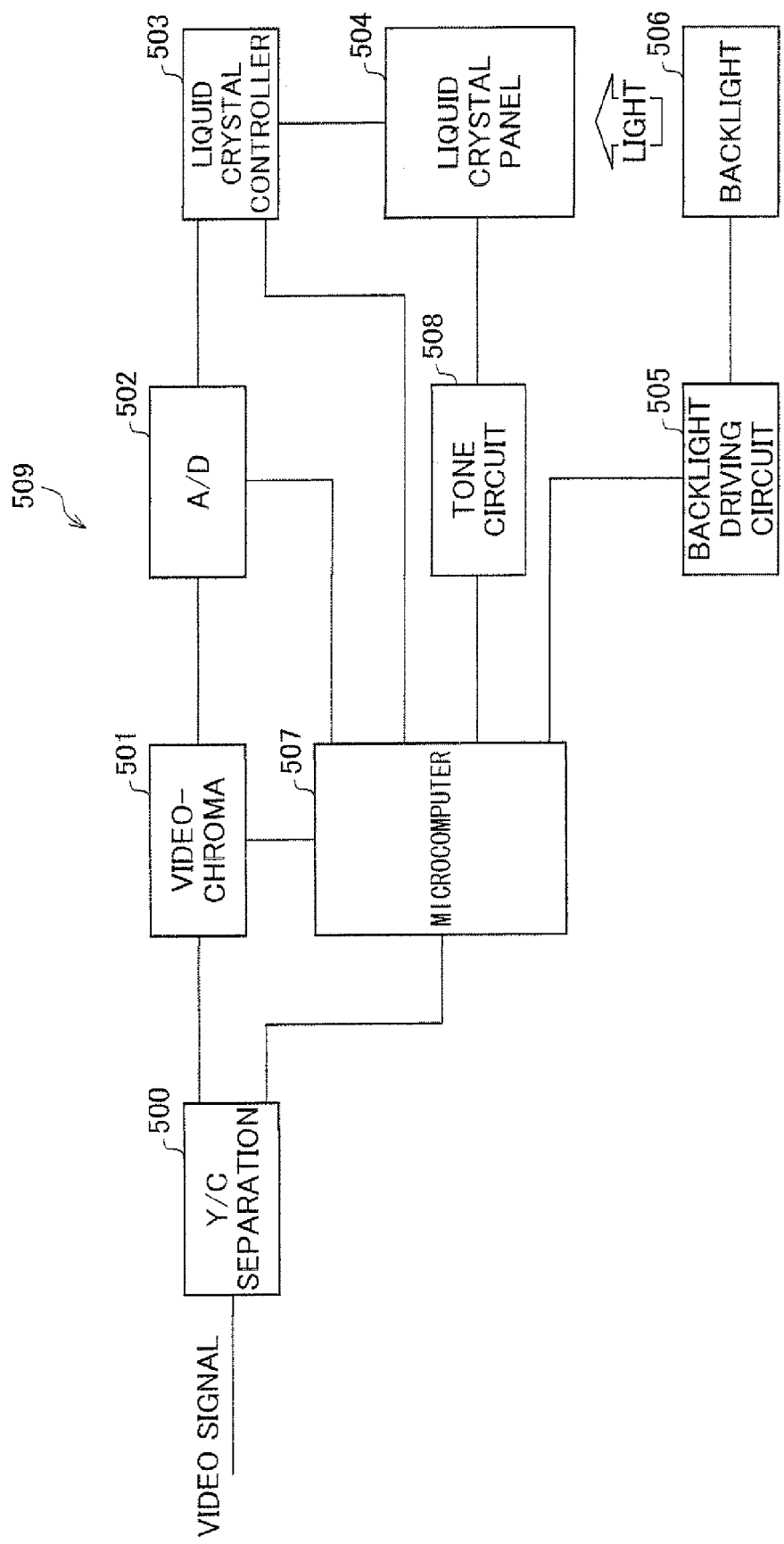
FIG. 12 is a block diagram of how the liquid crystal panel of the present embodiment is controlled.

FIG. 12 is a block diagram schematically showing an arrangement of a liquid crystal display device 509 of the present invention. As shown in FIG. 12, the liquid crystal display device 509 includes: a Y/C separation circuit 500, a video-chroma circuit 501, an A/D converter 502, a liquid crystal controller 503, a liquid crystal panel 504 including the present active matrix substrate; a backlight driving circuit 505; a backlight 506; a microcomputer 507; and a tone circuit 508.

An image signal or a video signal for display in the liquid crystal display device 509 is supplied to the Y/C separation circuit 500, and separated into a luminance signal and a color signal. The luminance signal and the color signal are converted by the video-chroma circuit 501 into analog RGB signals respectively corresponding to the three primary colors R, G, and B of light. The analog RGB signals are converted into digital RGB signals by the A/D converter 502, and supplied to the liquid crystal controller 503.

The digital RGB signals are then supplied from the liquid crystal controller 503 to the liquid crystal panel 504. While the digital RGB signals are supplied from the liquid crystal controller 503 to the liquid crystal panel 504 at a predetermined timing, tone voltages of the respective colors R, G, and B are supplied from the tone circuit 508 to the liquid crystal panel 504. The backlight 506 is driven by the backlight driving circuit 505 so that the liquid crystal panel 504 is irradiated with light. This allows the liquid crystal panel 504 to carry out a display of a static image or a moving image. The control of the entire liquid crystal display device 509, including the above processes, is performed by the microcomputer 507.

Examples of the video signal include various kinds of video signals such as a video signal based on television broadcast, a video signal for an image captured by a camera, and a video signal supplied via an Internet line.

Figure 13:
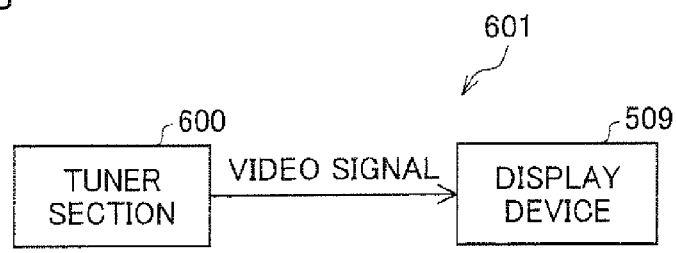
FIG. 13 is a block diagram of an arrangement of a television receiver of the present embodiment.

When the liquid crystal display device 509 of the present invention is, as shown in FIG. 13, connected with a tuner section 600 which receives television broadcast and outputs a video signal, the liquid crystal display device 509 is capable of carrying out a display of a moving image (or static image) in accordance with the video signal supplied from the tuner section 600. In this case, the liquid crystal display device 509 and the tuner section 600 constitute a television receiver 601.

Figure 14:
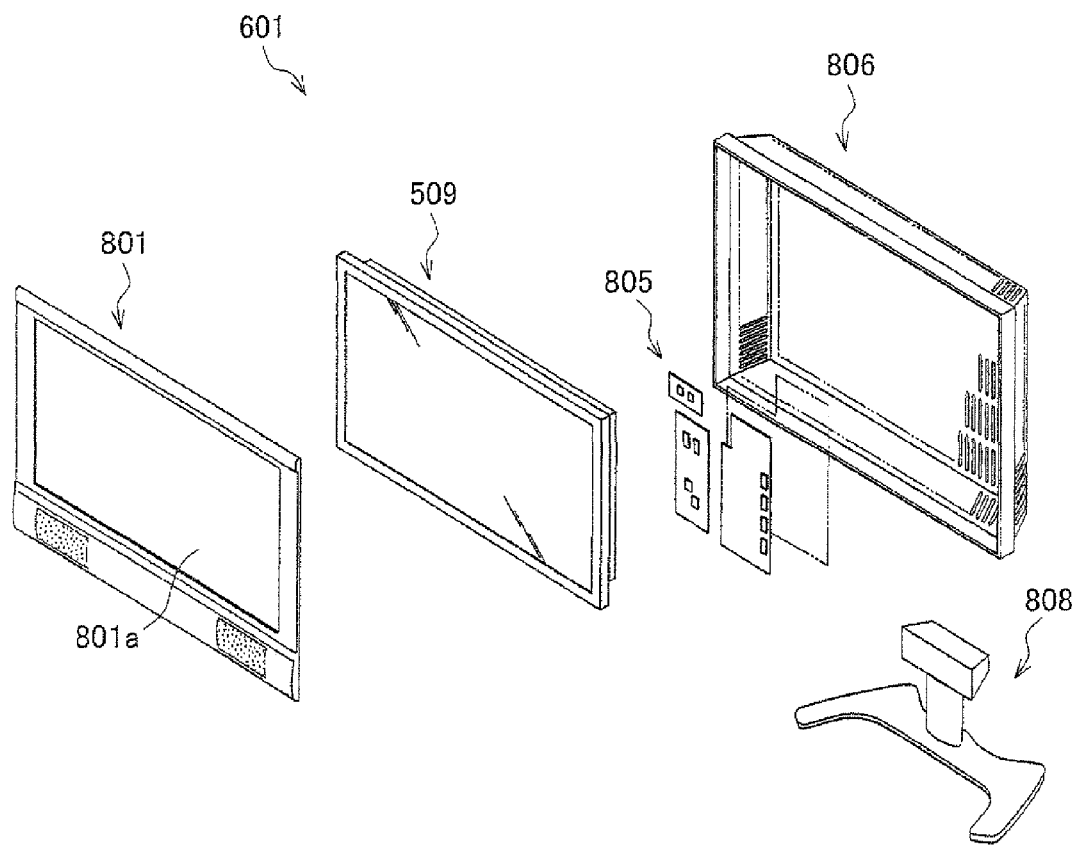
FIG. 14 is a perspective view of the arrangement of the television receiver of the present embodiment.

When the liquid crystal display device is used in the television receiver 601, the television receiver 601 is arranged such that, as shown in FIG. 14, the liquid crystal display device 509 is sandwiched by a first housing 801 and a second housing 806 so that the first and second housings 801 and 806 wrap the liquid crystal display device 509. The first housing 801 is provided with an opening 801a which transmits a video image displayed by the liquid crystal display device 509. The second housing 806 serves to cover the back side of the liquid crystal display device 509, and is provided with an operation circuit 805 for operating the liquid crystal display device 509. A support member 808 is attached to a lower part of the second housing 806.

INDUSTRIAL APPLICABILITY

The active matrix substrate of the present invention is preferably applicable, for example, to a liquid crystal television.

The invention claimed is:

1. An active matrix substrate including a display region and a non-display region, the active matrix substrate comprising:
a plurality of pixel electrodes in the display region;
a plurality of storage capacitor wirings; and
an insulating film;
a trunk wiring, wherein:
the insulating film is provided in a layer above the storage capacitor wirings;
the trunk wiring is provided in a layer above the insulating film;
each of the storage capacitor wirings is located in the display region and the non-display region;
each of the storage capacitor wirings is connected, via a contact hole, with the trunk wiring in the non-display region,
the insulating film comprises a through-bore portion in the contact hole, and a portion with a reduced thickness adjacent to the through-bore portion,
wherein the insulating film includes: a first film thickness portion adjacent to the through-bore portion; and a second film thickness portion which is adjacent to the first film thickness portion and larger in film thickness than the first film thickness portion, the insulating film being a gate insulating film including a plurality of gate insulating layers, wherein the first film thickness portion includes at least one gate insulating layer, and the second film thickness portion includes more gate insulating layers than the first film thickness portion,
wherein a bottommost one of the gate insulating layers is a planarizing film in the second film thickness portion, and wherein a portion of the planarizing film which portion is in contact with a substrate is thicker than a metal wiring disposed on the substrate.

2. The active matrix substrate according to claim 1, wherein the gate insulating layers contain an organic material.

3. The active matrix substrate according to claim 1, wherein a bottommost one of the gate insulating layers is a spin-on-glass (SOG) film made of an SOG material in the second film thickness portion, and the SOG film is absent in the first film thickness portion.

4. The active matrix substrate according to claim 1, wherein a plurality of contact holes are provided.

5. The active matrix substrate according to claim 1, further comprising a connecting electrode in the contact hole, the connecting electrode connecting the storage capacitor wiring and the trunk wiring.

6. The active matrix substrate according to claim 5, wherein the connecting electrode is made of a material identical with a material of which a pixel electrode in a display region is made.

7. The active matrix substrate according to claim 1, wherein the trunk wiring is made of a material identical with a material of which a data signal line provided in a display region is made.

8. The active matrix substrate according to claim 1, further comprising first and second interlayer insulating films above the gate insulating film, wherein the contact hole extends through the gate insulating film and the first and second interlayer insulating films.

9. The active matrix substrate according to claim 8, further having an intra-pixel contact hole in a display region, the intra-pixel contact hole connecting a transistor and a pixel electrode, wherein a portion of the gate insulating film below the intra-pixel contact hole has a structure identical with a structure of the second film thickness portion.

10. The active matrix substrate according to claim 9, wherein the two wirings connected via the contact hole in the non-display region are disposed in different layers, and an intersection of the wirings lies entirely within a perimeter of the first film thickness portion.

11. The active matrix substrate according to claim 10, wherein an edge of a lower one of the two wirings is 60 μm or more distant from an edge of the first film thickness portion in the intersection.

12. The active matrix substrate according to claim 1, wherein a portion of the first film thickness portion of the gate insulating film which portion is adjacent to an edge of the first film thickness portion is in a forward tapered shape.

13. The active matrix substrate according to claim 1, wherein the gate insulating film includes, in each pixel region, a thin film portion having a reduced thickness in a region which overlaps the storage capacitor wiring.

14. The active matrix substrate according to claim 1, wherein the gate insulating film includes, in each pixel region, a thin film portion having a reduced thickness in a region which overlaps a gate electrode of a transistor, and an area of the thin film portion which area overlaps a source electrode of the transistor is smaller than an area of the thin film portion which area overlaps a drain electrode of the transistor.

15. A liquid crystal panel comprising an active matrix substrate of claim 1.

16. A display device comprising an active matrix substrate of claim 1.

17. An active matrix substrate including a display region and a non-display region, the active matrix substrate comprising:
a plurality of pixel electrodes in the display region;
a plurality of scanning signal lines; and
an insulating film,
a lead wiring, wherein:
the insulating film is in a layer above the scanning signal lines;
the lead wiring is in a layer above the insulating film;
each of the scanning signal lines is in the display region and the non-display region;
each of the scanning signal lines is connected, via a contact hole, with the lead wiring in the non-display region, the insulating film comprises a through-bore portion in the contact hole, and a portion with a reduced thickness, adjacent to the through-bore portion, wherein the insulating film includes: a first film thickness portion adjacent to the through-bore portion; and a second film thickness portion which is adjacent to the first film thickness portion and larger in film thickness than the first film thickness portion, the insulating film being a gate insulating film including a plurality of gate insulating layers, wherein the first film thickness portion includes at least one gate insulating layer, and the second film thickness portion includes more gate insulating layers than the first film thickness portion, wherein a bottommost one of the gate insulating layers is a planarizing film in the second film thickness portion, and wherein a portion of the planarizing film which portion is in contact with a substrate is thicker than a metal wiring disposed on the substrate.

18. An active matrix substrate including a display region and a non-display region, the active matrix substrate comprising:

a plurality of pixel electrodes in the display region;

at least two wirings connected with each other, via a contact hole provided in a non-display region;

a crossing wiring which is disposed in a same layer as one of the two wirings and crosses the other of the two wirings in the non-display region; and an insulating layer between the two wirings, wherein:

the one of the two wirings is located in the display region and the non-display region; and the insulating layer comprises a through-bore portion for forming the contact hole, a first film thickness portion adjacent to the through-bore portion; and a second film thickness portion which is positioned at least in an intersection of the other of the two wirings with the crossing wiring, and larger in film thickness than the first film thickness portion, wherein the insulating film is a gate insulating film including a plurality of gate insulating layers, wherein the first film thickness portion includes at least one gate insulating layer, and the second film thickness portion includes more gate insulating layers than the first film thickness portion, wherein a bottommost one of the gate insulating layers is a planarizing film in the second film thickness portion, and wherein a portion of the planarizing film which portion is in contact with a substrate is thicker than a metal wiring disposed on the substrate.

19. The active matrix substrate according to claim 18, further comprising in each pixel region:

first and second transistors;

a first pixel electrode connected with the first transistor;

a second pixel electrode connected with the second transistor;

a first storage capacitor wiring crossing the first pixel electrode thereunder; and a second storage capacitor wiring crossing the second pixel electrode thereunder, the first and second storage capacitor wirings being connected, via contact holes provided in the non-display region, with first and second trunk wirings, respectively, the first and second storage capacitor wirings being disposed in a same layer, the first and second trunk wirings being disposed in a same layer, the active matrix substrate further comprising a scanning signal line disposed in the same layer as the first and second storage capacitor wirings, the scanning signal line crossing the first and second trunk wirings in the non-display region, respectively.

20. A liquid crystal panel comprising:

an active matrix substrate including a display region and a non-display region, the active matrix substrate comprising:

a plurality of pixel electrodes in the display region;

plurality of storage capacitor wirings; and an insulating film;

a trunk wiring, wherein:

the insulating film is provided in a layer above the storage capacitor wirings;

the trunk wiring is provided in a layer above the insulating film;

each of the storage capacitor wirings is located in the display region and the non-display region;

each of the storage capacitor wirings is connected, via a contact hole, with the trunk wiring in the non-display region, the insulating film comprises a through-bore portion in the contact hole, and a portion with a reduced thickness adjacent to the through-bore portion, a counter substrate facing the active matrix substrate;

the liquid crystal panel further comprising between the substrates: spacers; and a liquid crystal layer, the insulating film being a gate insulating film, the spacers including: a first spacer disposed in a display region; and a second spacer disposed in a non-display region, wherein a portion of the gate insulating film which portion is located below the first spacer has a structure identical with a structure of a portion of the gate insulating film which portion is located below the second spacer.

21. The liquid crystal panel according to claim 20, wherein the gate insulating film includes:

a first film thickness portion adjacent to the through-bore portion;

a second film thickness portion which is adjacent to the first film thickness portion and larger in film thickness than the first film thickness portion; and a portion located below the second spacer which portion has a structure identical with a structure of the second film thickness portion.

22. The liquid crystal panel according to claim 21, wherein the gate insulating film includes a plurality of gate insulating layers, the first film thickness portion includes at least one of the gate insulating layer, the second film thickness portion includes more of the gate insulating layers than the first film thickness portion, and any one of the gate insulating layers in the second film thickness portion is a planarizing film.

23. The liquid crystal panel according to claim 21, further comprising an interlayer insulating film between the gate insulating film and the liquid crystal layer, the interlayer insulating film including a layer containing an organic material.

24. The liquid crystal panel according to claim 23, wherein the organic material is any one of an acrylic resin, an epoxy resin, a polyimide resin, a polyurethane resin, a polysiloxane resin, and a novolac resin.

25. The liquid crystal panel according to claim 20, wherein each of the first and second spacers is disposed so as to overlap only one metal wiring which is covered with the gate insulating film, and the metal wiring is a scanning signal line or the storage capacitor wiring.

26. The liquid crystal panel according to claim 20, wherein the first spacer is disposed so as to overlap either an intersection of a data signal line with a scanning signal line, or an intersection of the data signal line with the storage capacitor wiring, the data signal line being disposed above the gate insulating film, and the second spacer is disposed so as to overlap either an intersection of the trunk wiring with the scanning signal line, or an intersection of the trunk wiring with the storage capacitor wiring.

27. The liquid crystal panel according to claim 20, wherein the second spacer has a relative permittivity which is lower than an average relative permittivity of a liquid crystal material in the liquid crystal layer.

28. A liquid crystal panel comprising:
   an active matrix substrate including a display region and a non-display region, the active matrix substrate comprising:
      a plurality of pixel electrodes in the display region;
      a plurality of scanning signal lines; and
      an insulating film,
      a lead wiring, wherein:
      the insulating film is in a layer above the scanning signal lines;
      the lead wiring is in a layer above the insulating film;
      each of the scanning signal lines is in the display region and the non-display region;
      each of the scanning signal lines is connected, via a contact hole, with the lead wiring in the non-display region,
      the insulating film comprises a through-bore portion in the contact hole, and a portion with a reduced thickness, adjacent to the through-bore portion;
   a counter substrate facing the active matrix substrate,
   the liquid crystal panel further comprising between the substrates: spacers; and a liquid crystal layer,
   the insulating film being a gate insulating film,
   the spacers including: a first spacer disposed in a display region; and a second spacer disposed in a non-display region,
   wherein a portion of the gate insulating film which portion is located below the first spacer has a structure identical with a structure of a portion of the gate insulating film which portion is located below the second spacer.

* * * * *